(12) United States Patent
Lewis

(10) Patent No.: US 7,730,172 B1
(45) Date of Patent: *Jun. 1, 2010

(54) METHOD AND APPARATUS FOR REACTIVE AND DELIBERATIVE SERVICE LEVEL MANAGEMENT (SLM)

(75) Inventor: Lundy Lewis, Mason, NH (US)

(73) Assignee: Computer Associates Think, Inc., Islandia, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/577,224

(22) Filed: May 23, 2000

Related U.S. Application Data

(60) Provisional application No. 60/135,492, filed on May 24, 1999.

(51) Int. Cl.
*G06F 15/173* (2006.01)

(52) U.S. Cl. .................................. 709/224; 709/223

(58) Field of Classification Search ......... 709/201–203, 709/223–226; 345/736; 714/48, 1–4, 707, 714/708; 370/395.21; 715/733–736; 719/310, 719/312–320
See application file for complete search history.

(56) References Cited

U.S. PATENT DOCUMENTS

| | | | |
|---|---|---|---|
| 4,977,390 A | 12/1990 | Saylor et al. | 340/521 |
| 5,079,765 A | 1/1992 | Nakamura | 340/825.8 |
| 5,197,005 A | 3/1993 | Shwartz et al. | |
| 5,204,955 A | 4/1993 | Kagei et al. | 395/575 |
| 5,261,044 A | 11/1993 | Lewis et al. | 395/159 |
| 5,293,323 A | 3/1994 | Doskocil | |
| 5,309,448 A | 5/1994 | Bouloutas | 395/183 |
| 5,317,568 A | 5/1994 | Bixby et al. | 370/401 |
| 5,436,909 A | 7/1995 | Dev | |
| 5,446,730 A | 8/1995 | Lee et al. | |
| 5,450,408 A | 9/1995 | Phaal | 370/401 |
| 5,473,608 A | 12/1995 | Gagne et al. | 370/401 |
| 5,495,470 A | 2/1996 | Tyburski et al. | 370/248 |
| 5,504,906 A | 4/1996 | Lutoff | 709/302 |

(Continued)

FOREIGN PATENT DOCUMENTS

EP  0 621 716 A2  10/1994

(Continued)

OTHER PUBLICATIONS

Network and Distributed Systems Management, edited by Morris Sloman, Imperial College of Science, Technology & Medicine, University of London, Addison-Wesley Publishing Co., Chapter 11, pp. 273-301.

(Continued)

*Primary Examiner*—David E England
(74) *Attorney, Agent, or Firm*—Pillsbury Winthrop Shaw Pittman LLP

(57) ABSTRACT

Method and apparatus for service level management, wherein business processes are composed of services. A state of the service is defined by one or more service parameters, and the service parameters depend upon performance of network components that support the service, e.g., component parameters. The state of the service may depend, for example, on a collection of service parameter values for availability, reliability, security, integrity and response time. A service level agreement is a contract between a supplier and a customer that identifies services supported by a network, service parameters for the services, and service levels (e.g., acceptable levels) for each service parameter.

17 Claims, 21 Drawing Sheets

U.S. PATENT DOCUMENTS

| | | | |
|---|---|---|---|
| 5,517,622 A | 5/1996 | Ivanoff et al. ............... 709/232 |
| 5,640,505 A | 6/1997 | Hearn et al. |
| 5,646,864 A | 7/1997 | Whitney ..................... 364/514 |
| 5,680,552 A | 10/1997 | Netravali et al. ......... 395/200.8 |
| 5,696,486 A | 12/1997 | Poliquin et al. ............. 340/506 |
| 5,761,502 A | 6/1998 | Jacobs ........................ 395/614 |
| 5,768,501 A | 6/1998 | Lewis .................... 395/185.01 |
| 5,802,302 A | 9/1998 | Waclawsky et al. .... 395/200.54 |
| 5,825,759 A * | 10/1998 | Liu ............................. 370/331 |
| 5,826,239 A | 10/1998 | Du et al. ........................ 705/8 |
| 5,893,905 A | 4/1999 | Main et al. .................... 705/11 |
| 5,905,715 A | 5/1999 | Azarmi et al. ............... 370/244 |
| 5,974,237 A | 10/1999 | Shurmer et al. ........ 395/200.54 |
| 6,012,095 A | 1/2000 | Thompson et al. |
| 6,012,152 A | 1/2000 | Douik et al. |
| 6,026,442 A * | 2/2000 | Lewis et al. ................. 709/229 |
| 6,052,722 A * | 4/2000 | Taghadoss ................... 709/223 |
| 6,070,190 A | 5/2000 | Reps et al. ................... 709/224 |
| 6,070,244 A | 5/2000 | Orchier et al. |
| 6,085,335 A * | 7/2000 | Djoko et al. ................... 714/26 |
| 6,108,700 A * | 8/2000 | Maccabee et al. ........... 709/224 |
| 6,112,301 A | 8/2000 | Johnson |
| 6,115,393 A | 9/2000 | Engel et al. .................. 370/469 |
| 6,151,582 A | 11/2000 | Huang et al. .................... 705/8 |
| 6,167,027 A * | 12/2000 | Aubert et al. ................ 370/230 |
| 6,167,445 A | 12/2000 | Gai et al. |
| 6,230,203 B1 * | 5/2001 | Koperda et al. ............. 709/229 |
| 6,233,449 B1 * | 5/2001 | Glitho et al. ................. 455/423 |
| 6,249,755 B1 | 6/2001 | Yemini et al. |
| 6,263,358 B1 * | 7/2001 | Lee et al. ..................... 718/100 |
| 6,269,401 B1 * | 7/2001 | Fletcher et al. ............. 709/224 |
| 6,272,110 B1 * | 8/2001 | Tunnicliffe et al. ......... 370/232 |
| 6,286,047 B1 | 9/2001 | Ramanathan et al. ....... 709/224 |
| 6,304,892 B1 * | 10/2001 | Bhoj et al. ................... 709/202 |
| 6,308,216 B1 * | 10/2001 | Goldszmidt et al. ......... 709/236 |
| 6,311,175 B1 | 10/2001 | Adriaans et al. |
| 6,314,103 B1 * | 11/2001 | Medhat et al. ........... 370/395.2 |
| 6,321,264 B1 * | 11/2001 | Fletcher et al. ............. 709/224 |
| 6,336,138 B1 | 1/2002 | Caswell et al. .............. 709/223 |
| 6,336,139 B1 | 1/2002 | Feridun et al. .............. 709/224 |
| 6,356,282 B2 * | 3/2002 | Roytman et al. ............ 345/736 |
| 6,356,885 B2 | 3/2002 | Ross et al. |
| 6,363,053 B1 | 3/2002 | Schuster et al. ............. 370/230 |
| 6,363,421 B2 | 3/2002 | Barker et al. |
| 6,397,359 B1 * | 5/2002 | Chandra et al. ............. 714/712 |
| 6,411,946 B1 * | 6/2002 | Chaudhuri ..................... 706/21 |
| 6,424,624 B1 | 7/2002 | Galand et al. |
| 6,430,712 B2 | 8/2002 | Lewis ........................... 714/47 |
| 6,446,136 B1 | 9/2002 | Pohlmann et al. ......... 707/104.1 |
| 6,446,200 B1 | 9/2002 | Ball et al. ...................... 713/1 |
| 6,449,603 B1 | 9/2002 | Hunter |
| 6,453,687 B2 * | 9/2002 | Sharood et al. ............... 62/127 |
| 6,456,619 B1 | 9/2002 | Sassin et al. |
| 6,470,307 B1 | 10/2002 | Turney |
| 6,470,386 B1 * | 10/2002 | Combar et al. .............. 709/224 |
| 6,510,406 B1 | 1/2003 | Marchisio |
| 6,570,867 B1 * | 5/2003 | Robinson et al. ............ 370/351 |
| 6,574,661 B1 * | 6/2003 | Delano et al. ................ 709/223 |
| 6,583,720 B1 * | 6/2003 | Quigley ....................... 340/521 |
| 6,633,908 B1 * | 10/2003 | Leymann et al. ............ 709/224 |
| 6,701,342 B1 | 3/2004 | Bartz et al. .................. 709/200 |
| 6,728,748 B1 * | 4/2004 | Mangipudi et al. .......... 718/105 |
| 2002/0039352 A1 | 4/2002 | El-Fekih et al. ............. 370/252 |

FOREIGN PATENT DOCUMENTS

| | | |
|---|---|---|
| EP | 0 632 617 A2 | 1/1995 |
| EP | 0854605 A2 | 7/1998 |
| WO | WO 93/10495 | 5/1993 |
| WO | WO 94/23514 | 10/1994 |
| WO | WO 95/08794 | 3/1995 |

OTHER PUBLICATIONS

Green Paper on Object Model for Services, Mar. 12, 1997, Editor: Bryan Wood (bmw@mci.org.uk), pp. 1-4.

ODP Functions and CORBA Services, Background Material for Green Paper on ODP Functions and Object Services, Bryan Wood, Open-IT Ltd., Mar. 12, 1997, pp. 1-24.

ISO/IEC JTC 1/SC 21 N9309, QoS—Basic Framework—CD Text, Joint ISO/IEC & ITU-T, Interim Meeting, Toronto, Jan. 9-13, 1995, Open Systems Interconnection, Data Management and Open Distributed Processing, Secretariat: USA (ANSI), Jan. 1995.

Quality of Service (QoS) in OMG, Chris Sluman (cms@mci.org.uk), Jeremy Tucker (tuckerj@logica.com), J.P. LeBlanc (jpleblanc@ibm.net), OMG Green Paper, Mar. 6, 1997—Version 0.3—Nov. 25, 1998, pp. 1-17.

Quality of Service in Distributed Systems, Guest Editorial, Andrew T. Campbell, S. Keshav.

Object Management Group (OMG), Jun. 30, 1997, Object Services and Consulting, Inc.

Position Paper: Resource Management for Complex Distributed Systems, Michael B. Davis and Jaroslaw J. Sydir, SRI International, Information, Telecommunications, and Automation Division, Menlo Park, California 94025, Aug. 26, 1996.

Taxonomy for QoS Specifications, Bikash Sabata Saurav Chatterjee, Michael Davis Jaroslaw and Thomas F. Lawrence, SRI International, 333 Ravenswood Ave, Menlo Park, California 94025, Published in the proceedings of Words '97, Feb. 5-7, 1997, Newport Beach, California.

Integrated Quality of Service for Multimedia Communications, Andrew Campbell, Geoff Coulson, Francisco Garcia, David Hutchinson and Helmut Leopold, 1993 IEEE, 0743-166X/93, pp. 732-739.

Crafting Successful Service Level Agreements, Peter Bendor-Samuel (info@eversoft.com), Everest Software Corp., wysiwyg://1426/http://www.summitonline.com/service/papers/everest.

Object-Based QoS Management Framework, Pradeep Ray, Department of Computing, University of Western Sydney, Nepean, Kingswood, NSW, 2747, Australia, Apr. 22, 1997.

Multimedia Service Delivery with Guaranteed Quality of Service, M.Fry et al., CRC for Distributed Systems Technology, University of Technology, Sydney, Sydney 2007, Australia.

L. Lewis, AI and Intelligent Networks in the 1990's and Into the 21st Century, Chap. 7, pp. 109-124, Worldwide Intelligent Systems, J. Leibowitz and D.S. Prerau (Eds.), IOS Press, Sep. 1995.

Heinz-Gerd Hegering, "Integrated Network and System Management," 1994: Section 2.3—Differentation Between Network and System Management, pp. 97-100; Chapter 14—Integration of Management Tools Into Platforms, pp. 359-373.

L. Lewis, "Spectrum Service Level Management Definition, Offerings, and Strategy," Technical Note LML-CTRON-98-02, 'Online!, Mar. 30, 1998, pp. 1-17, XP002150696.

K. Kubo et al., "A Method of Extracting Management Information for Service Management," NTT Review, JP, Telecommunications Association, Tokyo, vol. 10, No. 2, Mar. 1, 1998, pp. 63-68, XP000740456.

L. Lewis et al., "Incorporating Business Process Management Into Network and Systems Management," Proceedings-ISADS 97- Third International Symposium on Autonomous Decentralized Systems (Cat. No. 97TB100111), Berlin, Germany, Apr. 9-11, 1997, pp. 385-392, XP002150698, 1997, Los Alamitos, CA, USA, IEEE Comput. Soc. Press, USA.

L. Lewis et al., "Event Correlation in Spectrum and Other Commercial Products," Technical Note CTRON-LML-99-05, 'Online!, May 5, 1999, pp. 1-8, XP002159591.

L. Lewis, "Managing Computer Networks: A Case-Based Reasoning Approach," 1995, Artech House, Inc., Norwood, MA, US, XP002159593.

"Saman Strategic Service Management," Gecko Software Saman Whitepaper, 'Online!, 1997, pp. 1-5, XP002150697.

L. Lewis, "A Fuzzy Logic Representation of Knowledge for Detecting/Correcting Network Performance Deficiencies," Network Management and Control, vol. 2, 1994, pp. 1-7, XP002159592.

L. Lewis, "Spectrum Service Level Management Definition, Offerings, and Strategy," Technical Note LML-CTRON-98-02, 'Online!, Mar. 30, 1998, pp. 1-17, XP002150696, Retrieved from the Internet: URL:www.aprisma.com/white-papers/spectrum/slm.pdf 'retrieved on Oct. 18, 2000!

"Saman Strategic Service Management," Gecko Software Saman Whitepaper, 'Online!1997, pp. 1-5, XP002150697, Retrieved from the Internet: URL:http//www.geckoware.com/products/s0001-w1.htm, 'retrieved on Oct. 18, 2000!

J. Minaxi Gupta and Mani Subramanian, Santa Clara, Cal., USA, Apr. 9-12, 1999, discloses Preprocessor Algorithm for Network Management Codebook.

John McConnell: "Spectrum and NerveCenter—A New Level of Integration" May 1996, McConnell Consulting, Inc., Boulder, CO.

Lundy Lewis and Jim Frey: "Incorporating Business Process Management into Network and Systems Management", Apr. 9-11, 1997, Proceedings of ISADS 97, IEEE Computer Society Press, Los Alamitos, CA.

Schlaerth, J.P.: "A Concept for Tactical Wide-Area Network Hub Management," Proceedings of the Communications Conf. (MILCOM), Long Branch, NJ., Oct. 2-5, 1994, vol. 2 of 3, IEEE, pp. 644-649.

Grady Booch: "Object-Oriented Analysis and Design (with Applications)" Second Ed., 1994 Ch2, pp. 28-80 Addison-Wesley Publishing Co.

* cited by examiner

| Friday January 5 2001 ~191 | | | |
|---|---|---|---|
| | Service 1 | Service 2 | Service 3 |
| Seattle | | | |
| Bldg 1 | Up | Up | Down, up at 12 PM |
| Bldg 2 | Down 8-10PM | Down 8-10PM | Down 8-10PM |
| Bldg 3 | Up (Slow) | Up | Up |
| Sydney | | | |
| Bldg 1 | Up | Up | Down, up ? |
| Bldg 2 | Up | Up (slowly) | Up |
| ⋮ | | | |
*Fig. 24*
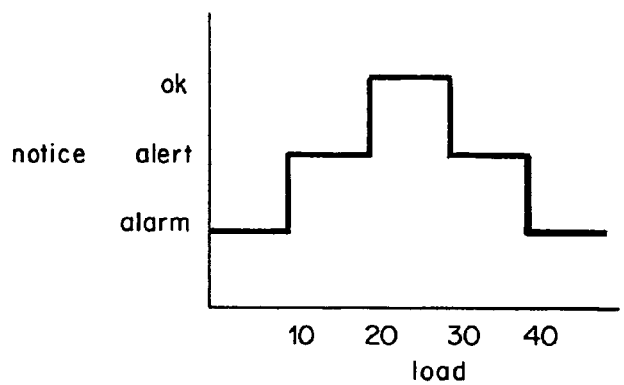
*Fig. 25*
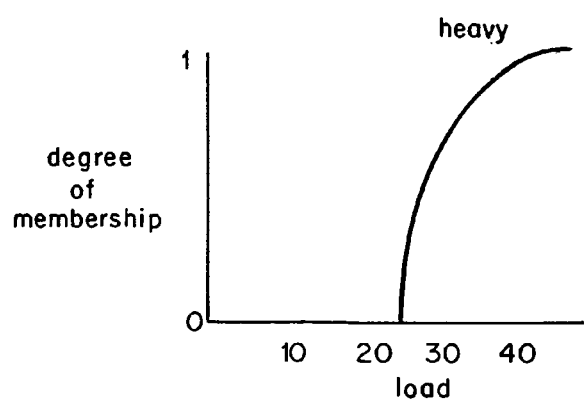
*Fig. 26*

230

Service Agreement with XYZ Server Form

Name
Address
Phone
Email

Policies

| | | |
|---|---|---|
| Availability | ___ (select 90-100%) | $___ |
| Response Time | ___ (select 2-5 sec) | $___ |
| Security | ___ (select high- med-low) | $___ |
| Integrity | ___ (select high- med-low) | $___ |
| | Total: | $___ |

| Go Back | (Month) | Go Forward |
|---|---|---|

Default: Availability____ Response time____ Security____ Integrity____

Send    Cancel

*Fig. 32*

METHOD AND APPARATUS FOR REACTIVE AND DELIBERATIVE SERVICE LEVEL MANAGEMENT (SLM)

This application claims priority to U.S. provisional Patent Application Ser. No. 60/135,492 filed May 24, 1999 entitled METHOD AND APPARATUS FOR SERVICE LEVEL MANAGEMENT . . . by Lundy Lewis.

BACKGROUND OF THE INVENTION

In the early 1980's, campus-wide computer networks were being installed principally by universities to enable communication and the sharing of computer resources between various departments. The networking technology available at that time, and the scope of deployment, were both limited and relatively unsophisticated.

Today, the deployment and maintenance of "enterprise" networks (i.e., existing across multiple domains—e.g., geographical, functional, managerial) occurs on a much grander scale. The enterprise still consists of network devices, transmission media, computers, and software applications, but there are many more of them and they are considerably more complex and difficult to manage. Furthermore, enterprises are connected with other enterprises via the Internet and third-party backbones, and applications are distributed over all of these. Most global business entities, in addition to large universities, now employ such sophisticated enterprise networks. Electronic commerce (EC) providers are creating similarly complex global networks, known as "Web server farms", on which industries install their Web sites. Industries have to be assured that their customers can always access their Web sites, that performance will be reasonably good, and that customer transactions are secure. Management of such distributed Web server farms is yet another example of the complexities of enterprise management today. Internet service providers also need to manage and provide customers with access to global networks on a 24-hour a day basis.

SUMMARY OF THE INVENTION

The present invention is directed to various aspects of service level management (SLM), whereby an entity (such as a company, university, Internet service provider (ISP), electronic commerce (EC) provider, etc.) may, for example, map components of a network (i.e., network devices, transmission media, computer systems, and applications) into services in order to assess the state of those services. The state of those services, referred to herein as service parameters, may include availability, response time, security, and integrity. For example, EC providers need to assess availability—their customers want their Web sites to be available at all times. Their users want quick response time—they do not want to experience undue delay when retrieving information or moving around screens. They need to assess security—customers want to be assured that no intruders (e.g., competitors) can sabotage their Web sites, and they want to be assured of secure transactions with respect to personal information such as credit card numbers. They need to assess integrity—customers want the words and pictures on the screens to be clear, accurate and visually interesting.

Providers of network services may include certain guarantees of service level management in a service level agreement (SLA). The SLA may quantify systems performance, service availability, backup completions and restore times, and problem resolution metrics. SLAs may provide financial incentives for exceeding requirements and penalties for failing to meet performance objectives. Performance metrics (service parameters) for SLAs may be based on availability to the Internet and measurements of Web site access times. For example, availability may be defined as the total minutes that a Web server is actually available to the public. Access time may be measured on a regional basis using benchmarking methods.

Based on current networking technology such as packet marking, differential services, and switched networks, network service providers can offer different levels (grades) of service in each of these categories, and customers can choose their preferences. If customers want 100% availability, optimal response time, and maximal security and integrity, then they would pay more. Otherwise, they would pay less. The customer may select specific time periods over which various service grades are required. Preferably, the customers can access a service level agreement form on a Web site, and negotiate with the provider the terms of the agreement.

One aspect of service level management is monitoring of the various computer systems, network devices and software applications for both real-time display and historical reporting. A management system should provide visibility into component operational parameters that provide meaningful information to the IT staff for maintaining network availability and performance.

Another aspect of service level management is event management—taking information from the monitoring agents in various embodiments, logging it, filtering it, correlating it and determining what actions or notifications, if any, need to take place. Preferably, the output of event management enables the information technology (IT) staff to become proactive in preventing service interruptions by identifying and responding to low-impact events that may be precursors to a more serious event that would cause a service outage.

Another aspect of service level management is the taking of operational data obtained by the monitoring agents and transforming it into management information to support the needs of both the business and technical operations within the organization. In various embodiments, service level reports provide an assessment of service parameters and service levels in a form adapted to the interests of users, IT staff, business owners, EC provider, etc.

Other elements of network management that may be useful in providing a specific level of service parameters in a service level agreement include:

Configuration asset and change management;

Software distribution;

Problem management and automated fault management;

Trend and performance analysis; and

Security management.

Many businesses have made a large investment in their computer networks. This investment is sometimes called the total cost of ownership (TCO) regarding the enterprise. Most businesses, however, have difficulty understanding the extent to which the enterprise network contributes to business profit. By understanding the services provided by the enterprise and the relation between profit and services (i.e., total benefits), then the business owner can calculate a return on investment (ROI). Service level management (SLM) helps a business owner understand this relationship between expenditures on enterprise components and the return on investment in regard to the operational efficiencies of the business.

I. Service Level Management (SLM)

According to one aspect of the invention, a method and apparatus are provided for service level management (SLM). In one embodiment, a method of monitoring a business process comprises:
- determining one or more services upon which the business process depends;
- determining one or more network components upon which the one or more services depend; and
- monitoring the one or more network components.

Component parameters are determined for the network components, the component parameters are monitored and the monitored values mapped into service parameters. Software agents are utilized to monitor the network components. Service levels are designated for accepted levels of the service parameters. The service levels may be incorporated in a service level agreement. Periodic service reports are issued pursuant to the service level agreement, indicating whether the designated service levels have been met.

In another embodiment, a data space is provided comprising service parameters, wherein each service parameter represents a performance indicator of one or more services whose performance depends upon one or more network components, where the one or more services are included in a business process.

In another embodiment, an integrated management system is provided comprising service level management (SLM) for monitoring one or more services; and component management (CM) for managing network components; wherein a business process is composed of the one or more services, and the services are composed of the network component. In addition, a business process management (BPM) may be integrated for managing the business process.

In another embodiment, a method of providing service level management is provided comprising determining services required by a business process, and determining service parameters marked by service levels for each service.

In another embodiment, a service level management system is provided wherein a service depends on at least one network component, the system comprising one or more agents for receiving component parameters and mapping the component parameters into service parameters, and a user interface for generating service level reports which include the mapped service parameters, wherein the component parameters represent a state of at least one network component.

II. Reactive and Deliberative SLM

In another aspect of the invention, a method and apparatus are provided for reactive and deliberative service level management (SLM). In one embodiment, a method for managing information is provided which comprises:
- providing a plurality of monitoring agents for monitoring components of a network, each monitoring agent receiving events of a select type from the network components and resolving such events into alarms;
- transmitting the alarms from all monitoring agents to a common management agent, which resolves the alarms to produce correlated alarms; and
- transmitting the correlated alarms to a common service level management agent to reason across the network as to causes of the events.

Events is used broadly herein and may include various operational data from a network component, including events and statistics. The event may be generated and transmitted automatically by the network component to an agent monitoring the component, or the agent may poll the network component for the information. The method may further comprise relating the component information to a service upon which a business process depends, the component information representing operational data of one or more monitored components, and further determining a state of the business process based upon the component information, wherein the component information determines a measured level of service and wherein the level of service affects the operation of the business process, and further reporting to a user information regarding at least one of a group including availability, faults, configuration, integrity, security, reliability, performance, and accounting of the measured level of service.

In another embodiment, a method of multilevel, multidomain alarm to service mapping is provided comprising:
- (a) conducting intradomain event correlation at a first level, wherein:
  - input events are received by a monitor provided for each domain;
  - instructions provide control for each domain; and
  - input events are interpreted and correlated for each domain;
- (b) conducting intradomain alarm-to-service mapping at a second level, wherein:
  - input events are received by a monitor provided for each domain;
  - instructions provide control for each domain; and
  - input events are interpreted and correlated for each domain; and
- (c) conducting interdomain alarm correlation at a third level, wherein:
  - input events are received by a monitor provided for each domain;
  - instructions provide control for each domain; and
  - input events are interpreted and correlated across multiple domains.

In another embodiment, a multilevel architecture for service level management of a network is provided, the architecture performing the method comprising:
- providing a reactive level for monitoring components in the network to provide service level management; and
- providing a next higher level of a more deliberative decision-making for providing service level management.

In yet another embodiment, a system is provided for managing the network
- an agent operable to receive operational data from at least one component of the network, the at least one component being related to a service on which a business process depends; and
- a correlator operable to determine a state of the business process based upon the operational data, wherein the operational data of the component determines a measured level of service and wherein the level of service affects the operation of the business process.

In yet another embodiment, a system for managing the network is provided comprising:
- one or more agents operable to receive operational data from at least one component of the network, the at least one component being related to a service on which a business process depends, wherein the agent is configured to determine a state of the business process based upon the operational data, wherein the operational data of the component determines a level of service, and wherein the level of service affects the operation of the business process.

In a still further embodiment, a method is provided comprising:

providing a plurality of monitoring agents for monitoring components of a network, each monitoring agent receiving events of a select type from the network and resolving such events into alarms;

transmitting the alarms from all agents to a common management agent, which resolves the alarms to produce correlated alarms; and transmitting the correlated alarms to a common service level management agent to reason across the network as to causes of the events.

III. Event Correlation for SLM

According to another aspect of the invention, a method and apparatus are provided for event correlation in service level management (SLM). In one embodiment, a system for providing service level management in a network is provided, wherein a service is composed of network components and a state of the service depends on the state of the network components, the system comprising:

multiple monitoring agents to each monitor a respective aspect of operation of the network, each monitoring agent to detect one or more events relative to the respective aspect of operation and to generate an alarm as a function of the one or more detected events; and an alarm correlation agent to receive the one or more alarms from the monitoring agents to determine a state of a service and, if necessary, to issue one or more instructions to establish a desired state of the service.

In preferred embodiments, the monitoring agents comprise at least one of:

an infrastructure monitoring agent to monitor operation of the network infrastructure;

a computer system monitoring agent to monitor operation of at least one computer system on the network;

a network traffic monitoring agent to monitor traffic on the network;

an application monitoring agent to monitor operation of at least one application operating on the network;

a trouble-ticketing agent to receive reports of problems by users with respect to operation of the network;

a response time monitoring agent to monitor a response time of a communication on the network;

a device monitoring agent to monitor operation of a device on the network; and a multicomponent monitoring agent comprising an aggregate of any of the above monitoring agents.

The monitoring agents and alarm correlation agents may be various reasoning agents, such as:

a rule-based reasoning agent;

a model-based reasoning agent;

a state-transition graph based reasoning agent;

a code book based reasoning agent; and a case-based reasoning agent.

In another embodiment, a system provides service level management in a network, wherein a service is composed of network components and the state of the service depends on the state of the network components, the system comprising:

a first monitoring agent to monitor a respective first aspect of operation of the network, the first monitoring agent to detect one or more events relative to the first aspect of operation and to generate an alarm as a function of the one or more detected events;

a second monitoring agent to monitor a respective second aspect of operation of the network, different from the first aspect, the second monitoring agent to detect one or more events relative to the second aspect of operation and to generate an alarm as a function of the one or more detected events; and an alarm repository to receive one or more alarms from each of the first and second monitoring agents.

In another embodiment, a system provides service level management in a network having at least one monitoring agent to monitor at least one aspect of operation and to generate an alarm as a function of one or more detected events, wherein a service is composed of network components and the state of the service depends on the state of the network components, the system comprising an alarm correlation agent to receive the one or more alarms from the at least one monitoring agent to determine the state of a service and, if necessary, to issue one or more instructions to establish a desired state of the service.

In another embodiment, a method provides service level management in the network, wherein the service is composed of network components and a state of the service depends on the state of the network components, the method comprising:

monitoring one or more aspects of operation of the network and detecting one or more events relative to of the one or more aspects of operation;

generating an alarm for a respective aspect of network operation as a function of the respective detected one or more events; and correlating the one or more alarms and determining a state of the service as a function of the correlated alarms.

In another embodiment, a computer program product is provided comprising:

a computer readable medium;

computer program instructions on the computer-readable medium, wherein the computer program instructions, when executed by a computer, directs the computer to perform a method of providing service level management in a network, wherein a service is composed of network components and a state of the service depends on a state of the network components, the method comprising:

monitoring one or more aspects of operation of the network and detecting one or more events relative to the one or more aspects of operation;

generating an alarm for a respective aspect of network operation as a function of the respective detected one or more events; and correlating the one or more alarms and determining a state of a service as a function of the correlated alarms.

In another embodiment, a system provides service level management in the network, wherein the service is composed of network components and a state of the service depends on the state of the network components, the system comprising:

means for monitoring one or more aspects of operation of the network and detecting one or more events relative to the one or more aspects of network operation;

means for generating an alarm for a respective aspect of network operation as a function of the respective detected one or more events; and means for correlating the one or more alarms and determining a state of the service as a function of the correlated alarms.

In a further embodiment, a system provides service level management in the network, wherein the service is composed of network components and a state of the service depends on the state of the network components, the system comprising:

multiple monitoring agents to each monitor a respective aspect of operation of the network, each monitoring agent to detect one or more events relative to the respective aspect of operation and generate an alarm as a function of the one or more detected events; and each monitoring agent including an alarm correlation agent to receive one or more alarms from the other monitoring agents for consideration in the step of generating the alarm as a function of the one or more detected events; and each monitoring agent including a control agent to issue one or more instructions regarding the respective aspect of operation of the network in order to establish a desired state of a service.

In another embodiment, a computer program product is provided comprising:

a computer readable medium;

computer program instructions on the computer readable medium, wherein the computer program instructions, when executed by a computer, direct the computer to perform a method of providing service level management in a network, wherein a service is composed of network components and a state of the service depends on a state of the network components, the method comprising, for each of a plurality of agents:

monitoring one or more aspects of the respective operation of the network and detecting the one or more events relative to the respective one or more aspects of operation;

generating an alarm for the respective aspect of network operation as a function of the respective detected one or more events; and communicating with the other agents to access events or alarms in the respective operation of the other monitoring agent, and correlating these events or alarms from other monitoring agents in the alarm generated for the respective aspect of network operation.

IV. Display of SLM

According to another aspect of the invention, a method and apparatus are provided for display of service level management (SLM). In one embodiment, a display comprises an identification of one or more services, a location of the one or more services, a state of the one or more services, wherein a business process is composed of the one or more services and the services depend on the operation of one or more components in the network. In various embodiments, the state may comprise one or more of availability, reliability, performance, fault, configuration, integrity and security. According to a method embodiment for providing service status, the display is provided to users of the service. According to one embodiment, an apparatus comprises a display that indicates a service in the state of a service, where the service is composed of network components and the state of the service depends on the state of the network components.

In another embodiment, a method of managing a network is provided comprising:

discovery of network components;

root cause analysis to determine a cause of a degradation in the service due to a degradation in the network; and providing a business impact analysis for effective services and users.

The discovery may include discovery of network infrastructure, systems, and applications resources in the network. The root cause analysis may determine whether a network degradation is due to the infrastructure, systems or applications resources. The business impact analysis may include a fault isolation among the infrastructure, systems, and applications resources. The business impact analysis may also include the locations of affected users, and a projected cost of the service degradation. The method may further include providing physical and logical topological maps detailing the network components and the services. The method may be provided for management of various types of networks, including enterprise networks, service provider networks, electronic commerce provider networks, Internet access provider networks, and broadband cable networks. The method may further include proactively supplying suggested resolutions to the service degradation. The method may further comprise automatically taking corrective action to correct the service degradation. The business impact analysis may include one or more of service reliability, service availability, service performance, service security, and service integrity.

V. Component to Service Mapping

According to another aspect of the invention, a method and apparatus is provided for component to service mapping in system level management (SLM). In one embodiment, a method of determining a state of a service is provided, the service being composed of network components, and the service affecting operation of a business process, the method comprising determining the state of one or more of the network components. Further, the states of the network components may be correlated to the services to determine a net state at a designated time of the service. The net state of the service may include an intended or scheduled state degradation.

According to another embodiment, a method provides for monitoring a state of a service, the service being composed of components of a network, and the service affecting operation of the business process, the method comprising:

monitoring the network components to determine the state of the service, and when the state of the service is degraded, determining a cause of the degraded service by performing one or more of:

testing the components, querying a database, modifying the components, and implementing a reasoning algorithm.

In another embodiment, a method provides monitoring a state of a service defined by service parameters, wherein the service is composed of network components and the service affects operation of a business process, the method including monitoring and controlling the service parameters by monitoring and controlling component parameters of the network components, wherein the component parameters are mapped to the service parameters.

According to another embodiment, a system is provided for determining a state of the service, the service being composed of network components, and the service affecting operation of a business process, the system comprising agents for monitoring and determining the state of one or more of the network components. The system may comprise a correlator for receiving the state of the one or more network components and correlating the same to determine a net state, at a designated time, of the service. The system may include a scheduler for implementing an intended degradation of the state of one or more of the network components and communicating the intended degradation to the correlator. Each of the monitoring agents may correlate events to alarms for its respective network components, and the correlator may receive alarms from the monitoring agents.

VI. Service Analysis

According to another aspect of the invention, a method and apparatus are provided for service analysis in service level management (SLM). In one embodiment, a method is provided for service level management, wherein a service is composed of network components and the service affects operation of a business operation, the method comprising:

collecting data on component parameters for the network component;

collecting one component parameter as a service parameter; and utilizing algorithms to determine how a service parameter is influenced by the other component parameters.

The determined influence may be represented in one or more of a decision tree, propositional statement, quantified statement, weighted listing, or graph. The algorithms utilized may include data mining, neural networks, machine learning, iterative dichotomizing third, genetic algorithms, and classical statistic methods. The determining influence may be used by a network component monitoring agent of a network management system. The service parameter may be selected from the group consisting of response time, traffic congestion, availability, reliability, security, performance and configuration.

VII. Service Level Agreement

According to another aspect of the invention, a service agreement is provided for system level management (SLM). In one embodiment, a method of providing service level management for a network comprises:

collecting data on component parameters for the network components;

selecting one component parameter as a service parameter; and utilizing algorithms to determine how a service parameter is influenced by the other component parameters.

The method may further comprise setting a price for the services based on grades of the service levels. There may be awards or penalties imposed if the grades are either exceeded or not met for a given time period. The state of the network components may be monitored to determine measured component parameters, the service parameters are determined from the measured component parameters. Various service level grades may be provided in the service level agreement, for different time periods. Pursuant to the agreement, service level reports may be issued to the customer on a periodic basis, to indicate whether the service levels have been met.

These and other features of the present invention will be more particularly described with respect to the following figures and detailed description.

BRIEF DESCRIPTION OF THE FIGURES

FIG. 24 is an embodiment of a service level management report showing service availability;

FIG. 25 is a graph of rules for a parameter in a component-to-service mapping;

FIG. 26 is a graph illustrating a graded change in a parameter, illustrating the degree of membership concept in fuzzy logic;

FIG. 32 is an embodiment of a service level agreement form;

OUTLINE OF DETAILED DESCRIPTION

I. Service Level Management (SLM)—Overview
   A. SLM Domain Model
      1. Definitions
   B. SLM Use Case Model
   C. SLM CRC Model
   D. SLM Methodology II. Reactive and Deliberative SLM Decision-Making
   A. Enterprise Management—Collaboration Among Agents
   B. Multilevel Architecture With Collaborating Agents
   C. Multilevel SLM Architecture With Collaborating Agents
   D. MultiDomain EMS Architecture
   E. Multilevel, MultiDomain Fault Management
   F. Data Warehousing III. Event-to-Alarm Mapping
   A. Multiagent Alarm Correlation Architecture
   B. Rule-Based Reasoning for Event Correlation
   C. Model-Based Reasoning for Event Correlation
   D. Case-Based Reasoning for Event Correlation
   E. Distributed Event Correlation
   F. Agent Integration IV. Display Of Service Availability V. Component-To-Service Mapping
   A. Fuzzy Logic Methodology VI. Service Analysis VII. Service Agreement VIII. SLM For Electronic Commerce, An Example IX. Integrated Management, An Example

DETAILED DESCRIPTION

I. Service Level Management (SLM)—Overview

In one embodiment, service level management (SLM) refers to a process of:
1. identifying a business process;
2. identifying services, supported by a network, on which the business process depends;
3. identifying service levels to measure the services;
4. negotiating a service level agreement (SLA);
5. producing service levels reports based on the SLA; and
6. (optionally) modifying the network to provide better services.

A business process (BP) refers to the way(s) in which any type of business entity (e.g., company providing goods or services, a department, a university, an ISP, an EC provider, an Internet access provider, nonprofit organization, consultant, etc.) coordinates and organizes work activities and information to produce a valuable commodity. A BP will typically include a number of services, some of which depend on the business's network, and other services which are unrelated to the network. The goal is to identify services which depend on components of the network, and to identify measurable parameters by which accomplishment of the desired services can be monitored and/or controlled.

A. SLM Domain Model

Figure 1:
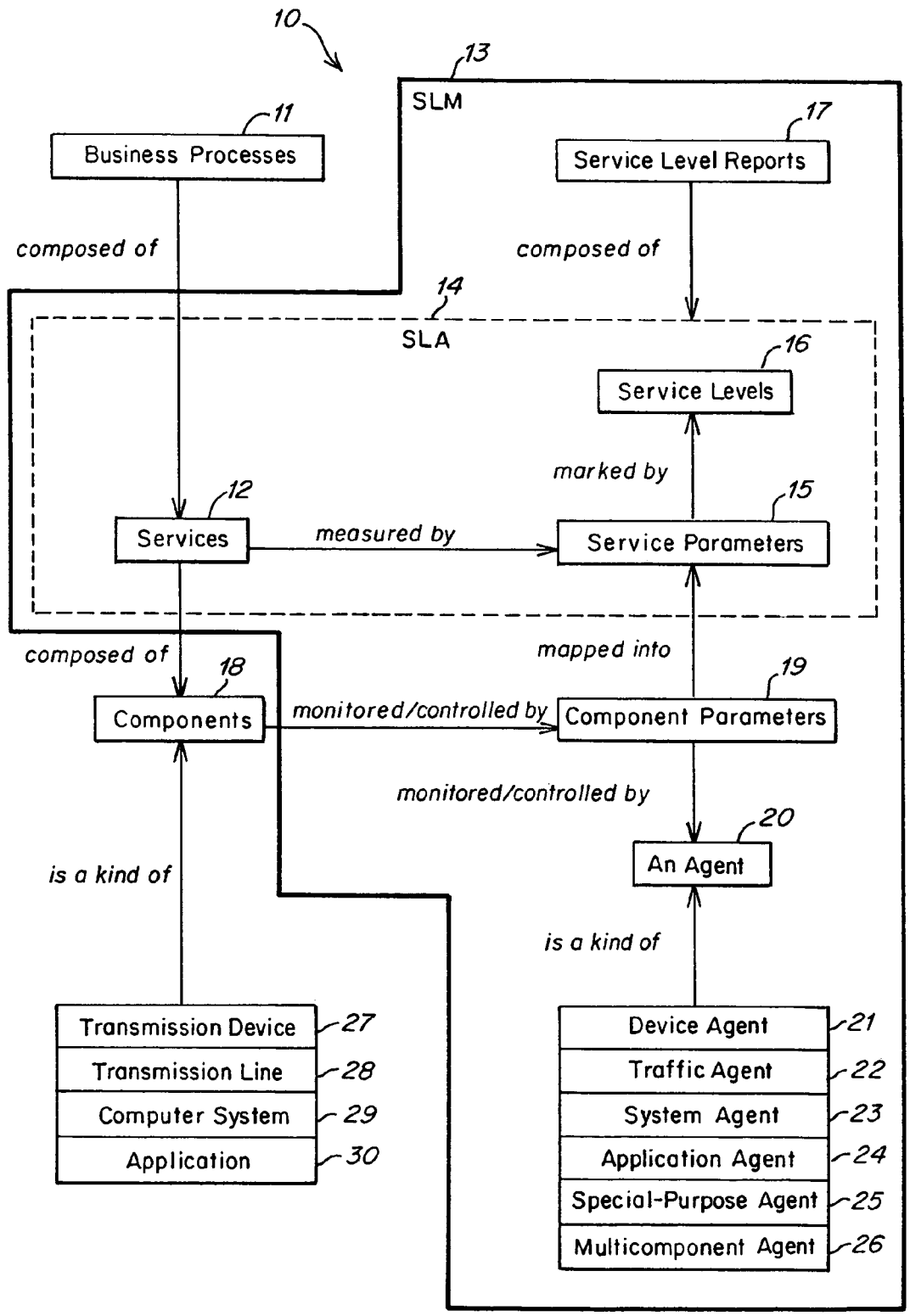
FIG. 1 is a service level management (SLM) domain model illustrating one embodiment of the present invention.

An SLM domain model 10, shown in FIG. 1, is one way to accomplish the above-described system level management. A domain model consists of two kinds of constructs: (1) concepts; and (2) relations between concepts. A first concept is identified in a box, at the beginning of an arrow, and expresses a subject. A second concept, at the other end of the arrow, expresses an object. The phrase adjacent the arrow expresses some relation that holds between the subject and the object. Thus, FIG. 1 says that business processes 11 are composed of services 12, not that services are composed of business processes.

The following definitions apply to the concepts set forth in FIG. 1, and unless otherwise specified, apply throughout the remainder of the specification:

1. Definitions

A business process (BP) is the way in which a business coordinates and organizes work activities and information to produce a valuable commodity. Business is used broadly herein to mean any entity, such as a company, department, university, consultant, Internet service provider, EC provider, etc. A typical BP includes several services, and some of those services depend on a network.

A network includes four general categories of components: transmission devices, transmission media (also referred to as lines or links) among the devices, computer systems, and applications (residing on the computer systems and transmission devices). A component is used broadly herein to include hardware, software, firmware, applications, processes, etc. Computer systems include servers, desktops, workstations, etc. Transmission media is used broadly to include copper, wireless, optical, satellite, etc. Network is also used broadly to include a business network (sometimes called an enterprise, typically owned by the business), a service provider network (not typically owned by the SP, e.g., an intermediary between the Internet and customer), telephony networks, etc. The information conveyed on the network is meant to broadly include data, voice, video, etc.

A service is a function that a network provides for the business. A service is an abstraction over and above the network, and arises in virtue of the structure and operation of the network. Thus, a service may be a function whose performance depends upon performances of network components that support the service. One example of a service is providing Internet access. The state of a service may be defined by one or more service parameter values. A service may have a predefined state expressed as a range of parameter values. The state of a service may depend, for example, on a collection of service parameter values for availability, reliability, security, integrity and response time.

A service parameter is a variable having a state (value) which represents the performance of some service provided by a network. Three examples of service parameters are availability, reliability, and usability (e.g., response time).

A component parameter is either: (1) a variable having a state (value) which represents the performance of some network component; or (2) a variable having a state (value) which controls the performance of some network component (e.g., transmission device, transmission media, computer system, or application).

A component-to-service parameter mapping is a function that takes as input a collection of one or more component parameter values and provides as output a value for a service parameter.

A service level is some value of a service parameter used to indicate acceptable service qualities.

A service level agreement (SLA) is a contract between a supplier and a customer that identifies (1) services supported by a network, (2) service parameters for each service, (3) service levels for each service parameter, and (4) (optionally) penalties/rewards on the part of the supplier and/or customer when service levels are not met or exceeded. Supplier/customer is used broadly herein to include both internal and external suppliers (e.g., an internal IT department providing services to employees of the same company that employs the IT department; or an outside IT vendor providing service to some or all of a business entity).

A service level report (SLR) is a report showing service performance for a given period of time, such as the actual value of a service parameter over some period of time.

An agent, sometimes called a manager, is a software entity that is generally responsive to changes in an environment in which the agency exits. Generally, an agent carries out such activities in a flexible and intelligent manner. Autonomous agents may respond to changes without requiring constant human intervention or guidance. Software agents are well-known in the art and may be implemented in a variety of computer languages, including C, C++, Java, ActiveX, Tal, Telescript, Aglets, and others. Software agents are described in greater detail in the book entitled *Software Agents* edited by Jeffrey M. Bradshaw, American Association for Artificial Intelligence, MIT Press 1997, Cambridge, Mass., incorporated herein by reference. Software agents are also described in the book entitled *Intelligence Software Agents* by Richard Murch and Tony Johnson, Prentice Hall, Inc., Upper Saddle River, N.J., 1999, incorporated herein by reference. According to one aspect of the invention, agents are provided monitor, reasons, records and/or controls values of component parameters. Categories of agents in the SLM domain include infrastructure agents, traffic agents, system agents, device agents, application agents, special purpose agents, and multicomponent agents. Agents may be provided, for example, as part of a commercially-available software package such as the Spectrum enterprise management system available from Cabletron Systems, Inc., Rochester, N.H. and Aprisma Management Technologies, Durham, N.H. Other commercially-available agents are available.

Infrastructure agents monitor (and may also) control parameters of, for example, one or more transmission devices in the network infrastructure, such as bridges, hubs, switches, and routers. The parameters typically include port-level statistics.

Traffic agents monitor (and may also record) traffic that flows over transmission media in the network infrastructure. Examples of such parameters include a number of bytes over source-destination pairs and protocol categories thereof.

System agents monitor (and may also control) parameters having to do with computer systems. Typically, these agents reside on the computer system, read the system log files, and perform system queries to gather statistics. Typical parameters include CPU usage, disk partition capacities, and login records.

Device agents monitor and control parameters for a single device, e.g., rotary switch.

Application agents monitor (and may also) control software applications. These agents typically reside on the computer system that hosts the application. Some applications include agents that provide indices into their own performance levels. Measured parameters include thread distribution, CPU usage per application, login records, file/disk capacity per application, response time, number of client sessions, and average session length, among others. Note that distributed applications may be managed by multiple application agents. Alternatively, distributed applications may be managed by multicomponent agents discussed in more detail below.

Special-purpose agents monitor and control parameters not covered by any of the preceding types of agents. A good example is an agent whose purpose is to issue a synthetic query from system A to system B and (optionally) back to system A to measure reliability and usability (e.g., response time) of an application. Note that the synthetic query is representative of authentic application queries. An example is an e-mail agent that monitors e-mail performance, including e-mail transmission and reception success, response time, and jitter of e-mails between user domains.

An multicomponent agent is an aggregate of any of the other agents described and has a wider-angle view of the network infrastructure, which may include transmission devices, transmission media, computer systems, and applications that reside on the network. Multicomponent agents, therefore, are useful for managing distributed applications. These agents are also cognizant of relations among network components at various levels of abstraction and are able to reason about events that issue from multiple components (called event correlation or alarm rollup). Enterprise agents are one type of multicomponent agent.

Service level management (SLM) is the identification and monitoring of service level parameters. In one embodiment, SLM refers to a process of (1) identifying services, service parameters, service levels, component parameters, and component-to-service parameter mappings; (2) negotiating and articulating an SLA; (3) deploying agents to monitor and control component parameters; (4) producing SLRs; and (5) (optionally) modifying the performance of the network to deliver better services.

Returning to the SLM domain model embodiment of FIG. 1, three concepts are shown in the area 14 enclosed by dashed lines, which together define a service level agreement (SLA). The SLA includes services 12, which are measured by service parameters 15, and wherein the service parameters are marked by service levels 16. Outside the SLA, service level reports (SLRs) 17 are composed of the contents of the SLA. Business processes 11, also outside the SLA, are composed of the services 12.

Below the dashed line box (SLA) in FIG. 1, services 12 are shown composed of components 18 (i.e., of the network), while those components are monitored and/or controlled by component parameters 19. The component parameters are mapped into one or more service parameters 15. The component parameters, in one embodiment, are monitored and controlled by agents 20. In FIG. 1, six types of agents are shown—device agent 21, traffic agent 22, system agent 23, application agent 24, special-purpose agent 25 and multicomponent agent 26, wherein for example a device agent "is a kind of" an agent. Similarly, there are four types of components shown, wherein for example a transmission device 27 "is a kind of" component (as are the transmission line 28, computer system 29, and application 30).

FIG. 1 shows a boundary 13 (solid line) that delineates the SLM system from other objects in the domain. Network components 18 are considered to be outside the SLM system. The agents 20 that monitor and control those components, however, are part of the SLM system. The business processes 11 are also outside the SLM system.

In implementing a new SLM domain model, the following issues are addressed:
1. What business processes require monitoring and/or controlling?
2. What services make up those business processes?
3. What enterprise components do the services depend on?
4. Once the services have been identified, what are the service parameters by which the services are measured?
5. Once the components that make up the services have been identified, what parameters are used to measure the components?
6. What are the parameters by which the services and components are controlled?
7. What kinds of agents are needed to monitor and control the values of the component parameters? (For example, one can select from device, traffic, system, application, special-purpose and multicomponent agents, assuming such agents are available. In other embodiments, additional agents may be considered or specially created to meet specific monitoring and/or controlling needs.)

8. How do values of component parameters map into values of service parameters?
9. How are agreeable marks (levels) for the service parameters determined? ("Mark" is simply a designation of acceptable service level values, e.g., minimum, maximum, range, etc.)

The SLA is made up of a list of services and their corresponding service parameters and service levels. The service level report (SLR) is typically a comparison between: (1) the actual value of the service parameter over some specified period of time; and (2) the service level (mark) that was agreed upon in the SLA. On the basis of that comparison, one may find reason to modify certain components of the network infrastructure, and/or the SLA. Thus, one may perform an iterative process for determining agreeable marks for the service parameters.

SLAs may include other items, e.g., the parties involved in the agreement; the dates during which the SLA is in effect; monies exchanged for services; clauses for reward and punishment; and ceteris paribus ("everything else being equal") clauses. In addition, some SLAs may include formulas for calculating the values of service level parameters.

B. SLM Use Case Model

Figure 2:
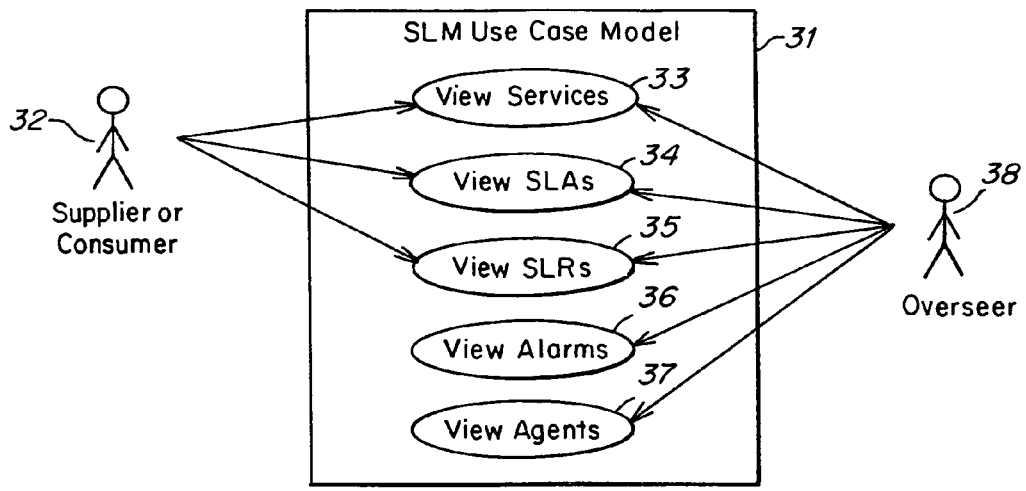
FIG. 2 is an SLM use case model illustrating an embodiment of the present invention.

A use case methodology is used to illustrate how an SLM system can be designed to provide a desired level of services. FIG. 2 is an illustrative example of an SLM use case model 31 in which an actor 32 on the left, e.g., a supplier or customer (consumer), is shown utilizing certain features 33, 34, 35 (3 of the 5 use cases) of the SLM system, and another actor 38 on the right, e.g., an overseer, utilizes another set of features 33-37 (5 of the 5 use cases) of the SLM system. The use case model is a useful tool for developing a common understanding between the users of the system and the developers of the system to ensure that the users and developers have a common understanding of what the system will deliver.

In this example, there are two actors and five use cases, accompanied by short descriptions. The supplier and consumer use the system in the same way; thus, a single actor 32 represents them. A second actor 38, the overseer, will monitor and maintain the overall system.

More specifically, the supplier or consumer are individuals who can view a list of services 33, view the SLA 34, and receive SLRs 35. Billing and accounting may be included in the SLR. In this example, no modifications are permitted by the supplier or consumer.

The overseer, one or more individuals who are the general troubleshooters and maintainers of the SLM system, have the same viewing rights as the supplier and consumer, plus modification permission (such as configuration and set up). They also receive SLM-related alarms 36, and can view and have control over agents 37 in the SLM system.

The five use cases are summarized as follows:
View Services: see a list of services by department;
View SLA: see the SLAs by department;
View SLR: see the SLRs by department;
View Alarms: see SLM-related alarms;
View Agents: see, monitor and control agents in the network.

Figure 3:
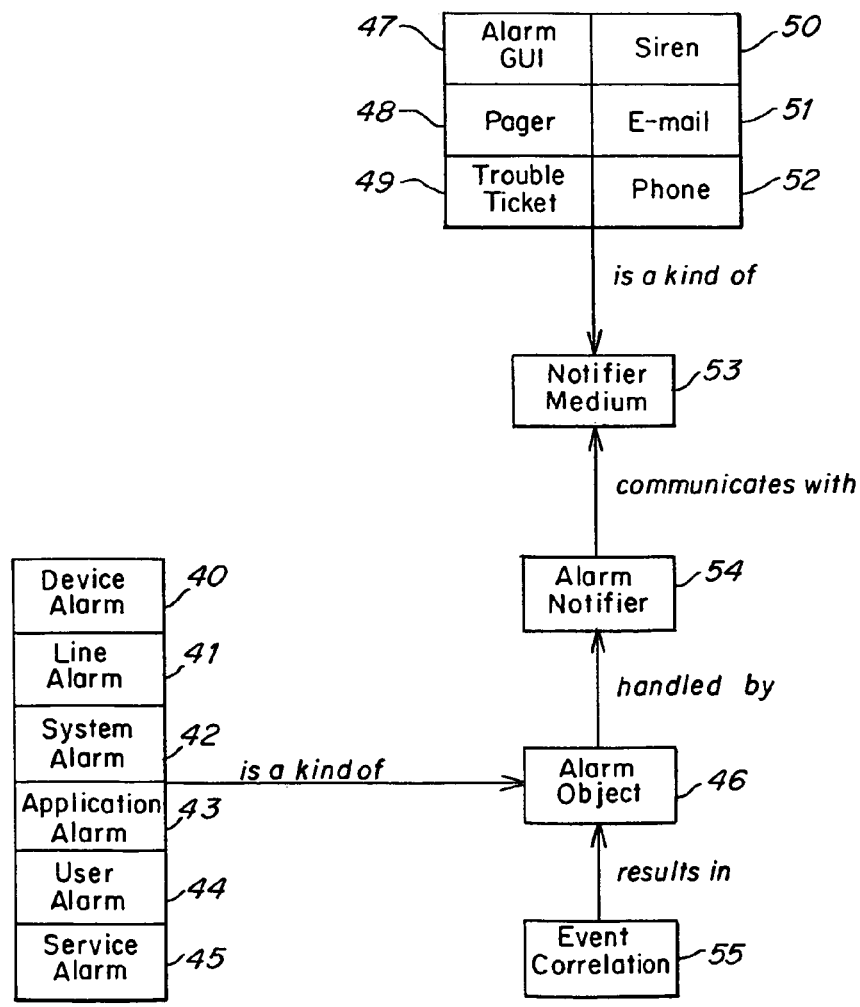
FIG. 3 is a domain model similar to FIG. 1 showing alarm related objects in the SLM domain.

Next, the SLM domain model of FIG. 1 and the SLM use case model of FIG. 2 are combined to define the SLM objects required to implement the "View Alarms" function 36 of the use case model. This is illustrated in FIG. 3, wherein the same notation as in FIG. 1 is used, i.e., a first concept, at the beginning of an arrow, expresses a subject, a second concept, at the end of the arrow, expresses an object, and the phrase adjacent the arrow expresses some relation that holds between the subject and the object.

An important functionality provided to the overseer is the viewing of alarms. An alarm is a message to the overseer that something is wrong, or about to go wrong. Things can go wrong with individual components that make up services. A subtler kind of alarm is when the components seem to be working fine, but the service is degraded. Thus, there are two general kinds of alarms: component alarms and service alarms.

The "is a kind of" relationship is used to show the variety of alarms in an SLM system. Other relations are specified to bring out the general structure of alarm-related objects in the system. For example, FIG. 3 shows that transmission device alarms 40, transmission line alarms 41, system alarms 42, application alarms 43, user-generated alarms 44, and service alarms 45 are each a kind of (general) alarm object 46. Furthermore, FIG. 3 shows six possible notification methods 47-52 ("is a kind of" notifier medium 53). An event correlation mechanism 55 "results in" an alarm object 46, and the alarm object is "handled by" the alarm notifier 54 (which "communicates with" the notifier medium 53). The event correlation mechanism takes as input a collection of events, scattered in space and time, and maps them into an alarm. There are several alarm notification methods used in the industry, including paging, phone calls, e-mail, and automatic trouble ticket generation.

Next, an analysis model is considered that identifies a configuration of objects for providing each use case in the use case model. The "View SLRs" use case 35 from FIG. 2 is selected to show how collaboration among objects provides this function.

In the analysis model, three categories of objects are as follows:
Interface objects are the mechanism by which the system connects with objects outside the domain. The classic example of an interface object is a graphical user interface (GUI), in which the external object is the user at a terminal. Other examples include a command line interface (CLI) into the system or a database interface.
Entity objects exist for the sole function of holding data. For example, during run time an entity object may instruct a database interface object to fetch and return a prespecified piece of data from a database (which is outside the system).
Control objects exist to process data. Consider control objects as algorithms that take data as input, perform some function over the data, and return a value. For example, a control object may be instructed to perform a trend analysis on data handed to it by an entity object.

Generally, a particular kind of object does not perform functions that belong to another kind of object. For example, an interface object would not process data, and an entity object would not display data. However, in some circumstances one may choose to combine the duties of two objects into a hybrid object.

Figure 4:
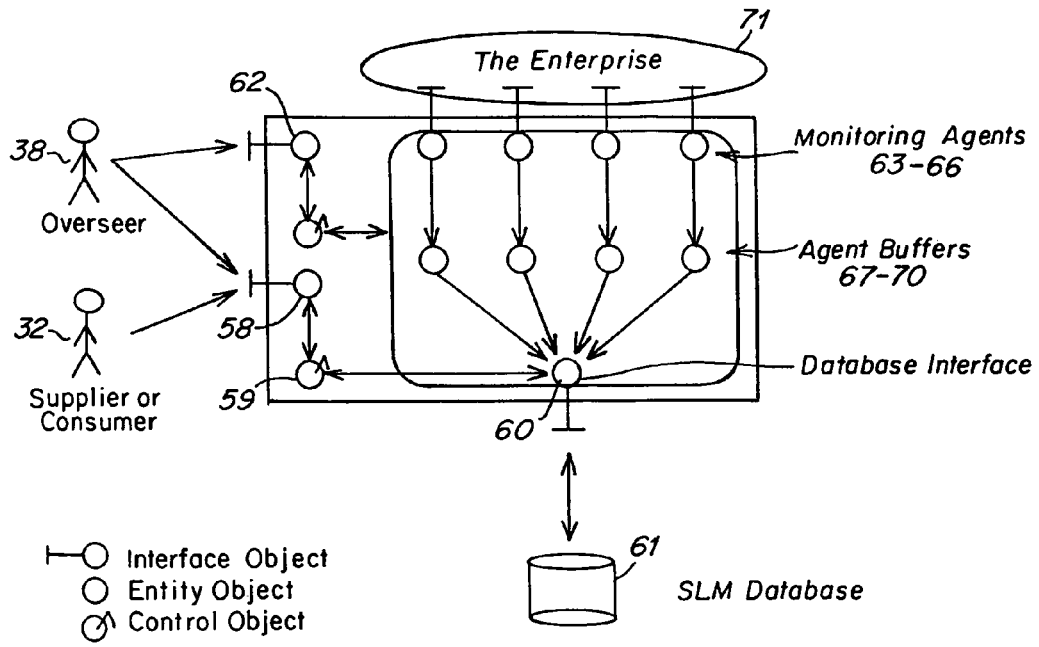
FIG. 4 is an analysis model for a View SLR use case, from the use case model of FIG. 2.

FIG. 4 shows an analysis model for the "View SLRs" use case. As shown, the overseer 38, and the supplier/consumer 32 use the same GUI interface object 58 to get SLRs. On demand, the GUI object 58 sends an instruction to a control object 59, which in turn sends an instruction to a database interface object 60 to fetch the data from an SLM database 61. The control object 59 receives the data, performs a component-to-service mapping function, and sends the results back to the interface object 58 for display.

The overseer 38 uses a separate interface object 62 to configure the agents 63-66 that monitor components in the enterprise network 71. The monitoring agents may include transmission device, transmission line, system and application agents. Each agent has a temporary buffer 67-70 to store data. At pre-specified intervals, the buffer is flushed and data is sent to the SLM database 61 via the database interface object 60. This viewing of SLRs presupposes that the SLM database has been populated.

To complete a comprehensive analysis model for the SLM use case system of FIG. 2, one would provide models for each of the five use cases 33-37 and then converge them. One would see that some objects would participate in a plurality of use cases, whereas other objects might contribute to only one use case.

For example, additional objects would be required for the "View Alarms" use case 36. Suppose there are both service alarms and component alarms, but the supplier/consumer 32 needs to know only about service alarms, while the overseer 38 needs to know about both service and component alarms. Further suppose that the event correlation mechanism 55 (in FIG. 3) is a simple threshold function.

For service alarms, one can incorporate a threshold function into an existing control object. A timer in the control object will periodically fetch component data, compute the component-to-service mapping, and run the result through the threshold function. Thus, the control object acts like a computer process that runs in the background, in addition to its normal function of preparing data for SLRs on demand by the user.

For component alarms, one option is to insert a control object incorporating a threshold function between each monitoring agent (63-66) and corresponding buffer agent (67-70). Another option is to incorporate threshold functions into the existing monitoring (interface) agents (63-66), in which case one may use hybrid monitoring agents.

In developing the analysis model, one may uncover some objects that were overlooked in the domain model, or one may rethink the boundary 13 (in FIG. 1) that separates SLM objects from non-SLM objects. It is envisioned that it may be necessary to backtrack and/or otherwise provide some back-and-forth movement between the domain and analysis models.

Next, the construction of a design model, which is an implementation of the analysis model, is discussed. Tools, commercial or otherwise, are considered that fit the structure of the analysis model.

There are commercial enterprise management (EM) platforms that integrate multiple agents in a single system. Some have a built-in event correlation mechanism—these are called enterprise agents. Commercially-available enterprise agents include Spectrum® agents, available from Cabletron Systems, Inc. Rochester, N.H., and Cuprisma Management Technologies, Nashua, N.H., and OpenView agents, available from Hewlett-Packard, Palo Alto, Calif. These enterprise agents perform network, systems and application management, but are generally lacking in traffic management. For example, Spectrum is integrated with well-known systems and application management products such as BMC Patrol (BMC Software, Houston, Tex.), Platinum ServerVision (Epicor Software, Irvine, Calif.), Metrix WinWatch (Applied Metrix, Natick, Mass.) and Tivoli TME (Tivoli Systems, Austin, Tex.).

A commercially-available traffic monitoring agent is the Programmable RMON II+ agent from NDG Phoenix, Falls Church, Va. NDG's traffic agent allows the overseer to write traffic management routines in programming languages such as Perl and then download them to the traffic monitoring agent.

A commercially-available service management application is Continuity, developed by ICS GmbH of Germany. Continuity may be integrated with Cabletron's Spectrum, which in turn is integrated with the products mentioned previously. Continuity contains template agreements and reports for common services and standard algorithms for rolling up (mapping) component parameters into service parameters.

A commercially-available SLM database is Cabletron's Spectrum Data Warehouse. This product is designed to interface with enterprise management systems and allow further development of off-line management applications such as accounting, capacity planning, and data mining. Data warehouses for use with enterprise management systems are more particularly described in commonly owned and copending U.S. patent application Ser. No. 09/386,571, filed Aug. 31, 1999, entitled "Method and Apparatus For Managing Data For Use By Data Applications," by Jeff Ghannam et al., incorporated by reference herein.

Figure 5:
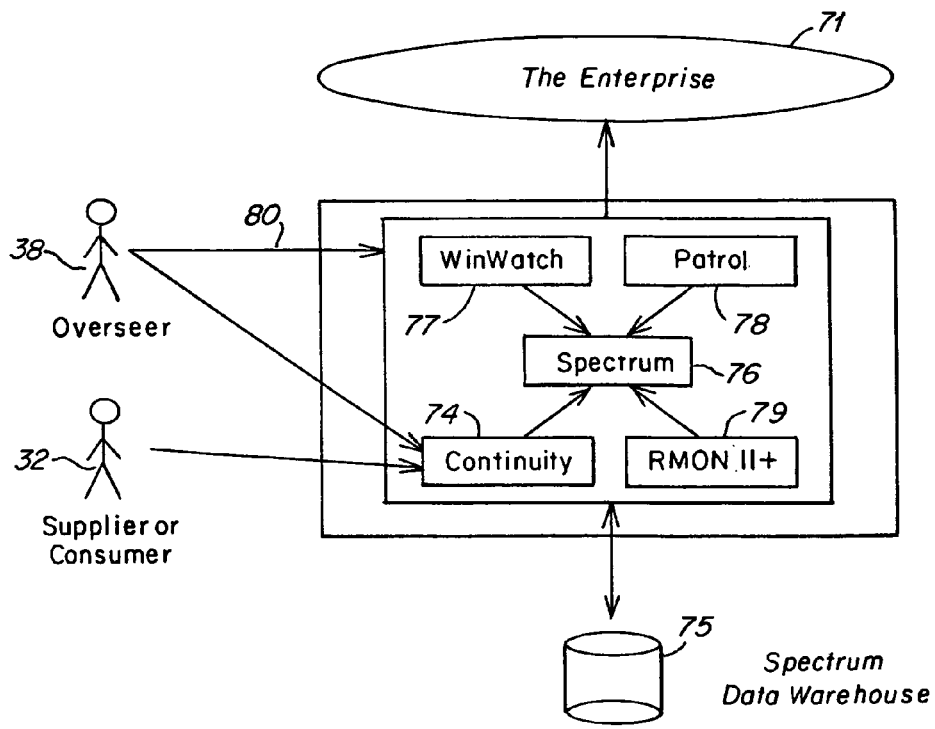
FIG. 5 is a design model for a View SLR use case, taken from the use case model of FIG. 2.

FIG. 5 shows a design model for the "View SLR" use case. As illustrated therein, the overseer 38 and the supplier/consumer 32 use Continuity 74 to generate SLRs. On demand, Continuity performs a component-to-service mapping function, using data in the Spectrum Data Warehouse 75 which has been populated by Spectrum 76, WinWatch 77, Patrol 78 and RMON II+ 79 monitoring agents. Integrated event correlation and alarming are performed by the Spectrum enterprise monitoring agent 76.

As illustrated in FIG. 5, the overseer 38 uses a common integrated interface 80 to configure the agents that monitor components in the enterprise, configure SLAs and SLRs, and manage alarm notifications. The viewing of SLRs presupposes that the Data Warehouse 75 has been populated with data from components in the enterprise network 71.

Thus, the above-identified existing software systems may be configured to work with each other to realize the design model and, by implication, the analysis, use case and domain models.

C. SLM CRC Model

An alternative methodology for designing an SLM system is class-responsibility-collaboration (CRC). Typically, CRC is combined with an object-oriented language such as Smalltalk, C++ or Java when system designs are implemented. There is a fair amount of overlap in the use case methodology and the CRC methodology. For example, the term "use case" means the same as the CRC term "scenario". The domain model and the analysis model are much the same as the CRC exploratory phase and analysis phase.

In CRC methodology, a class is an abstraction over a collection of objects, and is related to the objects by the "is a kind of" relation. For example, FIG. 3 shows an alarm object class 46 and a notifier medium class 53.

A class hierarchy shows how various classes are related to each other. For example, in FIG. 3 the system alarm class 42 can be extended to show that Unix OS alarms and Windows NT alarms are kinds of system alarms. Furthermore, one can decompose Unix OS alarms into thread alarms, log-in alarms, and CPU alarms, which also might be kinds of Windows NT alarms. Some classes may not have a class hierarchy, for example, the alarm notifier 54 in FIG. 3 is an object in a class by itself.

The responsibilities of a class include: (1) actions that the class performs; and (2) information that the class holds. Generic responsibilities of three classes—interface, entity and control objects, were discussed previously. The CRC methodology is more specific.

For example, with regard to the alarm object class 46 in FIG. 3, one responsibility of an alarm object is to hold information about itself. Such information might include alarm ID, type of alarm, time of the alarm, severity of the alarm, the agent that issued the alarm, the component to which the alarm applies, the location of the component, the IP address, the MAC address, the underlying events that caused the alarm, the probable cause of the alarm, and a recommendation of how to deal with the alarm.

A second responsibility of an alarm object is to provide information about itself when asked or to vanish when told to do so.

The alarm notifier class 54 (see FIG. 3) contains information such as its process ID, its state (e.g., idle or non-idle), CPU usage, and the agents to which it is connected. Its primary responsibilities are to receive alarm objects and to forward them to some notifier medium 53. Thus, the alarm notifier object 54 is mainly a control object.

Collaboration is a communication between one object and a set of other objects so that the one object can fulfill its responsibilities. For example, the responsibility "forward alarm information" of the alarm notifier 54 in FIG. 3, requires a collaboration of the alarm object 46 and the notifier medium 53.

Figure 6:
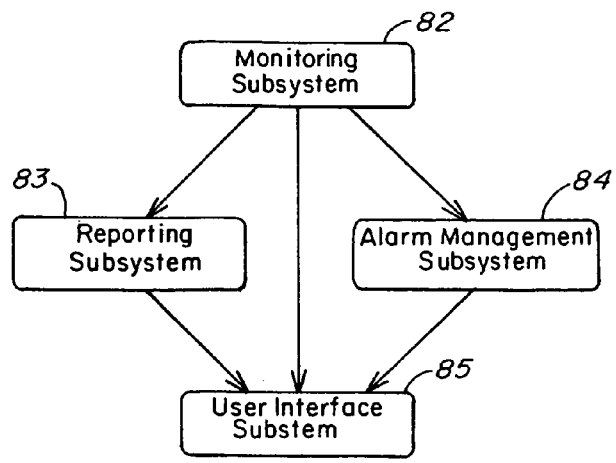
FIG. 6 is a block diagram illustrating subsystems of an SLM system.

The CRC methodology further specifies the use of class hierarchy graphs, collaboration graphs, class cards, and subsystems for developing a software design. These can be used to develop an SLM system software design. For example, a logical grouping of objects that combine to perform some identifiable function (i.e., a subsystem) is made to reduce complexity. In the SLM context, FIG. 6 shows a monitoring subsystem 82, a reporting subsystem 83, an alarm management subsystem 84, and a user interface subsystem 85, all of which work together to provide the SLM system. Note that the monitoring subsystem 82 collaborates with each of the other three subsystems 83-85. If one considers the objects as existing software systems, e.g., monitoring systems, event correlation systems, reporting systems, trouble-ticketing systems, one can see how these software systems collaborate with each other to provide a function that none of the systems can provide in isolation. The subsystem structure thus simplifies the complexity of the project and suggests how preexisting software systems can be integrated to accomplish the desired SLM system.

D. SLM Methodology

In accordance with another embodiment of the invention, a supplier of service level management may perform the following three-step process in providing SLM to customers:

Phase 1: Study the customer's business processes and its service requirements;

Phase 2: Design an SLM model to satisfy those service requirements and build and test a prototype; and Phase 3: Run the prototype for some time to establish a baseline and negotiate an SLA; once the full SLM system is in operation, produce SLRs and compare with the SLA, modifying the SLA as necessary.

In Phase 1, the supplier and customer work toward a common understanding of the customer's business practices. For example, if the consumer is a healthcare organization, the supplier may study the essentials of healthcare management and discuss with the consumer how these apply to this particular organization. Then, the supplier and customer develop a common understanding of the network related services required by these business processes. The services that depend on the network will be included in the SLM, and should be identified by name. The supplier and the customer then develop a common understanding of the service parameters and service levels for each service.

The supplier needs to know what service parameters are most important to a specific customer. For example, in the package delivery business, speed of delivery may be most important to one delivery company, whereas a company that specializes in fragile cargo may be more concerned with nonbreakage. Generally, the supplier will identify the service parameters that have a special relation to the goals of the business. Simple and common names should preferably be attached to the service parameters and service levels to ensure a common understanding between the supplier and customer.

In phase 2, the supplier conducts an inventory of the enterprise components, e.g., the topology of the network, the types of transmission devices and transmission media, the types of systems being used, the types of applications being used, and existing management processes. Typically, the person carrying out this step is a network specialist or systems analyst. The goal is to produce a high-level comprehensive picture of the enterprise.

The supplier then considers correlating services and components. The supplier may need to distinguish between "end-to-end" coverage of services and "selective" coverage of services. For example, with an e-mail application, an end-to-end coverage for internal e-mail would include all user systems, the mail servers, and all transmission devices and media. Under a selective approach, one would designate only the e-mail server and the transmission devices.

The supplier then considers demarcating component parameters by which to measure and (optionally) control the components, and to mapping those component parameters into service parameters. One method for mapping includes declaring that some component parameter is a service parameter, in which case a one-to-one mapping between the component and service parameter has been established. An alternative technique is to devise a function that takes as input a set of component parameters and outputs a value of the service parameter that depends upon the input component parameters. In the latter case, there is a many-to-one mapping between the component and service parameter, respectively. Note that the input to such a function is likely to be a time series, that is, a table of input values that are measured, for example, every ten minutes.

Next, the supplier identifies agents to monitor and control components, (2) designs agent integration and (3) experiments with non-production prototypes. The supplier may identify agents (such as management systems), commercial or otherwise, that can monitor the component parameters. The supplier also considers the kind of repository (memory) that will hold the data collected by the agents, and reporting tools for displaying the data. The supplier determines how to integrate the system and then builds a non-production SLM system in order to test the capabilities of isolated and integrated agents in the system.

In the third phase, the supplier moves the overall system into production, and a baseline is established to produce the first SLR. The supplier and the customer review the first SLR, and negotiate an SLA. They may consider the SLA an initial requirement subject if necessary, to later negotiation of new service parameters and service levels.

Finally, full production proceeds and SLRs and SLAs are reviewed, followed through, and optionally renegotiated at the end of a given time period. The SLA usually specifies payment time. Monthly SLRs may be produced, along with monthly bills, or in cases where no monies, rewards, or penalties are specified in the SLA, a simple progress report.

II. Reactive and Deliberative SLM Decision-Making

A. Enterprise Management—Collaboration Among Agents

An enterprise management system that exhibits "intelligence" or "intelligent behavior" may be achieved by a set of collaborating agents having the following functionality:

Sensors: for monitoring an enterprise component, e.g., device-monitoring agents that perceive operating characteristics of devices, and traffic monitoring agents that perceive characteristics of network traffic.

Effectors: for instructing an enterprise component, e.g., instructions to restrict classes of traffic that flow over network lines, instructions to restrict user access to Web server operating systems, and instructions to download a software application to multiple systems at one time.

Communication: for conferring with other agents, e.g., device, systems and application agents may send events to an enterprise agent, the enterprise agent sends an alarm to a paging system, and the paging system sends a message to a troubleshooter.

Reasoning: for making decisions based on what the agent perceives and what it is told by other agents, e.g., an enterprise agent may study device, system, and application events and infer therefrom enterprise alarms, enterprise state, and potential bottlenecks.

Policies and Rules: for defining goals, e.g., agents attempt to enforce the defined goals (policies and rules) when making decisions about actions to be taken.

"Intelligence" in an enterprise management system is generally understood as a system that carries out policies and rules, with little or no human intervention. To do this, an enterprise management system has to learn about its current environment and, based upon the defined policies and rules, it must discern whether a change in that environment is problematic or intentional (e.g., a scheduled change). Learning and proper execution of knowledge are the hallmarks of intelligence.

The enterprise is inherently a distributed, multi-domain entity. Enterprises typically are partitioned in ways that help administrators understand and manage them, for example, with respect to geographical domains; functional domains, or managerial domains. The tasks involved in managing distributed enterprises are too complex for a single agent. Thus, the tasks have to be performed by a collection of distributed, cooperative agents.

Enterprise administrators desire a relatively "autonomous" enterprise management system that can perform routine tasks and handle administrative problems reliably, with little or no human intervention. Included would be for example: fault identification and repair; easy configuration of devices, systems, and applications to support the business; identification and correction of performance problems; methods to control the accessibility of enterprise components; and methods to distribute software over the enterprise.

B. Multilevel Architecture with Collaborating Agents

Figure 7:
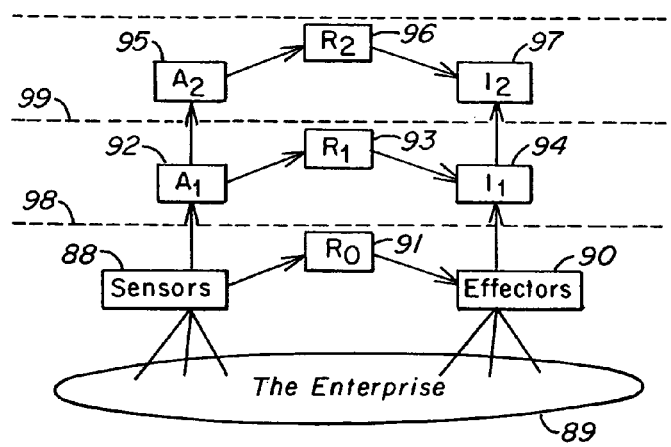
FIG. 7 illustrates a multi-loop architecture useful in SLM management.

A multi-loop architecture, shown in FIG. 7, is one way to implement intelligent collaboration among multiple agents. In a multi-loop architecture the intelligent behavior starts with sensors 88 extracting sensor information (from the enterprise 89) that flows through various modules 91-97 of the architecture until it is transformed into instructions that are executed by effectors 90 (applied to the enterprise). The flow of information begins with the abstraction of sensory input (going up the left side of the FIGS. 88-92-95), one or more levels), reasoning (going from left to right (88-91-90; 92-93-94; 95-96-97), at one or more levels), and instructions (going down the right side (97-94-90), one or more levels).

Each loop of the multi-loop architecture defines a different level, separated in FIG. 7 by dashed lines 98, 99, wherein higher levels involve a more deliberative behavior designed for longer-term problem solving, and lower levels define a more reactive or reflexive behavior designed for short-term problem solving. Thus, each level of the multi-loop architecture is a separate control loop that corresponds to a specific class of problems, where problems are petitioned and assigned to levels according to the amount of time and type of information required to solve them.

For example, the short-term abstraction-reasoning-instruction loop (88-91-90) at the lowest level provides a quick reaction, bypassing the upper levels. In an enterprise management domain, such tasks might include temporary disconnection of a busy server or an immediate action to switch to a backup server in the event of failure of a primary server. Another example is traffic shaping to support integrated multimedia services such as voice, data, and video on demand.

The medium-term loop (92-93-94) provides reaction to more complex problems and operates on increasingly abstract data relative to the lowest level. In the enterprise management domain, such tasks might include event correlation in a busy enterprise with multiple "contact loss" events, when some particular event is the real culprit and other events are effects of the culprit event. The resolved instruction might be to forward an explanation and recommend repair procedures to a repair person via a pager or to actually initiate the repair procedure automatically.

The top long-term loop (95-96-97) would provide reaction to problems or situations that are less urgent and can allow more time for performing an analysis. The classic example of such a task is the reasoning involved in deciding to move a host from subnet A to subnet B because the majority of the host's clients reside on subnet B, thereby causing increased traffic on the link between A and B. Another task requiring more deliberative analysis is long-term capacity planning.

In summary, a system or compilation of systems may be provided that perform varying levels of response, which are generally a function of the complexity of the problem and the desired response time. Generally, the system behavior begins with an initial input of data and ends with instructions executed by effectors. Input data may be passed through one or more levels of the multi-loop architecture. Each level of the multi-loop architecture may filter data to remove errored and/or extraneous data from the data passed to it, and may transform the received data into more informative data to formulate a response or pass data to the next layer above. When data becomes manageable, that is, when collected data reaches a point where a response can be formulated, the data is compared with predefined knowledge about what response(s) should be performed. This predefined knowledge may be implemented by, for example, look-up tables, expert systems, and/or neural networks.

Figure 8:
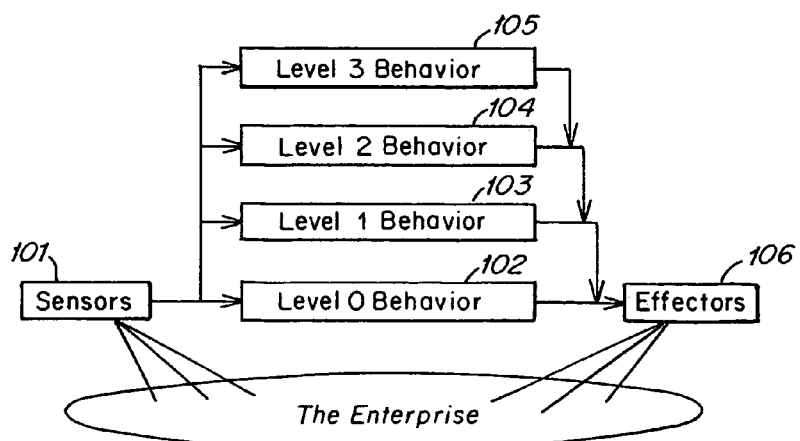
FIG. 8 illustrates a subsumption architecture useful in SLM management.

Another architectural embodiment for implementing intelligent collaboration among agents, referred to as a subsumption architecture, is shown in FIG. 8. Here the approach is to decompose a task into a collection of simpler tasks—achieving behaviors that are tightly bound together. The behaviors reside on levels wherein:

Higher levels exhibit increasingly complex behaviors;

Each level subsumes (i.e., uses) the behaviors of the levels beneath it; and

Lower levels continue to achieve their level of performance even if a higher level fails.

Unlike the prior multiloop architecture, sensor data is not transformed through levels of abstraction. Instead, multiple levels 102-105 (extracted by sensors 101 from enterprise 100) monitor one or more of the same sensor signals, and certain combinations of signals trigger appropriate behaviors. The output of a level-N behavior modifies or adds to the output of levels beneath N to produce an enhanced behavior (instructions from effectors 106). In this way, because multiple levels monitor one or more of the same signals, some kind of reasoned behavior is possible even if an upper level-N behavior is disabled.

For example, in an enterprise management domain, suppose a server monitoring agent reviews all server events and is capable of identifying bad events and forwarding them to a repair person via pages. Further suppose that there is a very large number of such agents monitoring a Web server farm. This is level-0 behavior, and it is not difficult to build agents to perform this behavior.

Now consider an enterprise agent that sees all server events and all device and system events. The job of the enterprise agent is to perform event correlation over three varieties of events. This event correlation is at least a level-1 behavior. The enterprise agent needs to determine the root cause of a collection of bad events having to do with servers, network devices, and systems. For example, if the enterprise agent reasons that a multitude of bad server events is really an effect of a failed networking device, then the agent interferes with a level-0 behavior (which would monitor and perhaps attempt to correct the bad server events). The output of the level-1 behavior may be to suppress the forwarding of numerous server and application events and instead forward a single device event to a repair person.

One benefit of the subsumption architecture is that even though a level-1 behavior might become dysfunctional, there is still some management being performed at some other level of the architecture. If the level-1 behavior were to fail, then the system or network administrator would be flooded with pages regarding server and application malfunctions. However, reduced monitoring capability is better than having no capability whatsoever. The burden of event correlation is then shifted from the enterprise management system to the repair person.

Another feature of the subsumption architecture is that there is not a symbolic layer in the architecture. That is, the enterprise 100 represents itself, rather than a symbolic model representing the world. The enterprise is represented via continuous unobstructed sensor input, and behavior occurs without a significant lag time.

In summary, the reasoning behavior required for collaboration among intelligent agents in an enterprise management system may be implemented based on a symbolic architecture, i.e., multiloop, or on a non-symbolic architecture, i.e., subsumption. As a further alternative, an architecture may incorporate features of both.

C. Multilevel SLM Architecture with Collaborating Agents

Figure 9:
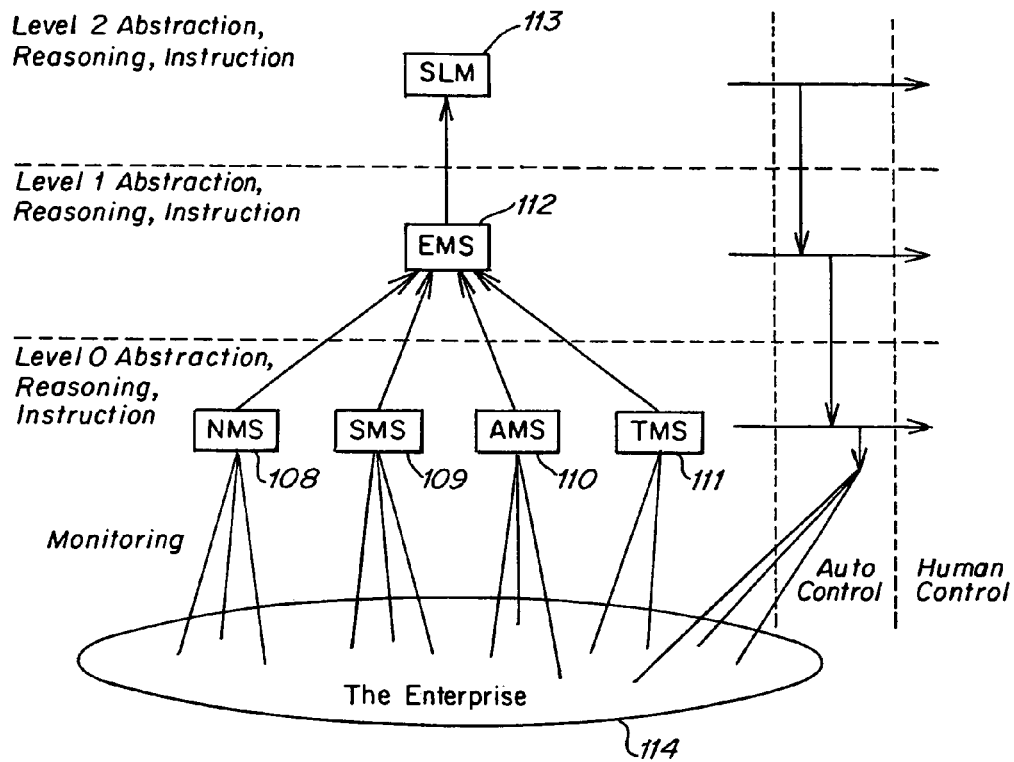
FIG. 9 is a multilevel, multi-domain architecture for service level management.

FIG. 9 shows an SLM architecture based upon collaborations among intelligent agents, as previously described. Here, at level-0 (abstraction, reasoning, instruction), there are four agents monitoring the enterprise: a network management system (NMS) agent 108; a system management system (SMS) agent 109; an application management system (AMS) agent 110; and a traffic management system (TMS) agent 111, each of which is particularly suited to monitor and control transmission devices, systems, applications, and traffic components, respectively. At the next level-1 (abstraction, reasoning, instruction), an enterprise management system (EMS) 112 receives input from each of the level-0 agents. At level-2 (abstraction, reasoning, instruction), a service level management system (SLM) 113 receives information from the level-1 EMS. On the right hand side, moving down the levels of abstraction, the SLM sends instructions for automatic control to the EMS, or for human control. The EMS at level-1 sends instructions down to the four agents 108-111 at level-0, or else sends instructions for human control. At the level-0, the four agents send instructions to components in the enterprise 114 for automatic control, or else send instructions for human control.

As an example, consider fault management. The monitoring agents 108-111 at level-0 identify faults in their areas of expertise, whereupon they issue control instructions. A control instruction may be to execute an action directly on an enterprise component (unsupervised control), to log the fault in a trouble-ticketing system (supervised control), or to pass the fault to the enterprise management system 112 on level-1.

The enterprise management system (EMS) on level-1 reasons about faults across individual areas of expertise and may issue similar instructions. Level-1 behavior is, e.g., the performance of event correlation over network, system, application and traffic events.

An off-line fault management agent at level-2 (part of the SLM 113) may analyze faults from a historical perspective, with the goal of discovering trends that are hard for the systems on level-0 or level-1 to detect. An example of a level-2 behavior is the execution of a data mining algorithm to determine what general enterprise conditions lead to certain classes of faults. Thus, an off-line SLM agent on level-2 should know whether a particular component contributes to the health of a service and take action accordingly whenever the component begins to degrade or fail.

D. MultiDomain EMS Architecture

An embodiment of an enterprise management system (EMS) in a distributed client-server architecture, will now be discussed. The system is very large scale and may employ thousands of enterprise management agents.

Figure 10:
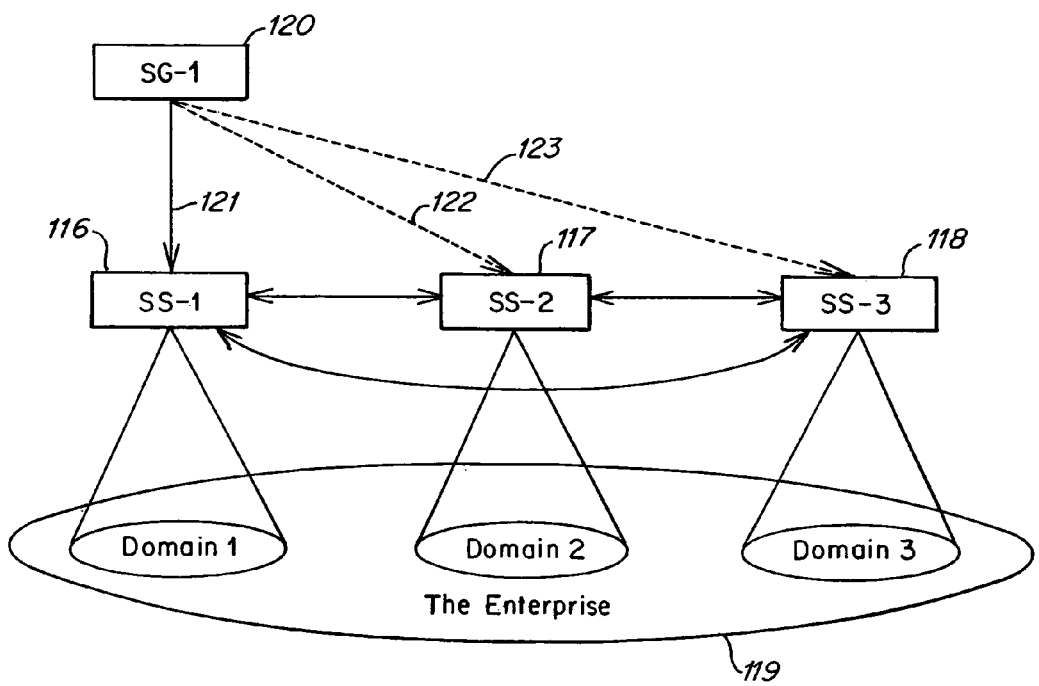
FIG. 10 is a distributed client/server architecture for multi-domain management utilizing Cabletron's Spectrum enterprise management platform.

As shown in FIG. 10, Cabletron's Spectrum enterprise management platform is based on a distributed client/server architecture. The Spectrum servers, called SpectroSERVERS (SSs) 116, 117, 118, monitor and control individual domains in an enterprise 119. The Spectrum clients, called SpectroGRAPHS (SGs) 120, may attach to any SS (116-118) to graphically present the state of that SS's domain, including topological information, event and alarm information, and configuration information. SSs also include a Command Line Interface (CLI) through which a system or user may access component data or execute control instructions.

The SGs are examples of pure interface objects, while the SSs are examples of hybrid interface-control objects. The SGs are the interfaces to the enterprise administrators (116-118), but do not have direct access to the enterprise. The SSs (116-118) provide the interface to the enterprise 119, but are not responsible for displaying data; the SSs pass data to the SGs for display.

Any domain may be viewed from a single SG. If SG-1 120 is in communication with SS-1 116, but the user wishes to monitor and control the domain covered by SS-2 117, the user may click on an icon in SG-1 that represents SS-2. FIG. 10 shows by a solid line 121 a primary client/server communication between SG-1 120 and SS-1 116. Virtual communications between SG-1 and other SSs are indicated by dotted lines 122, 123.

In one example, a three-layered hierarchical topology is used, with one master SS connecting to 14 SSs, each of which in turn was connected to 15 to 20 more SSs. Each end-node SS monitored several hundred manageable devices. A total of 15

SGs were attached to each SS at the top two layers of the hierarchy, and each SG was given permission to inquire down to each end-node SS on demand.

In this example, a 1:7 ratio among SSs that are configured hierarchically was derived from workstation operating system characteristics (rather than communications traffic load among SGs and SSs). This is an example of the scalability of the distributed client/server architecture. Because each SS is an intelligent domain-monitoring agent, capable of presenting management data on demand to any client SG, inter-SS communications are kept to a minimum. Each SS knows about its peer SSs but is prohibited from extensive communication with them. It will be described below how SSs may communicate by intermediary agents that reside at a higher level of abstraction.

This distributed version of Spectrum may be installed at business enterprises ranging from a few (2 or 3) SSs to several hundred. Generally, the business enterprise is divided into geographical domains, and an individual SS monitors and controls each domain. A central master SS typically is located at business headquarters. This arrangement allows for "follow-the-sun" management of global enterprises, where client SGs alternately attach to the master SS to take over control of the global enterprise.

In multi-domain enterprises with corresponding SS agents, polling-based management can be costly in terms of bandwidth load. By restricting SS polling (i.e., using it only for testing basic element presence or status), and instead having managed components forward data to the SSs via traps, inband management traffic is reduced considerably.

Data collected via the enterprise management system may be utilized in two ways. First, network devices in all domains are represented topologically to monitor and control the operations of the enterprise as a whole. Alarms are generated for devices that experience outages and degradation. Spectrum's event correlation capability prevents the problem of alarm flooding. An example of the alarm flooding problem is when a particular failed device causes apparent, non-real alarms on a large number of other devices, an example of which will be provided below.

The total collection of device alarms may be mapped into a well-defined service level agreement (SLA). With high-profile customers of the business, for whom the enterprise network is crucial, the service agreement may state that repair procedures for alarms that effect high-profile customers are given a higher priority than are alarms for lower-profile customers. This preferential treatment of high-profile alarms is accomplished operationally by assigning relatively higher weights to higher-profile than lower-profile alarms. At the end of the month, it is an easy matter for both supplier and customer to view the total collection of alarms and determine whether the agreement has been met or violated.

Further, because component data is analyzed in real time and related to the SLA in real time, violations of the SLA can be detected or predicted. In response to these predictions or detections, components in the enterprise may be reconfigured so that the SLA is met or not violated in the future.

E. Multilevel, MultiDomain Fault Management

Figure 11:
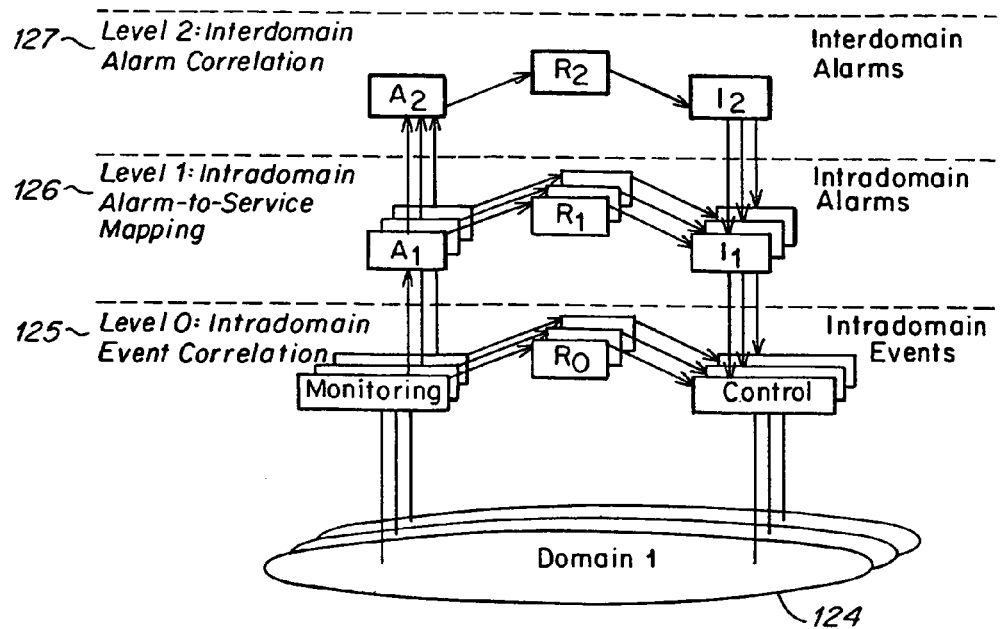
FIG. 11 is a multilevel architecture for multidomain fault management.

The multilevel (abstraction, reasoning, instruction) and multidomain architectures, previously considered, are now combined together for the task of providing system level fault management across domains. FIG. 11 shows this system, where multiple domains in the enterprise (124), level-0 (125), and level-1 (126) modules are shown as tiled elements. There are common modules at level-2 (127). In FIG. 11, A refers to abstraction, R to reasoning, and I to instruction.

Fault management may consist of event monitoring, event correlation, event-to-alarm mapping, diagnosis and repair of causes of alarms, alarm-to-service mapping, and service level reporting with respect to the repair of high profile and low profile alarms.

Each Cabletron SpectroSERVER (SS) performs those tasks with Spectrum's event correlation mechanism and alarm reporting facilities. This functionality is referred to as intradomain event correlation and alarm reporting, and it occurs at level-0 (125).

With large multidomain enterprises, the requirement now is to perform the same function across domains. For example, an alarm on a failed router in domain 1 may affect applications running in domain 2. Conversely, the cause of an application failure in domain 2 may be identified as the result of an alarm on a failed router in domain 1. We refer to this as interdomain alarm correlation and alarm reporting, and it occurs at level-1 (126).

Thus, processes are operating at three levels of abstraction: (1) event correlation and alarm reporting with respect to individual domains (level-0); (2) alarm-to-service mapping and service reporting with respect to individual domains (level-1); and (3) alarm correlation across multiple domains (level-2). In simple terms, individual SSs have local knowledge and reasoning capabilities with respect to their domains of interest, but do not have global knowledge of the entire enterprise.

Because the physical architecture permits only limited intercommunication among SSs, some other way is needed to perform the interdomain alarm correlation task. Based on the SLM conceptual architecture of FIG. 9, the interdomain alarm correlation task is illustrated as level-2 (127) in FIG. 11.

The bottom-most levels 0 and 1 are performed by SSs that monitor and control individual domains in the enterprise. The agent $A_2$ that resides on the top level-2 collects alarms from multiple SSs and carries out interdomain alarm correlation, communicating with other SS agents on lower levels as appropriate. Note, then that the SS agents may communicate with each other indirectly (and unbeknowingly) via the intermediary agent on the top level-2.

The reasoning paradigm $R_2$ at the top most level-2 may be, for example, a rule-based expert system, a case-based reasoning system, or a state transition graph. Several commercial products that incorporate one or another of these paradigms are available.

For example, MicroMuse (San Francisco, Calif.) provides a product NetCool, which is specially designed to perform the function of the top-most level-2 agent. MicroMuse has integrated NetCool with Spectrum and several other management systems. It is based on a rule-based expert system paradigm, in which a set of rules serves the function of multivendor alarm correlation, alarm triggering, and entering select data into an SLM database.

In addition, Cabletron has a system that integrates Spectrum with NerveCenter available from Seagate Corporation (Los Angeles, Calif.), where NerveCenter is the top-most level-2 agent. NerveCenter uses a state-transition graph paradigm and similarly performs interdomain alarm correlation and triggers actions based on alarms.

Figure 12:
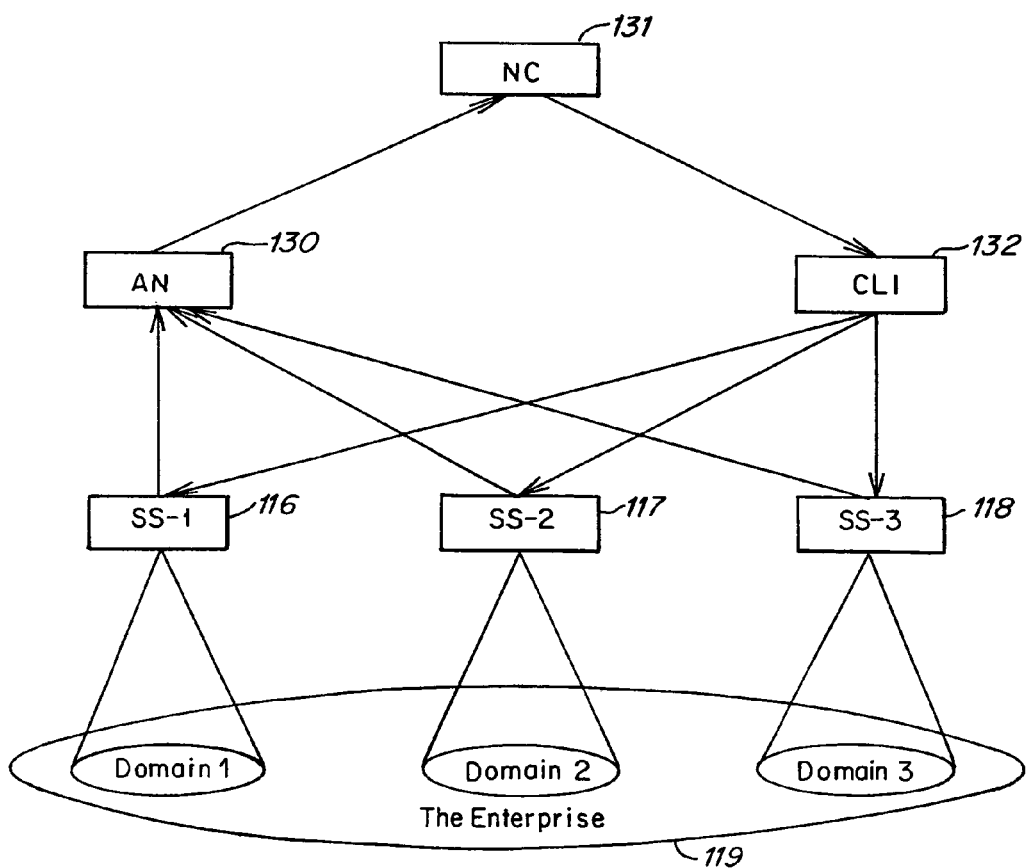
FIG. 12 is an integrated architecture with Spectrum and Nerve Center for multilevel, multi-domain fault management.

A physical integration architecture is illustrated in FIG. 12 (where the SG clients have been left out). The Spectrum alarm notifier (AN) 130 is a client process, referred to as a "daemon", that receives intradomain alarms from all lower level SSs 116-118. The AN can be configured to allow select alarms to be passed to NerveCenter (NC) 131.

NerveCenter performs high-level reasoning over the collection of intradomain alarms, identifying any interdomain alarms. If needed, NerveCenter can communicate with other SS agents via the Spectrum command line interface (CLI) 132. Communications can include a request of certain SSs for further bits of information, a request of certain SGs to display a warning of an imminent failure, and a request of a paging system to contact a repair person.

Another alternative for the top-most agent 131 is Cabletron's SpectroRX, which provides some degree of learning and adaptability. It is an implementation of case-based reasoning. This would thus provide the ability of the top-most agent to learn and adapt itself to new problems given its experience.

It should be understood that any type or number of agent systems may be combined to form an SLM.

Next, the issue of data storage is addressed.

F. Data Warehousing

From prior discussions of enterprise management, it is clear that performance data issuing from several monitoring agents may be collected in a data warehouse. With such historical performance data, one can perform analysis regarding usage trends, configuration modifications to increase performance, strategies for expanding the enterprise, accounting, and service level reporting. In summary, the data warehouse may be used to store information used to perform more deliberative forms of analysis and control.

Figure 13:
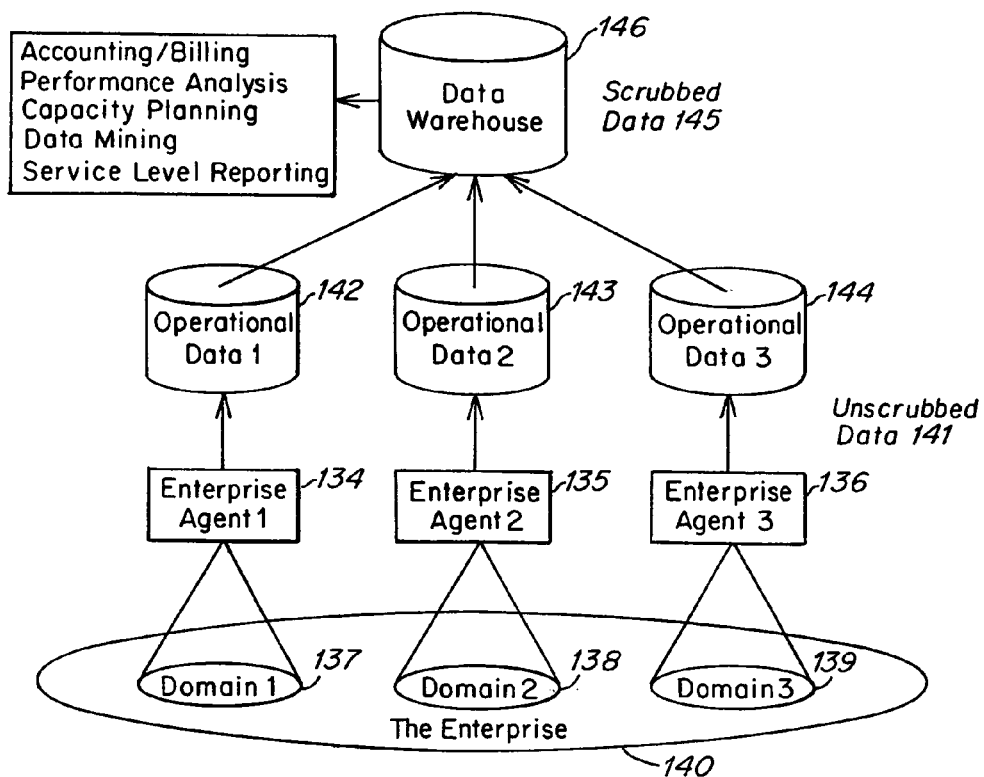
FIG. 13 is a data warehouse scheme with one warehouse.
Figure 14:
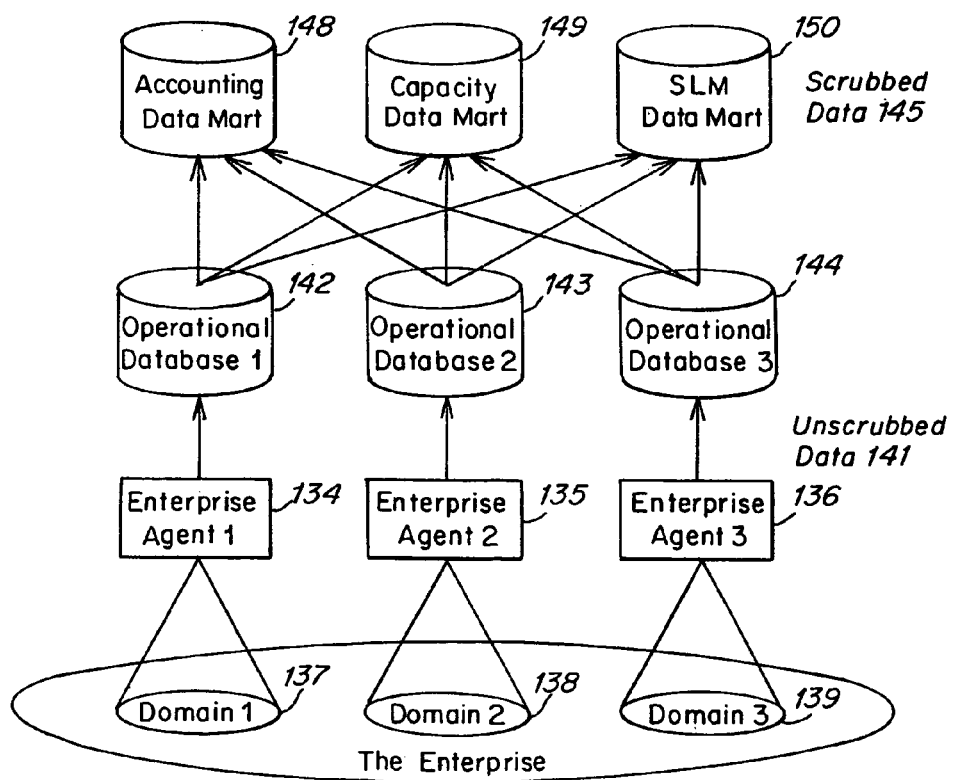
FIG. 14 is a data mart scheme, functionally distributed.
Figure 15:
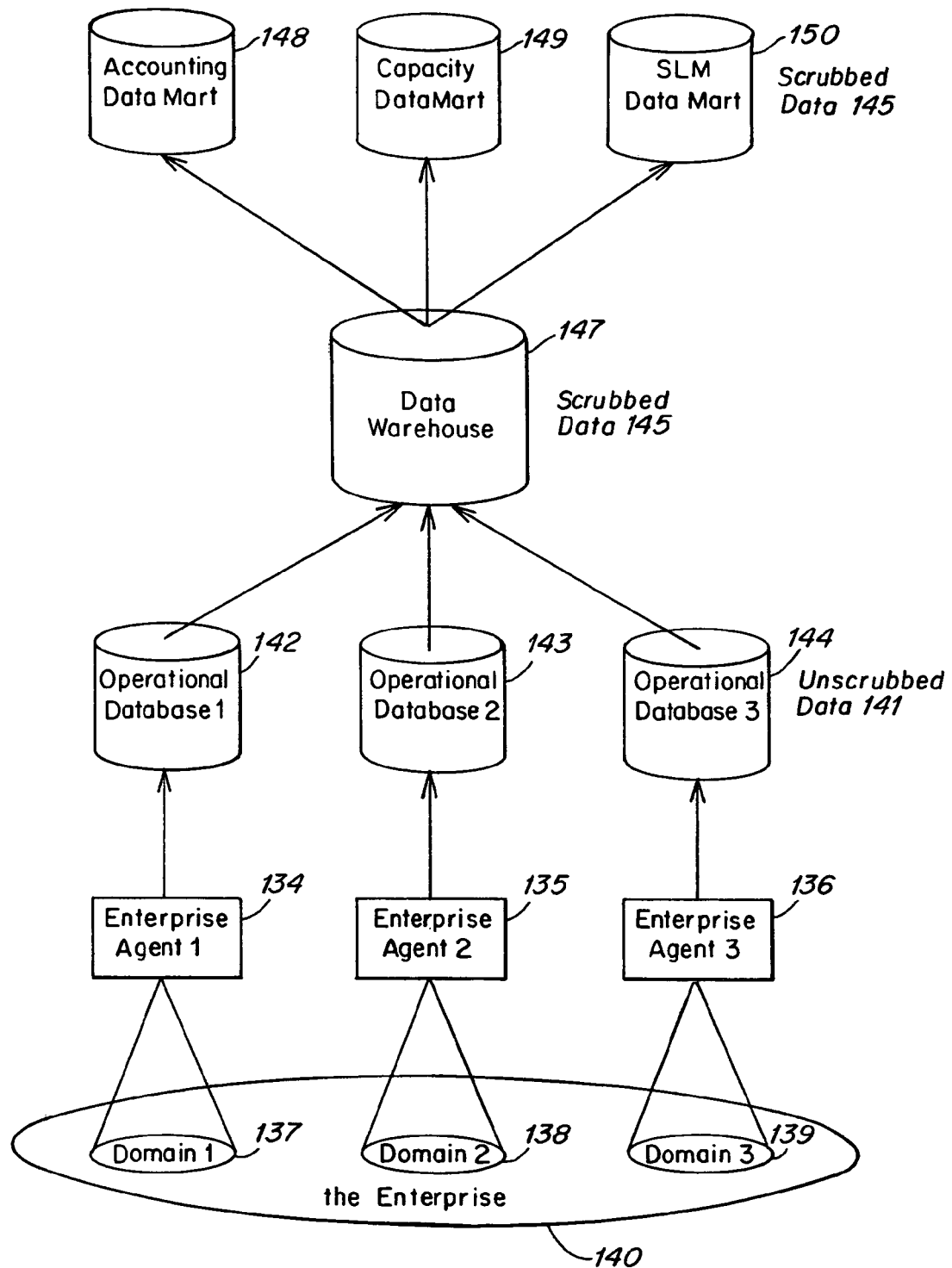
FIG. 15 is a combined data warehouse scheme and a data mart scheme.

Some important concepts in data warehousing are the following:

Operational Data: is data collected at a source, where the source is close to the operation of the enterprise. Examples are monitoring agents such as Spectrum enterprise agents, WinWatch system agents, Patrol application agents, NetScout RMON traffic agents, and special purpose data collection agents. Because operational data is close to the source and is at a low-level of abstraction, it can be used for real-time tasks such as alarming and time-sensitive control. FIGS. 13, 14 and 15 illustrate three enterprise agents 134, 135, 136 that monitor three geographical domains 137, 138, 139 in a large enterprise 140, producing unscrubbed operational data 141 for each domain.

Data Scrubbing: is the process of cleansing operational data in preparation for moving it to a data warehouse. Examples of data scrubbing are (1) replacing a garbage value with null, (2) collapsing duplicated data, and (3) filtering out irrelevant data. FIGS. 13, 14 and 15 illustrate transitions from unscrubbed data (in operational databases 142, 143, 144) to scrubbed data 145 in data warehouses (146, 147) or data marts (148, 149, 150).

Data Warehouse: is the repository where scrubbed data is put. Typically, the data warehouse is implemented in a commercial database system such as Oracle or Microsoft SQL Server. Many data warehouses include reporting facilities and generic algorithmic methods for analyzing the data, for example Crystal reports and datamining algorithms.

Data Mart: is a collection of repositories where scrubbed data is put. Usually, a data mart is generally smaller than a data warehouse and holds specialized data suited for a particular task. For example, a data mart might exist solely for holding accounting data 148, another data mart for holding data to perform capacity analyses 149, and another for holding data for service level reporting 150.

There are a number of schemes by which to distribute data so that it is easily accessible by the right application, with minimal communication and performance costs. One option is to configure enterprise monitoring agents to forward select data directly to special purpose data marts (148-150), as shown in FIG. 14. Another option is to first collect all data in a central warehouse 147 and then distribute it to data marts (148-150) for special purpose tasks, as shown in FIG. 15. Other configurations for storing data may be used.

There are two modes of operation in enterprise management. The first is real-time enterprise management, which is conducted close to data collection sources. It occurs at low levels of abstraction and is performed by monitoring agents. Such tasks include local event correlation, alarming, and time sensitive control of the enterprise processes.

The second mode of operation is off-line enterprise management, which is conducted operationally far from data collection sources. It occurs at higher levels of abstraction and is performed by agents that are less restricted by time-sensitive decision-making. Such tasks include accounting and billing, capacity planning, service level reporting, and general data mining with specific goals in mind.

Generally, real-time agents perform monitoring and controlling functions in the present, while off-line agents support the future. Real-time agents maintain the environment on a daily basis, whereas the off-line agents serve to mature and direct environmental changes for the future.

Clearly, real-time and off-line enterprise management are interdependent. For example, in an SLM methodology, assume the services have been identified, the services have been mapped to components, the SLA is in place, and the component monitoring agents are in place. The agents are monitoring the respective component parameters and passing values to a data warehouse. At the end of each month, the supplier and consumer plan to check the SLM reports against the service agreement.

The supplier would like to know early on whether it is likely that the terms of the SL agreement will be met and whether things can be corrected if it appears that the agreement will be violated. Further, the supplier would like to know immediately if a hard fault occurs that will compromise the agreement. Thus, two important modes of SLM, real-time SLM and off-line SLM, are connected. The former will help ensure the success of the latter.

III. Event-to-Alarm Mapping

A. Multiagent Alarm Correlation Architecture

One aspect of the present invention correlates the alarms generated with respect to different operating characteristics of the network to determine a level of service in the network.

Figure 16:
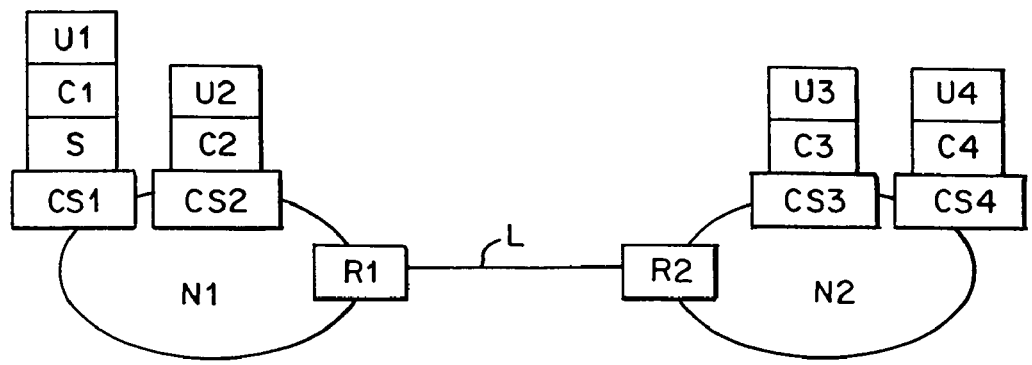
FIG. 16 is a diagram of a simplified enterprise network.

As merely an aid to explanation of the present invention, and not intended to be a limiting example, a simple network will be referenced. As shown in FIG. 16, two networks N1 and N2 are connected by a communications link L. A first router R1 associated with network N1 communicates with a second router R2 associated with network N2 through the communications link L. The two networks, and their respective systems, are together referred to as the enterprise. Two computer systems CS1, CS2, reside on network N1 and two computer systems CS3, CS4 reside on network N2. As an explanatory example, a client/server application, e.g., a database application, that is supported by the network infrastructure and the computer systems is present. Specifically, a database server S resides on computer system CS1 and database clients C1-C4 reside on computer systems CS1-CS4, respectively. The four client applications are Graphical User Interface (GUI) interfaces through which users U1-U4, respectively, interact with database server S.

Figure 17:
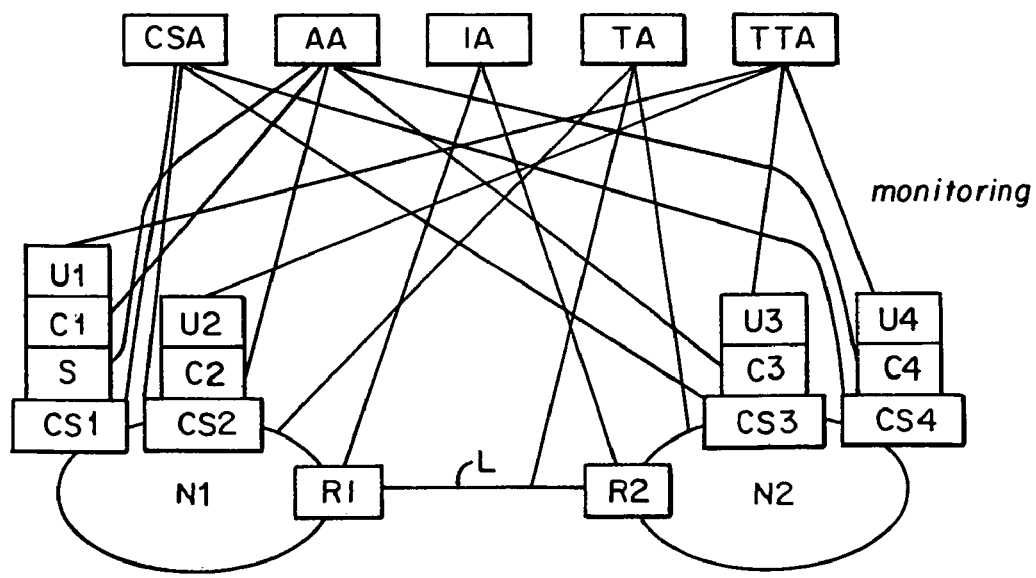
FIG. 17 is similar to FIG. 16 but adds monitoring agents.

As shown in FIG. 17, a network infrastructure agent IA monitors the operation of routers R1, R2. A computer system agent CSA monitors the operations of computer systems CS1-CS4. An applications agent AA monitors database server S and the operation of database clients C1-C4. A traffic agent TA monitors network traffic that flows over networks N1, N2 and over the communications link L. A trouble-ticketing system agent TTA monitors users U1-U4 who depend on the client/server database application. The users log problems in the trouble-ticketing system agent when their database transactions are not operating properly.

Each of the five agents (CSA, AA, IA, TA, TTA) monitors its respective portion or aspect of the operation of the enterprise by detecting events. When an event is detected by any of the agents, a report of this event may be output by the respective agent. For example, if users U3 and U4 report an unacceptably slow behavior of their database transactions, there may be trouble-tickets logged with the trouble-ticketing system agent TTA. Each of these logged trouble-tickets would be reported by the trouble-ticketing system agent TTA as an event.

Figure 18:
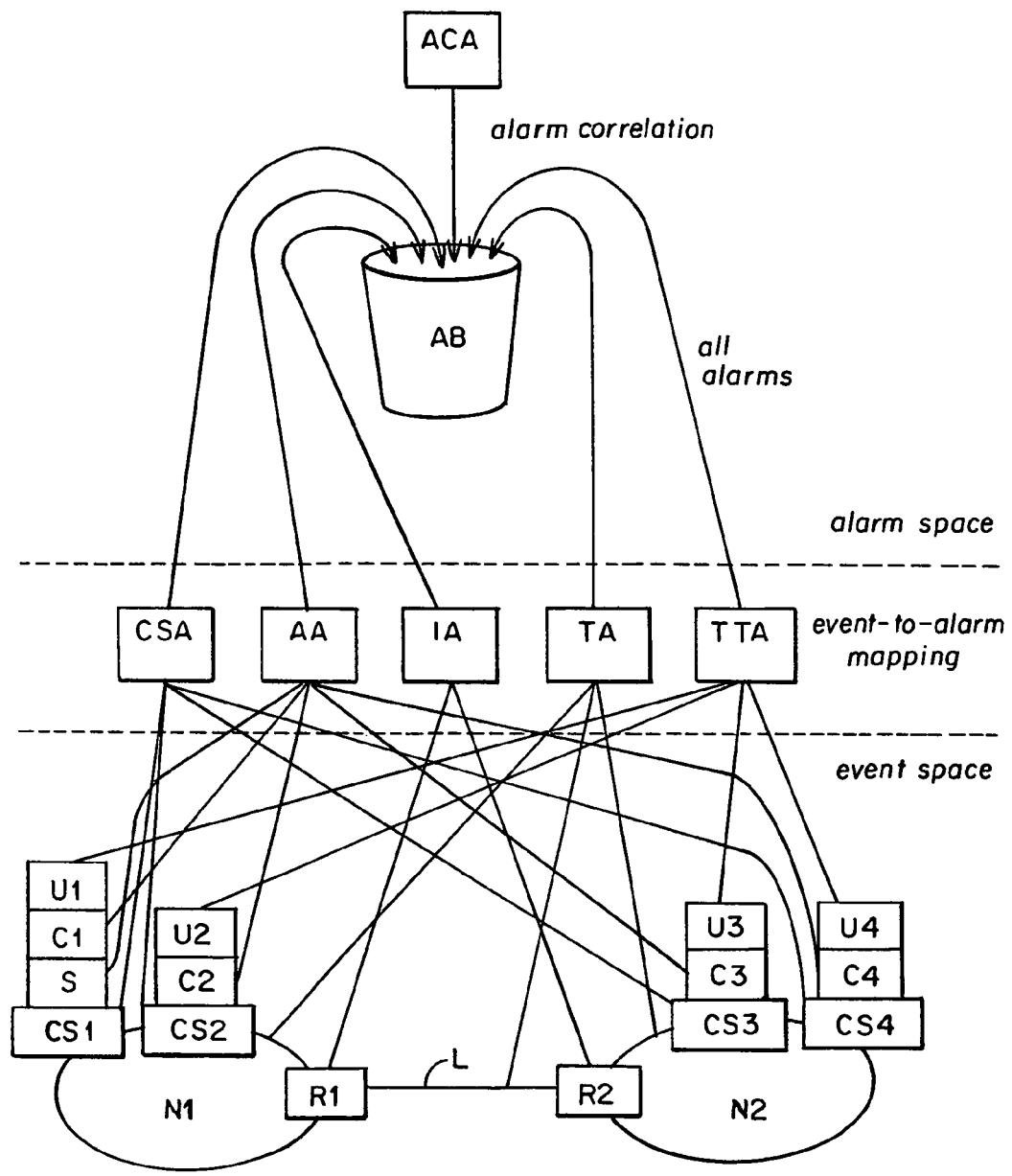
FIG. 18 is similar to FIG. 17 but adds an alarm correlation bucket and differentiates between an event space and an alarm space.

In accordance with one aspect of the present invention, the event correlation over the enterprise is divided into the concepts of event space and alarm space. As shown in FIG. 18, the five agents perform an event-to-alarm mapping function. The resulting alarms are sent to an alarm bucket AB. An alarm correlation agent ACA is provided to analyze the alarms from the alarm bucket AB. The number of items in the alarm bucket AB is considerably less than the number of raw, i.e., unprocessed, events that occur in the enterprise.

Each monitoring agent processes or sifts through its respective detected events and makes a determination about whether or not to issue an alarm with respect to its area of interest in the enterprise's operation. The issued alarms are sent to the alarm bucket AB for correlation with other alarms, which correlation is performed by the alarm correlation agent ACA. The five agents are operating in real-time, although each may also have an off-line component for analyzing historical data. Each agent then may either discard any remaining events or place them in a local archive for subsequent retrieval or processing.

Figure 19:
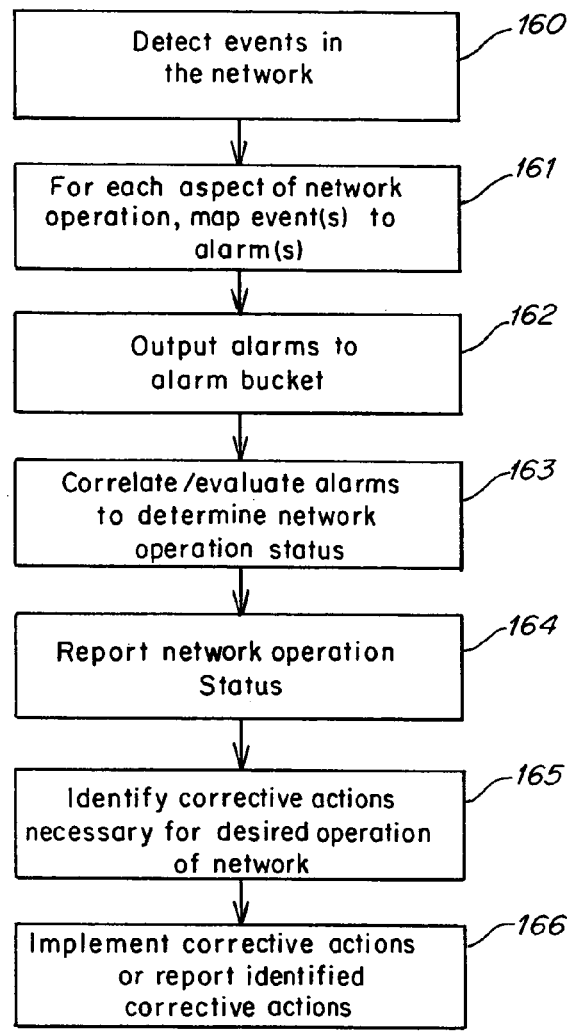
FIGS. 19-20 are flow charts of a method for event to alarm mapping.

Overall operation of the example shown in FIG. 18 will now be described with respect to the flowchart in FIGS. 19-20. In step 160, events in the enterprise network are detected. For each aspect of network operation, one or more events are mapped to one or more alarms, step 161. The alarms are sent or output to the alarm bucket, step 162. The alarms are correlated and evaluated to determine the network operation status, step 163. Optionally, the network operation status may be reported to a network administrator, step 164. The report mechanism may include one or more of: e-mail, paging, and an automated phone call. In step 165, corrective actions that are necessary for operating the network at a desired level of operation, are identified. In step 166, the corrective actions may be implemented, or the proposed corrective actions reported to the network administrator. Depending upon the criticality or nature of the network, it may not be advisable to allow an agent to make changes to the network, without some human supervision. In other cases, automatic controls or responses may be allowed.

Figure 20:
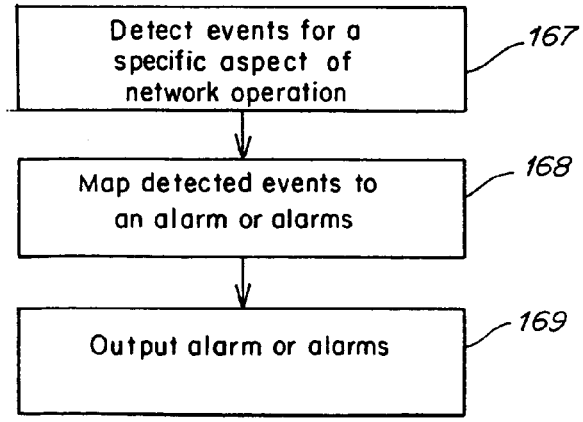

Each of the five monitoring/mapping agents operate generally in accordance with the flowchart as shown in FIG. 20. Events are detected for a specific aspect of network operation, step 167. The detected events, step 168, are mapped to one or more alarms. The one or more alarms are output at step 169 to the alarm bucket. The alarm bucket, or repository, may comprise a file or a location in memory.

Each of the monitoring/mapping agents and the alarm correlation agent may implement its analysis of events or alarms using various reasoning paradigms, such as: rule-based reasoning; model-based reasoning; state-transition graphs; codebooks; case-based reasoning; or some combination thereof.

Rule-based reasoning systems for event correlation are available from BMC Patrol, and Tivoli TME. Model-based reasoning systems are available from Cabletron Systems, Inc. State-transition graph based systems are available from SeaGate. Codebook products are available from SMARTS InCharge (White Plains, N.Y.). Case-based reasoning products are available in Cabletron's SpectroRX system.

Some of these reasoning paradigms are described below in greater detail.

B. Rule-Based Reasoning for Event Correlation

Figure 21:
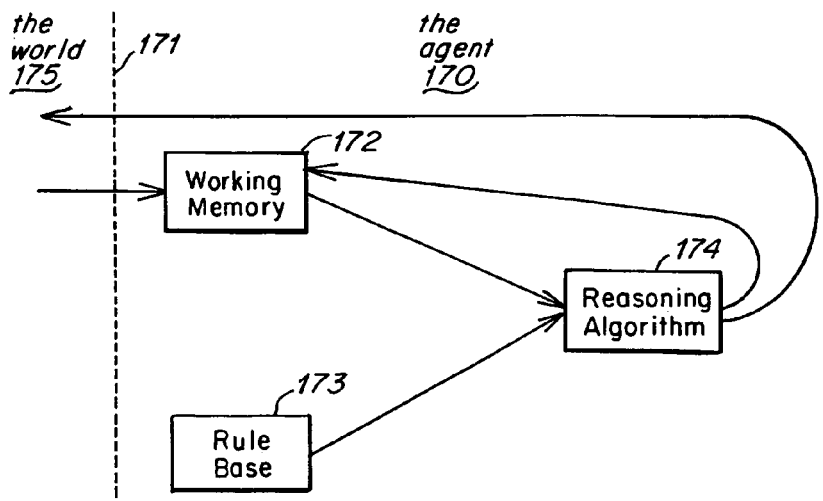
FIG. 21 is a basic structure of a rule-based reasoning system.

Rule-based reasoning (RBR) systems, also known as expert systems, production systems, or blackboard systems, generally consist of three basic parts: a working memory, a rule base, and a reasoning algorithm. The basic structure of an RBR system is illustrated in FIG. 21. In that figure, the RBR system 170 is shown to the right of the dotted line 171, and input from the outside world 175, to the left of line 171.

The working memory 172 consists of facts. The collection of facts may include the sum total of events and facts about the topology of the enterprise.

The rule base 173 represents knowledge about what other facts to infer or what actions to take, given the particular facts in working memory.

The reasoning algorithm 174 (sometimes called an inference engine) is the mechanism that actually makes the inference.

One way to think about the operation of the reasoning algorithm is to recall a classic inference tool in elementary logic:

| | |
|---|---|
| A | A fact in working memory |
| If A then B | A rule in the rule base |
| Therefore, B | An inference made by the reasoning algorithm |

When the antecedent A of the rule "If A then B" matches fact A in the working memory, the rule fires and the directive B is executed. B can be several kinds of directive, such as:

Add a new fact to working memory.

Perform a test on some part of the enterprise and add the result to working memory.

Query a database and add the result to working memory.

Query an agent and add the result to working memory.

Execute a control command on some enterprise component (e.g., reconfigure a router, or prohibit a certain class of traffic over a link or network).

Issue an alarm via some alarm notification medium.

Regardless of the particular directive, after the reasoning algorithm makes a first pass over the working memory in the rule base, the working memory becomes modified with new facts. The modification of the working memory might be a result of the directives, or it might be a result of the monitoring agents that enter new facts in the working memory over time. In either case, on the second pass there might be other rules that fire and offer new directives and therefore new facts, and so on for each subsequent pass.

An RBR system is best applied to a domain that is relatively small, non-changing, and well-understood. For example, it would not be recommended to utilize an RBR agent to sift through a large number of events generated by an enterprise domain. It would be very complex to represent all of these events with rules. Furthermore, if the structure of the enterprise changes, the rule set must be updated accordingly; for this reason, an RBR agent is best used with a relatively non-changing domain.

However, a computer system is a much smaller entity than an enterprise, and it is reasonable to use an RBR system to perform event correlation over this small domain. Many vendors provide RBR-based computer monitoring agents, for example BMC Patrol, Tivoli TME, Computer Associates TNG (Islandia, N.Y.), and Platinum ServerVision. Many of these systems are one-iteration-type systems. The reasoning algorithm periodically makes a pass over the memory and the rule base and checks to see if any event (or set of events) should be escalated to an alarm. Such events include repetitious failures of log-on attempts and thresholds for parameters such as disk space and CPU usage.

In regard to the five monitoring/mapping agents shown in FIG. 18, it would be appropriate to use an RBR agent for at least the CSA, AA, and TA agents.

An RBR agent could also be used for the alarm correlation agent (ACA). The number of alarms received by the ACA is considerably less than the number of raw events. The product NetCool from MicroMuse may be used for this purpose. NetCool is a recipient of alarms from other monitoring systems. Another product that uses the RBR approach is Network Security Manager (NSM) from Intellitactics (Toronto, Canada). NSM uses an RBR method to correlate (1) alarms from monitoring agents; (2) alarms issuing from intrusion detection agents; and (3) alarms issuing from biometric agents (e.g., sensors and smart cards).

C. Model-Based Reasoning for Event Correlation

In a model-based reasoning (MBR) architecture for event correlation, there is a collaborative effort among virtual intelligent models, where the models are software representations of real entities in the enterprise. A "model" in MBR may be analogized to an agent in distributed artificial intelligence, and an object in object-oriented architecture.

Thus, an MBR system represents each component in the enterprise as a model. A model is either (1) a representation of a physical entity (e.g., a hub, router, switch, port, computer system) or (2) a logical entity (e.g., local, metropolitan, or wide area network, a domain, a service, a business process). A model that is a representation of a physical entity is in direct communication with the entity it represents (e.g., via SNMP). A description of a model includes three categories of information: attributes, relations to other models, and behaviors. Examples of attributes for device models are IP address, MAC address, and alarm status. Examples of relations among device models are "connected to," "depends on," "is a kind of," and "is a part of." An example of a behavior is "If I am a server model and I get no response from my real world counterpart after three tries, then I request status from the model to which I am connected and then make a determination about the value of my alarm status attribute."

Event correlation is the result of collaboration among models, i.e., a result of the collective behaviors of all models.

An example of the MBR approach is Spectrum from Cabletron Systems, Inc. and Aprisma Management Technologies. Spectrum contains model types (known as classes in object-oriented terminology) for roughly a thousand types of physical and logical entities, where each model type contains generic attributes, relations, and behaviors that instances of the type would exhibit.

The first thing done after installing Spectrum is to run Spectrum's autodiscovery. Autodiscovery discovers the entities in the enterprise and then fills in the generic characteristics of each model with actual data. As monitoring happens in real time, the models collaborate with respect to their predefined behaviors to realize the event correlation task. [NOTE: In other systems, various autodiscovery type procedures are implemented for creating models/objects of network components; the invention here is not limited to the use of Cabletron's autodiscovery procedure, but is meant to include other discovery procedures within the term autodiscovery.]

Spectrum's MBR approach is suitable for the network infrastructure agent (IA) in FIG. 18. The MBR approach provides models of the enterprise components, and thus there is a natural match between the MBR approach and the structure of the real enterprise system. Generally, a network overseer thinks about an enterprise in terms of its component and structures, rather than a collection of rules.

Also, the task of defining the structure of a model with respect to its attributes, relations to other models, and behaviors, is facilitated by Spectrum's generic model types which exist for a large number of enterprise entities. After running autodiscovery over the enterprise, a subset of those models is instantiated with relevant attributes, relations, and behaviors. If no model type is available, one can use the "is a kind of" relation to embed a new model type in the existing model type hierarchy (in object-oriented terminology, this relation is called inheritance, and the model type hierarchy is analogous to a class hierarchy). Alternatively, one can derive a new model type from a more generic model type, e.g., if a vendor produces a new and improved router, one can derive a new model type from the generic router model type; the derivative model inherits the characteristics of its parent, and one can add new characteristics to the derivative model to distinguish it from its siblings. As a further alternative, one can implement a new model type in C++ code and link it with the existing model type hierarchy.

To avoid excessive computational overhead and improve scalability, one can assign enterprise management agents to individual domains, where domains may be geographical or logical partitions of the enterprise. Another way to alleviate the problem is to configure models to communicate via traps that issue from their real counterparts, as opposed to the overhead incurred by pinging them periodically.

In regard to learning and adaptability, the collaboration among multiple models evolves as new alarm scenarios are faced and resolved. Also, Spectrum's background autodiscovery agent continuously watches for additions of new components in the enterprise. When a new component is detected, Spectrum incorporates a model of the component into the overall enterprise structure and informs an administrator accordingly.

Another way to implement event correlation in Spectrum is to use a product called SpectroWatch. SpectroWatch is a rule-based reasoning (RBR) system, and can be used to formulate rules that describe how events are mapped into alarms. The advantage of this approach is that a GUI guides one through the process.

Also, there are hybrid RBR/MBR systems such as NetExpert developed by OSI in the United States. NetExpert uses classes, objects, attributes and relationships to represent network entities, but implements a rule-based engine to conduct intelligent analysis.

D. Case-Based Reasoning for Event Correlation

The goals of a case-based reasoning (CBR) system are to learn from experience, to offer solutions to novel problems based on experience, and to avoid extensive maintenance.

Figure 22:
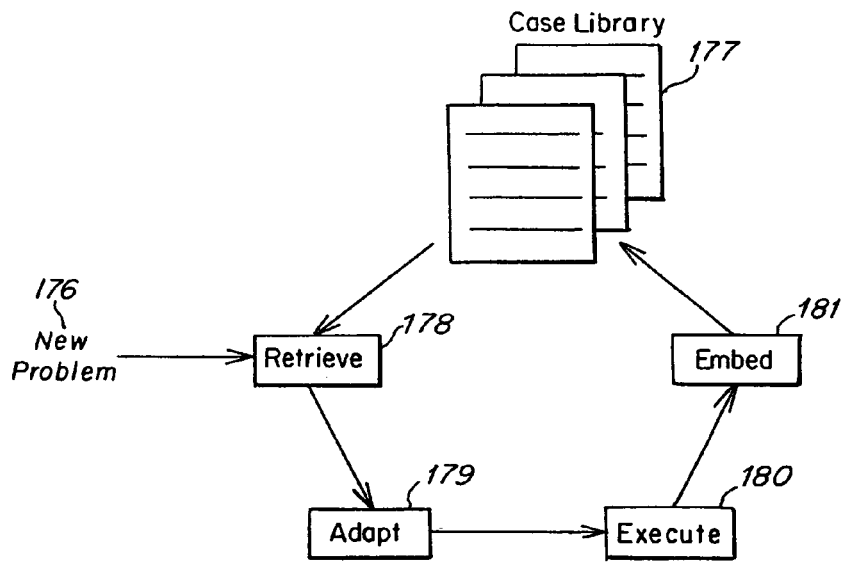
FIG. 22 is a diagram of a general case based reasoning architecture.

The basic idea of CBR is to recall, adapt and execute episodes of former problem solving in an attempt to deal with a current problem. As shown in FIG. 22, former episodes of problem solving are represented as cases in a case library 177. When confronted with a new problem 176, a CBR system retrieves 178 a similar case and tries to adapt 179 the retrieved case in an attempt to solve 180 the outstanding problem. The experience with the proposed solution is then added 181 to the library for future reference.

The general CBR architecture is shown in FIG. 22. Relevance rules may be used to determine which cases to look at, i.e., which cases to retrieve from the case library. As an example of a relevance criteria, the solution to a problem "response time is unacceptable" may be relevant to bandwidth, network load, packet collision rate, and packet deferment rate.

Next, one needs to adapt (modify) a prior solution to fit a new problem. Consider the example problem "response time is unacceptable" and imagine that only one source case is retrieved from the case library. In this example, the resolution is "page_space_increase=A" where A is a value that indicates the amount by which to increase the page space of a server, determined by the function f:

Problem: response time=F
    Solution: A=f(F), page_space_increase=A
    Solution Status: good This method is called parameterized adaptation and is used for adjusting the solution variable of an outstanding problem relative to the problem variable, based on the relation between the solution and problem variables in a source case. Everything else being equal, the outstanding problem "response time=F*" should propose the solution "page_space_increase=A*," where F* and A* stand in the same relation as F and A in the source case. The proposed solution in the outstanding case, therefore, would look like this:

Problem: response time=F*
    Solution: A*=f(F*), page_space_increase=A*
    Solution status: ?

One method to acquire functions like f is to handcraft and test them. An alternative is a look-up table, where values of A not in a table are calculated by interpolation. Also, learning f from existing data in a case library can be looked on as a function approximation problem; this lends itself to neural network methods that are generally good at function approximation, for example, counterpropagation and back-propagation.

Note also that f does not have to be a function per se. For other kinds of problems, f might be a sequence of steps or a decision tree. Suppose a retrieved case holds a simple procedure as follows:

Solution: reboot (device=client 1)

where reboot is a process and client 1 is the value of the variable device. Suppose this case is just like an outstanding case, except that in the outstanding case the value of device is server 1. Thus, the advised solution is:

Solution: reboot (device=server 1)

This method is called adaptation by substitution.

There are several generic CBR systems in the industry, for example, CBR Express from the Inference Corporation (San Francisco, Calif.), and SpectroRX from Cabletron Systems, Inc. As described earlier, Spectrum performs the event correlation task using the MBR method. Once a fault is identified, however, there remains the problem of finding a repair for the fault. Clearly, experience with similar faults is important, and that is the kind of knowledge that SpectroRX allows one to develop.

Referring back to FIG. 18, a CBR-type agent would be appropriate for the TTA agent. For example, the structure of a case is much like the structure of a trouble-ticket, and a case library is much like a trouble-ticket database. In addition, a CBR agent would be an option for representing the reasoning mechanisms for an ACA, CSA, and AA.

E. Distributed Event Correlation

In FIG. 18, each of the five monitoring/mapping agents (CSA, AA, IA, TA, TTA) is monitoring an identifying event from its respective area of interest in the enterprise network, mapping the events to alarms and passing the alarms along to the central alarm bucket AB for processing by the alarm correlation agent ACA. In that embodiment, all of the alarm correlation is being performed by the higher level ACA agent, and the five lower-level (peer) agents are essentially unaware of each other's activities or alarms.

In accordance with another aspect of the invention (see FIG. 23), each of the peer monitoring/mapping agents is in communication with each of the other monitoring/mapping agents. Each such agent may request and receive events and alarm information from its peers.

Figure 23:
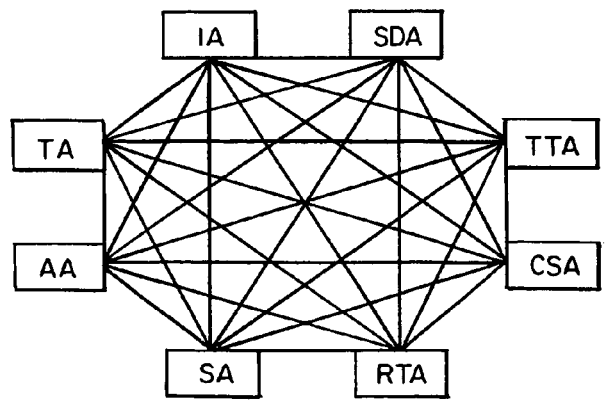
FIG. 23 is a diagram of a distributed management system for service level management.

In FIG. 23, the layer of monitoring/mapping agents in FIG. 18 is presented as a circle of communicating agents, much like a roundtable discussion. In addition, there is a special-purpose agent that measures the application response time (RTA), a software distribution agent (SDA), and a security agent (SA). The lines in FIG. 18 are understood to mean "can communicate with." The management system is fully connected, so that each agent can communicate with any peer agent. The following two examples illustrate circumstances in which agents may exchange alarm information.

As a first example, consider the responsibilities of an SDA. For a Web server farm consisting of hundreds of NT or UNIX servers, it would be expensive to replace or upgrade the operation systems in the applications on each server every time a vendor introduced a newer version. It would be preferable that an agent do that automatically, which is the responsibility of the SDA. Commercially available SDA agents include Novadigm NDS, Metrix, WinWatch, and Microsoft SMS.

Suppose the SDA is in the middle of a large software distribution session over a server farm and a router fails. The SDA raises an alarm about unfinished business and simply stops. The manager of the farm then has to correct the problem and restart the software distribution session from scratch. If the session requires a full day to complete, then significant time and work have been wasted. But suppose that an IA can detect (or predict) a router failure before it has an effect on software distribution. The IA can be configured to send a message to the SDA telling it to suspend work until further notice. Then, when the router comes back online, the IA sends a second message to the SDA telling it to continue where it left off.

As another example, suppose the SDA is ready to initiate a software distribution session. The SDA may send a message to the IA, CSA and TA asking whether there is any reason not to proceed. If no agent is aware of any alarms on any components on which the distribution depends, then the SDA starts the session. Otherwise, the SDA waits an hour and asks the same question again.

In the distributed peer-managed embodiment of FIG. 23, the peer agents may perform all of the required event-to-alarm and alarm correlation, so that a higher level ALA agent is not required. The peer agents would thus perform and have knowledge of the service level management functions. In another embodiment, the peer agents may perform some alarm correlation but still pass up alarms to a higher level ALA (in which case there may be fewer alarms sent up to the ALA).

In the MBR approach, previously described, models of enterprise components confer with each other to perform event correlation. Much the same thing is happening here, but at a higher level of communication. In Spectrum, for example, all the models may "live" inside a single software application; in contrast, here the management applications co-exist and live in a larger system, likely to be distributed over the enterprise.

F. Agent Integration

In the SLM methodology, previously described, one of the activities undertaken by the supplier is to design and implement agent integration. There are several standards bodies and industry consortia that have worked on common protocols and languages by which management agents can communicate. For example, the OMG object-modeling group has selected CORBA, common object request broker architecture, as an implementation mechanism operating between diverse objects in a management system. The CORBA standard includes an interface definition language (IDL) to define the external behavior of agents, specifications for building agent requests dynamically, and an interface dictionary that contains descriptions of all agent interfaces for use in a given system. For further discussion of CORBA, see Ray, P., "Computer Supported Cooperative Work (CSCW)", Englewood Cliffs, N.J., Prentiss-Hall 1999; and Aidorus, A. and Plevyak, T., (editors), "Telecommunications Network Management Into The 21st Century: Techniques, Standards, Technologies, and Applications," New York, IEEE Press, 1994.

Meanwhile, vendors who develop management agents have developed public interfaces through which their agents can receive and request information from other agents.

Consider a simple example in which an analysis model calls for the passing of alarm information from a peer management agent to the Spectrum enterprise agent. Spectrum provides a C++ application programming interface (API). The C++ API was in turn used to develop a command line interface (CLI) in Spectrum. The CLI is a useful tool for implementing an integration based on an analysis model. If the CLI mechanism does not provide the necessary functionality, one can revert to the C++ API. Now, Spectrum is also equipped with a CORBA interface. Thus, there are three mechanisms by which peer agents can communicate with Spectrum.

IV. Display of Service Availability

The ways that ordinary users, business executives, and computer scientists think about a computer networks and information technology (IT), are different. The concept of "service" is one way to bridge the gap among these different mindsets. For example, in the SLM methodology, the services are preferably named and described with simple common-sense language; similarly, the service parameters and service levels are named and described with simple language, i.e., the names and descriptions should be expressed without regard to technical details, but rather they should be expressed with respect to the user's point of view and in the user's language. After the users and business owners are satisfied with the contents of the service level agreement (based upon this use of commonsense language), then the computer scientist determines what network components, and component parameters, may be monitored and controlled to provide the agreed-upon level of service.

For example, suppose there is a distributed service: "cooperative proposal writing and pricing," that depends on a database server, a dozen users who perform specialized transactions over a database, and a distributed document-handling application. One of the service parameters identified in the service level agreement is "availability". To users, availability generally means that their network-based tools will work and not surprise them. Users do not want to try a routine transaction on the database, that worked fine last week, and now find an error message pop up on their screen. This is disrupting to their state of mind, and may preclude completing their work on time.

To such users, it would be desirable for the supplier to provide a display, such as an electronic display or a Web browser display, where the display screen shows which services are accessible by which groups of users and if a problem exists, the expected time of repair. An example of such a display screen 190 is shown in FIG. 24, which is a graphical display in chart form (for a designated date 191) of three services, marked as column headings, and the locations of users (by city and building) as row headings. By making this visual display available to users at all times, the users can determine whether the tools they need are available before starting the task, and utilize their time accordingly. For example, the display indicates that Service 1 in Seattle Building 3 is "Up" (i.e., running), but response time is "Slow". Service 3 in Seattle Building 1 is "Down" (not running), but is expected to be "up at 12 pm" that day. This display is by way of example only, and not meant to be limiting.

In another example, a more technical explanation of service parameters, and detailed description of network components, may be provided to an IT department. The services may be identified more specifically by name, rather than number, and values given of service parameters, such as availability, response time, reliability, security, and integrity (e.g., data corruption). In various embodiments, there may be simply one type of entry, namely the value of a service parameter. In the FIG. 24 embodiment, there are two indicators given, the value of a service parameter and location. In some cases, an additional parameter is provided in parenthesis in FIG. 24. In other embodiments, there may be three or more indicators. For example, the business owners would be interested in the projected cost of a service degradation or failure, which may be included in the service availability display. The business owners may not care about the specific location of the users of that service, and thus in this embodiment that might not be included. For ease of user identification, the services may be identified as for example e-mail, payroll, video conferencing, intercontinental communication, etc. The reported service parameters may be designated by location, class of user, company, department, etc.

V. Component-to-Service Mapping

Component-to-service mapping involves finding a function or procedure that takes component parameters (e.g., device, traffic, system and/or application parameters) as arguments and provides a value for an inferred, higher-level service parameter. In general, one can view the problem as follows:

$$f(P_1, P_2, \ldots, P_n) = S$$

where the Ps are values of low-level component parameters, S is the inferred value of a higher-level service parameter, and f is the function that maps the Ps to S.

Once we have defined S and the acceptable level for S, then we select the Ps and define f. The function f can include common arithmetic operators (plus, minus, division, multiplication, greater than, less than, minimum, maximum, and so on) and Boolean operators (and, or, not, if-then).

As an example, suppose seven components (e.g., three network devices, two systems, and two applications) combine to support a service. Assume there are monitoring agents in place for each of the seven components and the agents can measure the availability of the respective components. It is tempting to say that the state (health) of the service is acceptable if each of the components is available 98% of the time. However, the service could be unavailable 14% of the time (7 components X 2% unavailability). If $A_n$ is the percentage of availability of component n over some period of time, then the (faulty) function that describes this mapping is:

$f(A_1, A_2, A_3, A_4, A_5, A_6, A_7)$=acceptable if $A_1$<98% and
$A_2$<98% and
$A_3$<98% and
$A_4$<98% and
$A_5$<98% and
$A_6$<98% and
$A_7$<98%
else unacceptable One might be inclined to offer the following function in its place:

$f(A_1, A_2, A_3, A_4, A_5, A_6, A_7)$=acceptable if [700−($A_1$+$A_2$+$A_3$+$A_4$+$A_5$+$A_6$+$A_7$)]<2%
else unacceptable However, that function is faulty as well. If each component were available 98% of the time but exactly at the same time, then the 98% availability requirement will have been met. But the function above indicates it was not met. So this function is not right either.

A better function would look at the availability of each component as a time line, where gaps in the line show when the component was unavailable. If one imagines the seven lines superimposed on each other, where gaps override black space, the total availability is 100 minus the gaps (assuming normalization). This type of function is further described in U.S. Pat. No. 6,003,090 issued Dec. 24, 1999, and incorporated herein by reference.

But now one may foresee another problem. Suppose a component (i.e., device, system, or application) was scheduled to be unavailable. One needs to factor that into the function as well. This is done by redefining $A_n$. Earlier $A_n$ was defined as just the availability of element n. Now it is defined as follows:

$A_n = 100 - (UUA_n/SA_n)$

Where $UUA_n$ is a measure of unscheduled unavailability of component n (i.e., real downtime) and $SA_n$ is a measure of scheduled availability of component n.

Now is a more accurate function, albeit at the expense of introducing an extra burden on the monitoring agents. The agents have to know whether unavailability is planned or unplanned.

A. Fuzzy Logic Methodology

Current monitoring agents report values of component parameters such as network load, packet collision rate, packet transmission rate, packet deferment rate, channel acquisition time, file transfer throughput, and application response time. Daemons may be attached to these parameters so that values that exceed a given threshold result in an alarm.

There are graphics tools to display such information in the form of bar graphs, X-Y plots, histograms, and scatter plots. However, there may be a need to interpret those values and alarms in commonsense terms and point to reasons for service degradation. Reasons for such degradations might include an overloaded network link, a router with an insufficient CPU, or an incorrectly adjusted timer for a transmit buffer.

One approach to interpreting these values is to simulate a service with a mathematical model. One can then predict the nature of services by running the model with simulated conditions.

A second approach is to simulate the expertise of a good network troubleshooter. One way to do this is to construct algorithms that translate streams of numeric readings of monitoring agents into meaningful symbols and to provide an interface mechanism over the symbols that captures the knowledge of recognized experts in the troubleshooting field.

One way to represent the requisite knowledge is in an RBR framework. Referring back to FIG. 21, an RBR system consists of a working memory (WM) 172, a knowledge base of rules 173, and a reasoning algorithm 174. The WM typically contains a representation of characteristics of the service, including topological and state information of components that support the service. The knowledge base contains rules that indicate the operations to perform when the service malfunctions.

If a service enters an undesirable state, the reasoning algorithm 174 selects those rules that are applicable to the current situation. A rule can perform tests on enterprise components, query a database, provide directives through a configuration manager, or invoke another RBR system. With those results, the RBR system updates the WM 172 by asserting, modifying, or retracting WM elements. The cycle continues until a desirable state in WM is achieved.

Several variations of the basis RBR paradigm exist. For example, the reasoning algorithm can be enhanced with a belief revision capability. The algorithm keeps a list of rules selected on each cycle and may backtrack to a previous cycle to select an alternative rule if progress is not being made toward a desirable state (assuming no operation has not been performed which cannot be undone). In addition, the rules base can be functionally distributed, and a meta-control strategy provided that selects the component RBR system that should be executed for specific kinds of tasks.

The usual procedure for constructing an RBR system is to (1) define a description language that represents the problem domain, (2) extract expertise from multiple domain experts or troubleshooting documents, and (3) represent the expertise in the RBR format. The procedure can require several iterations of implementation and testing to achieve a correct system. If the domain and the problems encountered remain relatively constant, a correct system needs little maintenance.

FIG. 25 illustrates a set of rules for issuing notices about traffic load on the network link in an enterprise. The function "notice" describes the set of rules below:

notice = alarm if load ≤ 10% alert if 10% < load ≤ 20% ok if 20% < load ≤ 30% alert if 30% < load ≤ 40% alarm if load > 40%

In this example, there is a WM element, load, that is monitored by a traffic monitor. The numeric value of load is compared to the rules at prespecified time increments, and one rule fires to update the value of notice.

In some cases, the reading of a load's value along an interval of length 0.02 could make a big difference, whereas in other cases the reading of a value along an interval length of 9.98 makes no difference. For example, a value of load=9.99 issues an alarm, and a value of 10.01 issues an alert, whereas the values 10.01 and 19.99 both issue an alert. This is so because the rule set describes a function that is discontinuous, as shown in FIG. 25.

This may be acceptable for issuing alerts and alarms. However, in some cases a lack of continuity of the rule set becomes problematic. In those cases, it is preferable to provide a more gradual transition from one state to the next.

This can be accomplished with fuzzy logic. FIG. 26 illustrates the fuzzy concept "heavy". A numeric value of, for example, load less than 25, would have a 0.0 grade of membership in the concept "heavy", a value of 30 would have a 0.5 grade of membership, and a value of 40 would have a 0.9 grade of membership. These degrees of membership quantify the transition from one state to the next.

Figure 27:
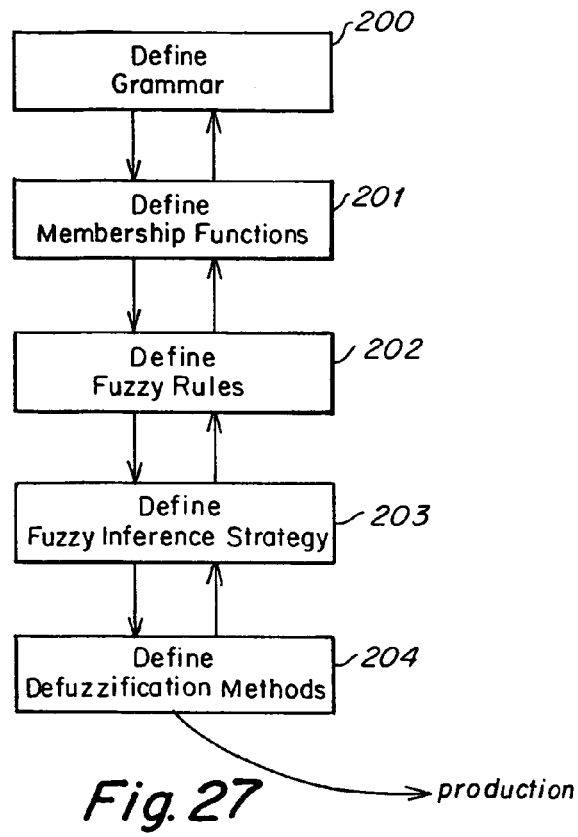
FIG. 27 is a flow diagram for building a fuzzy logic system.

FIG. 27 shows a general engineering methodology for building and fine-tuning a fuzzy logic system. First, one defines a grammar 200 representing (1) input variables from monitoring agents (e.g., load, packet transmission rate, channel acquisition time, availability, and response time) and (2) variables (notices, service health, network load adjustment, and transmit buffer time adjustment). Next one defines membership functions 201 for each concept. Then one defines fuzzy rules 202 that connect input variables and output variables, while the system builders select a fuzzy inference strategy 203. The "defuzzification" 204 uses the same member function to translate commonsense terms back into numeric terms.

An example of a fuzzy rule is:

If load is heavy and file_transfer_throughput is slow then service_health is weak and bandwidth adjustment is small increase.

Figure 28:
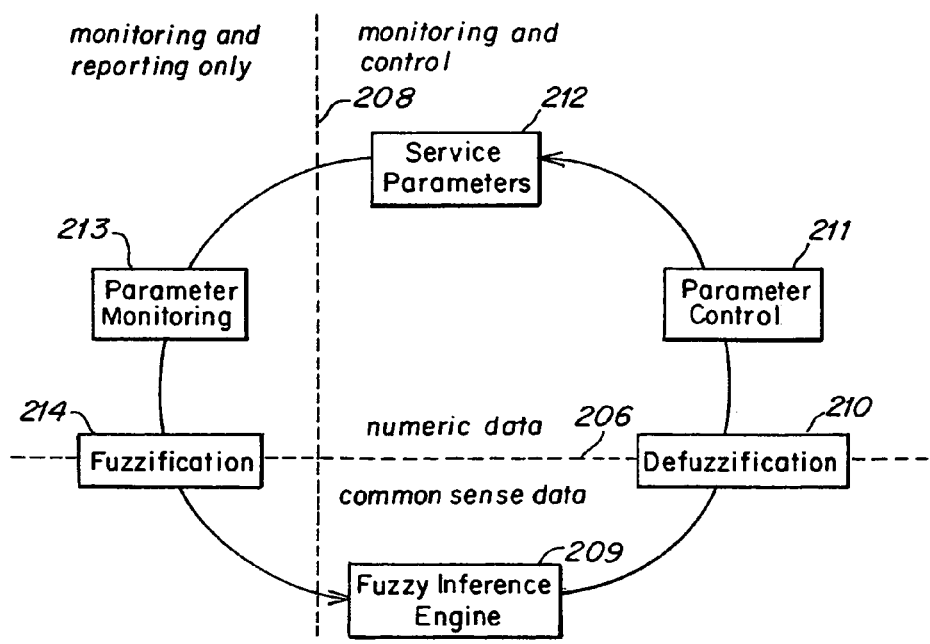
FIG. 28 illustrates an operation of a fuzzy logic system for service management.

FIG. 28 shows the operation of a fuzzy logic system for service management. The horizontal dashed line 206 in the figure shows the separation of numeric data and common sense data. The vertical dashed line 208 indicates a fuzzy system that performs monitoring and reporting only, as opposed to one that also performs service control. In FIG. 28, service parameters 212 are monitored by monitoring the component parameters 213 of which the service parameters are composed. The component parameters' numeric values are subjected to fuzzification 214, translated to common sense data by fuzzy inference engine 209, then subjected to defuzzification 210 whereby they are translated into numeric values for controlling the component parameters 211.

In regard to the fuzzy inference engine 209, all antecedents of fuzzy rules that participate in the "truth" of the input data will fire and thus contribute to the overall solution. Further, an antecedent does not have to be an exact match with the input data.

The output variables of a rule are adjusted relative to the degree of match between the antecedents of the rule and the (fuzzified) input of parameter monitors. The most common fuzzy inference mechanism is called a compositional rule of inference.

For further discussion of the fuzzy logic approach, see Lewis, L., "A Fuzzy Logic Representation Of Knowledge For Detecting/Correcting Network Performance Deficiencies," I. Frisch, M. Malek, and S. Panwar (editors), "Network Management And Control," Vol. 2, New York: Plenum Press, 1994.

VI. Service Analysis

One issue with component-to-service mapping is scaling. This is affected by whether one includes every possible network component that could affect a particular service, i.e., end-to-end SLM, or alternatively, with selective SLM, in which one includes or selects some of the components that could affect a particular service. Those selected components are chosen on the basis that they adequately represent the desired service.

One way to address the scaling issue is to find a way to directly measure a service from the user's point of view. In this regard, data mining algorithms are useful to discover the critical components on which a service depends. For example, if response time is a measure of service, one can compare the measurements of response time to measurements of all other component behavior. In that way, one may find a close correlation between response time and some critical component, or set of components, in the network.

The goal of data mining and enterprise management is to transform large amounts of raw data into information or knowledge that can be comprehended and used by enterprise administrators. For example, the knowledge may take the form of discovering cause-and-effect relationships among components in a system, or being able to discover particular component parameters that distinguish a healthy service from an unhealthy service.

One requirement for a data mining application is to collect and store data that describes the state of the system at regular intervals. The data can include configuration data, events and alarms, and performance data.

The data collected by a set of agents are organized into a time ordered set of parameter vectors. The monitoring agents combine to produce parameter vectors that reflect the state of the system at particular time increments or over an interval of two measurements.

The data mining algorithms discover how other parameters influence the behavior of a selected parameter, which discovery may be referred to as knowledge. Two ways to represent such knowledge include propositional and quantified representations.

In propositional logic, the unit of what one can say is a whole sentence, although one may use the usual Boolean operators to create complex sentences. For example, consider the complex sentence "R4 is an AIX server and R4 resides in domain 1." In propositional logic, that fact can be represented by the statement P and Q, where:

P="R4 is an AIX server"

Q="R4 resides in domain 1"

Figure 29A:
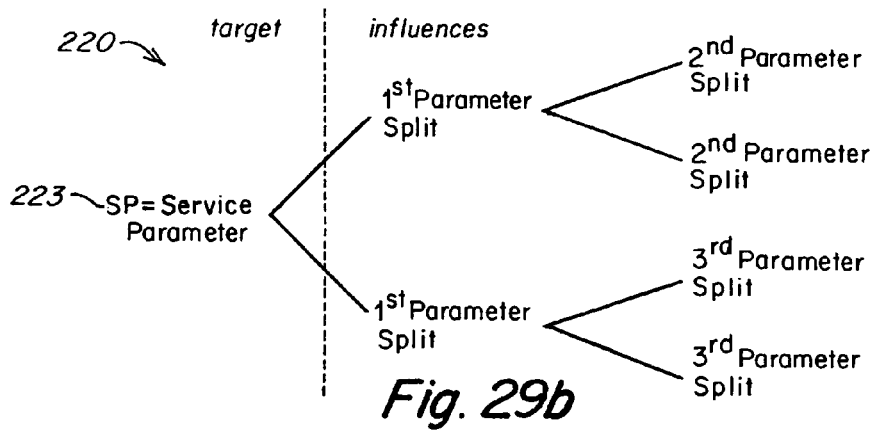
FIG. 29$a$ is a structure of a table and FIG. 29$b$ is a derived decision tree for determining possible influences on a service parameter.
Figure 29B:
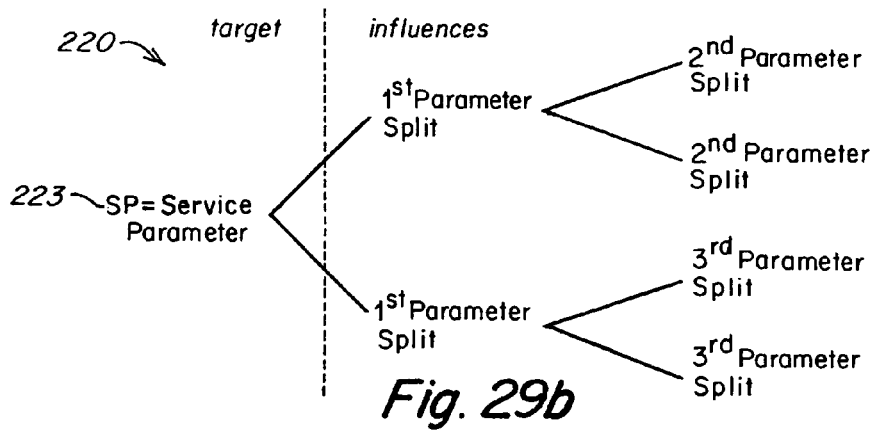

Decision tree algorithms produce propositional knowledge in the form of a decision tree. FIG. 29b shows a decision tree 220 in which each node in the tree is a proposition. The algorithm takes a large table 222 of data 29a as input, in which a service parameter (SP) 224 is marked as the target parameter, and various component parameters 225 that may influence SP are considered (at times t1, t2, t3, etc.). The algorithm produces a decision tree that shows the major influences on SP. By starting at SP 223 at the root of the tree, one can examine important dependencies proceeding towards the leaves of the tree. Popular algorithms of this kind are ID3 (iterative dichotomizing third) and its derivative C4.5.

Top N algorithms produce propositional knowledge as a simple list that shows the top N parameters that are the major influences on the target service parameter, in decreasing order of influence. Unlike decision trees, top N algorithms do not uncover dependencies on multiple influential parameters. Rule induction algorithms produce propositional knowledge in the form of rules that show the dependencies between a target parameter and multiple influential parameters. An example of such a rule is:

if CPU idle time on R4>63%
then response time>2 seconds

This statement is useful. However, if one asks the further question: "Are there other machines for which the rule also holds? Are there classes of machines for which the rule holds? Are there instances of such classes in my enterprise?" The answers to questions like these will be quantified statements, instead of propositional statements. For example:

For all x: If x is an AIX server and
CPU idle time on x>than 63%
then response time>2 seconds Inductive logic programming (ILP) algorithms produce quantified statements by incorporating domain knowledge in addition to knowledge collected in a performance table. Such domain knowledge includes the knowledge of relationships known to hold in the domain of the enterprise, for example, componentwise relations and hierarchical decompositions of components into subcomponents. For example:

R4 is a kind of AIX server
All AIX servers are kinds of UNIX servers
CPU idle time is a parameter of a UNIX server Domain knowledge is used by ILP to infer more general knowledge. The statements of the knowledge discovered by ILP algorithms can include both propositional knowledge and quantified knowledge. For example:

(propositional) If CPU idle time on R4 is . . .
(quantified) If x is an AIX server and CPU idle time on x is . . .

Although statements of the first type are useful, quantified statements of the second type are closer to what we is meant by knowledge. Also, they are more general and thus more useful in diagnosing related enterprise problems.

More specifically, in quantifier logic the units of description are objects and predicates, and one is allowed to make universal and existential statements that range over sets of objects. For example, in quantifier logic the same statement "R4 is an AIX server and R4 resides in domain 1" can be expressed as Kab and Rac (by convention one places a predicate in front of the objects to which it applies), where:

K="is a kind of"
R="resides in"
a="R4"
b="AIX server"
c="domain 1"

Further, in quantifier logic one can express concepts such as "all AIX servers reside in domain 1," and "at least one AIX server resides in domain 1." These two statements express a universally quantified statement and an existentially quantified statement, respectively, and they can be stated in quantifier logic as follows:

For all x; if Kxb then Rxc
There exists an x such that: Kxb and Rxc

Some data mining algorithms discover propositional knowledge, while others discover more general quantified knowledge. Three data mining tools are:

The Adaptive System Management (ASM) tool, developed at Syllogic B.V., which contains the three propositional algorithms described earlier (decision tree, top N, and rule induction).

Progol, developed at Oxford University Computing Laboratory, which is an ILP type system that uses a rule-induction algorithm.

TILDE, developed at the University of Leuven (Belgium), which is an ILP type system that uses a decision tree algorithm.

As an example comparing the results various data mining algorithms to select the most influential parameters affecting a given service, consider a particular service named "spare part tracking and tracing for aircraft," or SPT for short. The SPT service depends on several IBM AIX servers, an Oracle database, and Windows PC clients situated in Amsterdam, Singapore and New York.

Monitoring agents are in place to collect the values of 250 parameters at regular intervals. Examples of parameter types are CPU load, free memory, database reads, and nfs activity. The agents perform a read every fifteen minutes and store the values in a data warehouse. The SPT service was monitored for two months, resulting in a table of 3,749 vectors, where each vector consists of 250 parameters.

SPT performance was measured by simulating a generic transaction on the Oracle database and recording the response time of the transaction. The performance measure was declared as the pivotal measure in an SLA agreement between the IT department and the users of the SPT. The determinator of good and bad performance of the SPT is governed by the test RT>3 seconds. That means an SPT user should never have to wait more than three seconds before receiving the results of the transaction.

Figure 30:
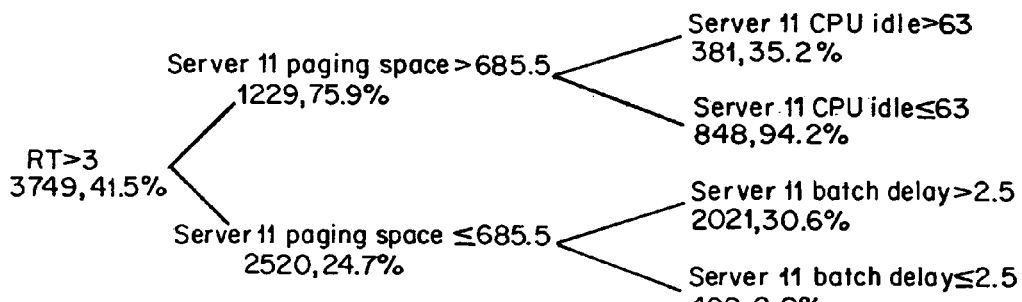
FIG. 30 is a multi-parameter decision tree produced according to a decision tree algorithm.

First, consider the results of the propositional algorithms in ASM. FIG. 30 shows the results of the decision tree algorithm. The most influential parameter is "Server 11 paging space." The tree indicates that a high value of that parameter is the main influence on RT>3.

Increasing the amount of physical memory or limiting the number of applications that run on Server 11 can reduce the amount of used paging space. The next split on "Server 11 CPU idle" gives additional evidence for the fact that Server 11 needs to be upgraded or restricted to fewer applications.

Note the path from "RT>3" to "Server 11 paging space≦685.5" is 24.7% of the cases. The next parameter in the path, "Server 11 batch delay", measures the delay on scheduled jobs experienced by Server 11. Mainframe requests are sent ("in batch") to a database that is accessed by Server 11 and then processed by Server 11. The split on "batch delay" suggests that if Server 11 is more than 2.5 minutes late in processing the batch file, SPT performance drops.

A seasoned troubleshooter who tries to make sense of that information might reason as follows: First, the network could be down, causing the mainframe to fail when it tries to send requests to database, while at the same time causing Server 11 to time out because the query is performed over the network. Second, Server 11 could be wasting CPU cycles trying to retrieve a file that is not yet there, because the mainframe application has not yet put it there. In any case, the split on "Server 11 batch delay" indicates that the way Server 11 works with the mainframe should be improved.

If one compares the results of ASM's Top N algorithm on the same data, showing the top parameters that influence RT>3:

Server 11 paging space>685.5 MB
Client 6 ping time>258.5 ms
Server 5 CPU idle<74.5%

The parameter "Server 11 paging space" corroborates the results of the decision tree algorithm.

The parameter "Client 6 ping time" is the ping time to a foreign router. It indicates that if the ping time exceeds 258.5 ms, then RT>3 is likely to be true. A system manager may reason that that fact may be related to foreign users who load complete tables from the database to their client. Because a table can be very big, and the network connections to foreign countries have narrow bandwidth, both ping time and SPT behavior can be affected.

The parameter "Server 5 CPU idle<74.5" is an influence on RT>3, but to a lesser extent from the first two parameters. More important, observe that "Server 11 CPU idle<63" in FIG. 30 is also a strong partial influence on RT>3.

Next compare the results of an ILP algorithm used in TILDE. Recall that ILP type systems utilize a domain model to discover quantified knowledge.

Because ILP algorithms are CPU intensive, one can compensate by transforming the values in the original performance table into a table of binary values. The loss of information in this preprocessing step is a simplifying assumption.

Figure 31:
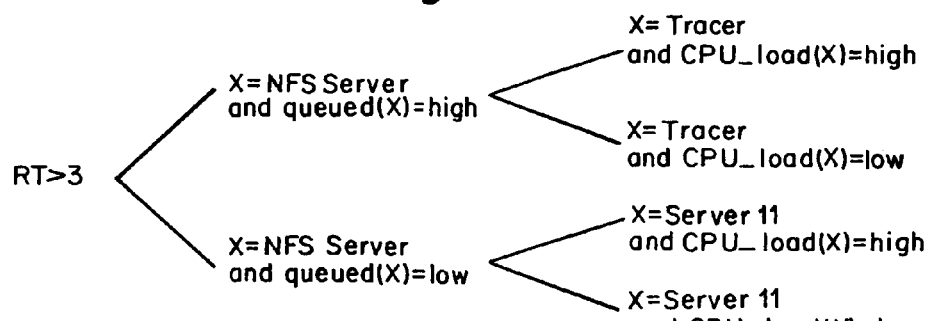
FIG. 31 is a decision tree produced according to a Tilde data mining algorithm.

TILDE produced the decision tree in FIG. 31. The joint parameters "X=NFS Server" and "queued (X)" have the greatest impact on RT>3. Both Tracer and Server 11 are instances of an NFS server. Note that in the lower path where "queued (X)=low" for the class "NFS server," TILDE splits on "CPU_load (X) for Server 11. One can interpret that to mean that high activity on Server 11 is the main influence on RT>3.

Recall that from the ASM propositional approach it was concluded that memory problems or application overloading on Server 11 were the main influences on the SPT service. Here there is something similar. When NFS activity on Server 11 is low, high CPU activity on Server 11 is the main bottleneck. One can identify the situation with Server 11 as a swapping problem. The machine has low NFS activity but is swapping memory, causing high CPU activity. Again, the conclusion is that Server 11 needs more memory or that the number of applications on this server should be restricted.

Thus, data mining techniques are useful to analyze archived data to understand the causes that affect the behavior of SLA performance metrics (service parameters).

VII. Service Agreement

The following service parameters may be included in an embodiment of a service level agreement, for example where the service is providing EC (commerce)—a Web site:
availability: customers want their Web sites to be available at all times.
quick response time: customers do not want their customers to experience excessive slowness when retrieving information or moving around screens at the site.
security: customers want to be assured that no intruders (e.g., competitors) can sabotage their Web sites, and they want to be assured of secured transactions with respect to personal information such as credit card numbers.
integrity: customers want the words and the pictures on their screen to be clear, and they want the information to be accurate and up-to-date.

Performance metrics (service parameters) for SLAs would typically be based on Web availability to the Internet and measurements of site access times. Availability here may be defined as the total minutes that the Web server is actually available to the public. Access time may be measured on a regional basis using benchmarking methods.

With recent networking technologies such as packet marking, differential services, and switched networks, electronic commerce providers are able to offer different levels (grades) of service in each of those categories, and customers can choose their preferences. If customers want 100% availability, optimal response time, and maximal security and integrity, they would pay more. Otherwise, they would pay less.

FIG. 32 shows a sample form 230 for specifying an SLA. The form provides a calendar, and each day of the month is divided into four, six-hour blocks. A customer marks the blocks with certain grades of availability (90-100%), certain grades of response time (2-5 seconds), and certain grades of security (low, medium, or high). There is a default category at the bottom of the form that applies unless the calendar is marked otherwise.

The EC provider may set variable prices. For example, during the month of December, 100% availability costs x$, 99% costs y$, and so on. During a major TV event, the provider may increase the price.

A customer can manipulate the calendar with respect to various service grades to see what the costs will be. The total cost is updated as the customer marks the calendar. The customer can send (via the Internet) the contract to the EC provider for approval, or cancel out.

The monthly bill depends on the extent to which the service agreement is met or violated. For example, 100% availability is hard to achieve. If an agreement specifies 100% availability for an entire month and the provider demonstrates that the server has been available 100%, the supplier may receive a bonus of x$ in addition to the regular fee. If the agreement is not met, the provider may be penalized. The provider can publicize such policies in the "policies" section of the Agreement.

VIII. SLM for Electronic Commerce, an Example

SLA management is crucial for electronic commerce (EC). Companies have to be convinced that their customers are not having problems accessing and using their Web sites. Further, decisions regarding operational activities, expenditures, and capital investment are measured against the existing and anticipated SLA compliance reports.

The following is an example of specific requirements for SLA management:
Report on service availability as determined by polling the service port (e.g., HTTP, FTP, SMTP POP3, SSL) at regular intervals to determine total time in minutes that service is not available during a given period of time;
Capture and report file backup and restoration activities and status per machine for some given period;
Calculate average data rate, in megabytes per hour, that files were restored from backup, where the start time is the time of the initial request and the stop time is the time that file restore was completed;
Measure and report response time and problem fix time for each incident by the customer and determine if the SLA requirement was met based on the customer SLA;
Capture and report, at defined SLA intervals, key systems performance data (CPU, memory, disk space, and others as required) and present the maximum, minimum, and average utilization for each measure for a given period of time;
Create consolidated SLA reports that encompass all elements of a customer's agreement;
Capture and report network bandwidth utilization and other network and systems utilization data required for billing purposes;
Monitor real-time events, make real-time SLA compliance risk assessments, and provide operations with a warning when an SLA metric is at risk of being violated.

Figure 33:
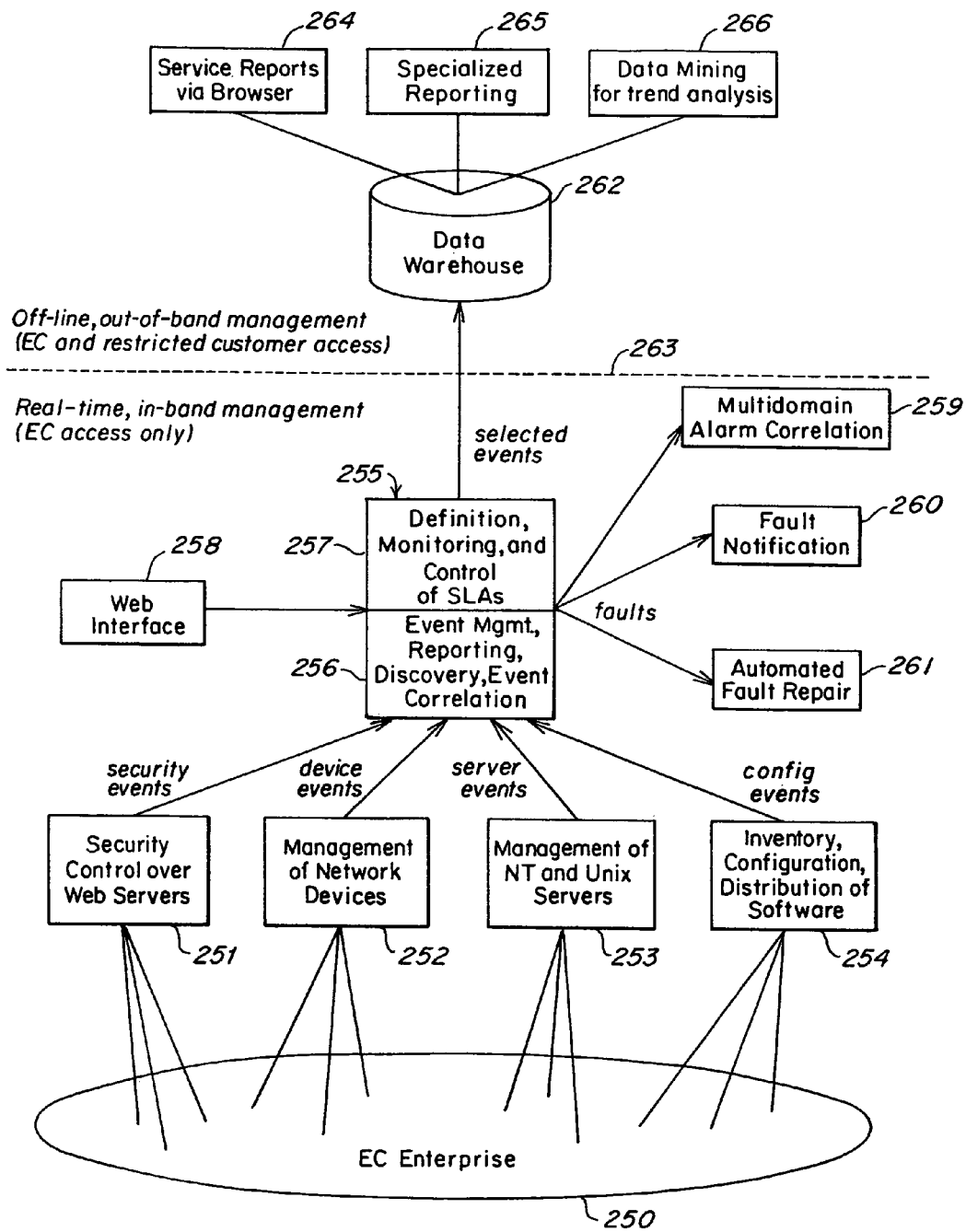
FIG. 33 is a conceptual SLM architecture for an electronic commerce business.
Figure 38:
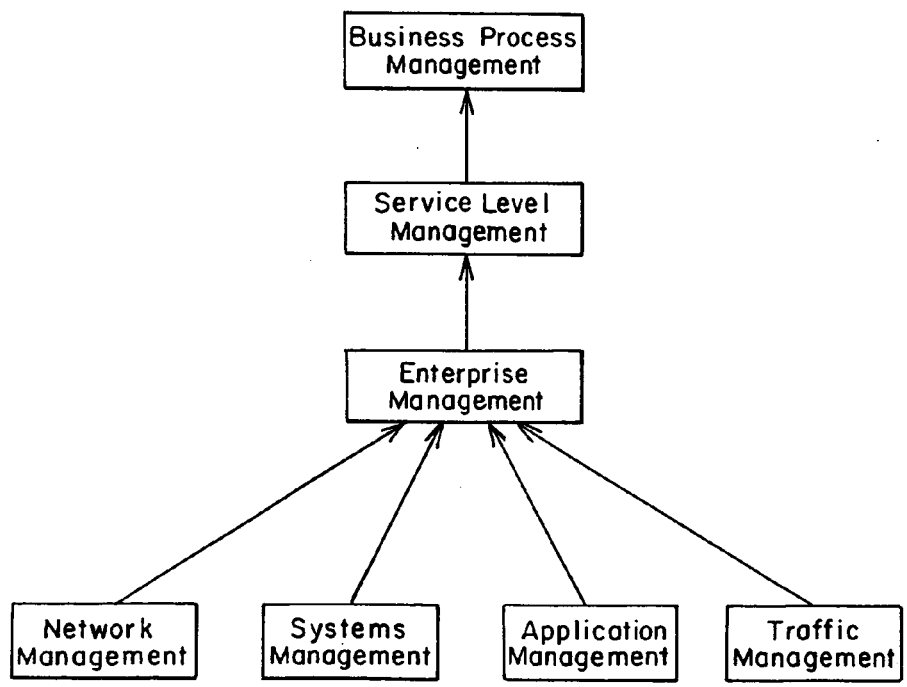
FIG. 38 is a conceptual SLM architecture.

FIG. 33 shows a conceptual SLM enterprise architecture for an EC business. This architecture is best understood by reviewing:

FIG. 38 which shows a basic SLM conceptual architecture;
FIGS. 12-14 which show alternative schemes for data warehousing;
FIG. 9 which shows an enhanced multilevel SLM architecture;
FIG. 11 which shows an architecture for distributed domains; and
FIG. 18 which shows distributed event correlation over multiple monitoring agents.

Thus, FIG. 33 may be considered a compilation of various aspects of these prior figures.

More specifically, at the bottom of FIG. 33 is an enclosed area representing the EC enterprise network 250. There are four monitoring agents 251-254 which communicate with the enterprise network, and supply events to the common central box 255, which includes an agent 256 designated for "event management, reporting, discovery, and event correlation." The four agents provide:

security control over Web servers 251, which report security events.
management of network devices 252, which reports device events.
management of NT and Unix servers 253, which report server events.
inventory, configuration, distribution of software 254, which reports configuration events.

Also included in the central box is an agent 257 for "definition, monitoring, and control of SLAs." In addition to receiving event reports from the monitoring agents, the central box also receives input from Web interface 258. The central box outputs faults to three agents, one for a multidomain alarm correlation 259, one for fault notification 260, and a third for automated fault repair 261. The central box 255 also outputs selected events up to the data warehouse 262.

All of the elements shown in FIG. 33 below the dashed line 263 operate in real-time, in-band management. Access is restricted to the EC business only. Above the dashed line 263 is the data warehouse 262 which receives the selected events, (i.e., scrubbed data). Three agents communicate with the data warehouse, a first agent for service reports via browser 264, a second agent for specialized reporting 265, and a third agent for data mining for trend analysis 266. Above the dashed line 263, the mode of operation is off-line, out-of-band management. It is accessible by the EC business and allows restricted customer access.

Figure 34:
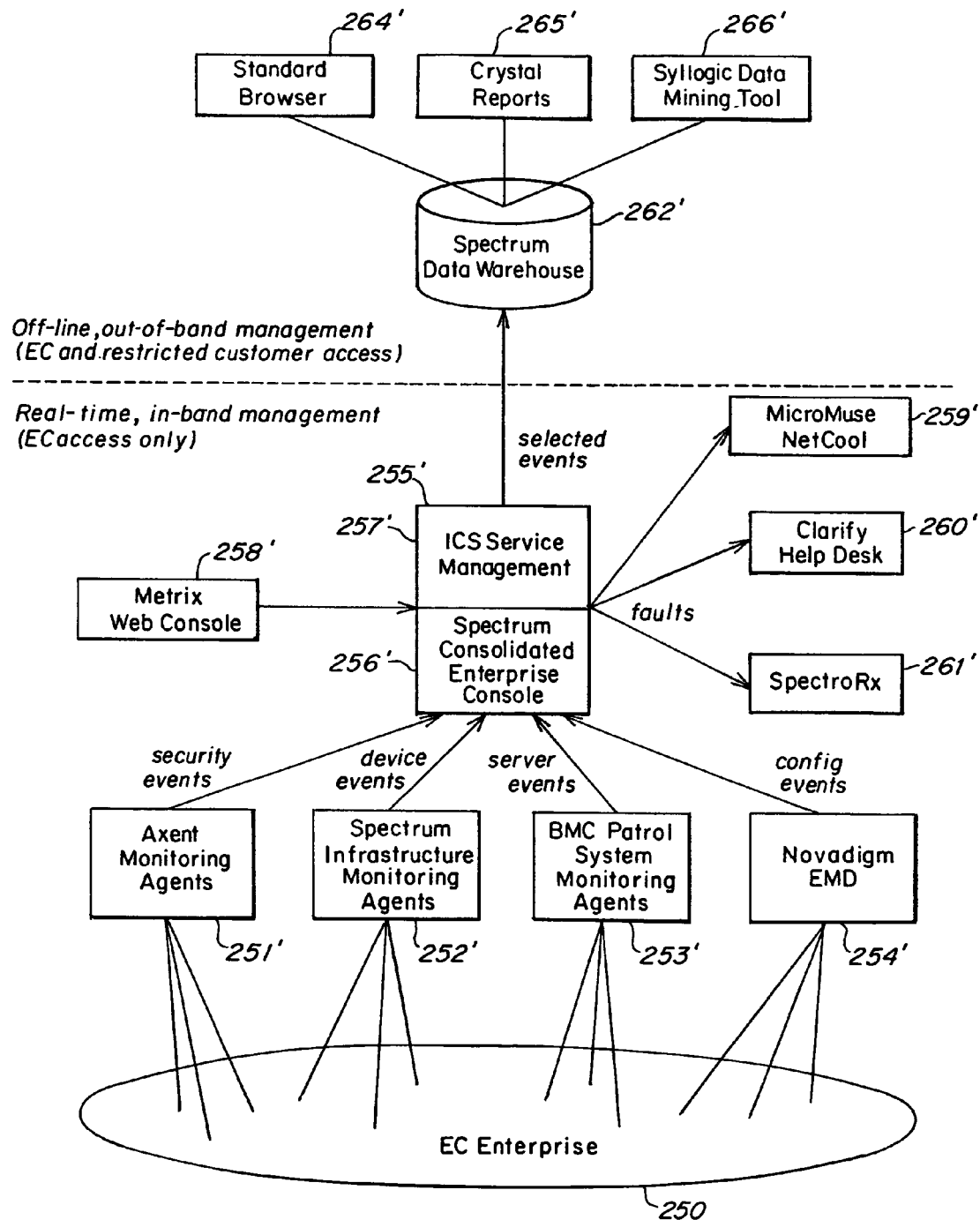
FIG. 34 is a physical architecture applied to FIG. 33.

The conceptual architecture shown in FIG. 33 can be implemented by the physical architecture shown in FIG. 34, where like elements are referenced by primed reference numbers, i.e., 251 becomes 251'. The tools referred to therein have been previously described, and/or are commercially available.

Figure 35:
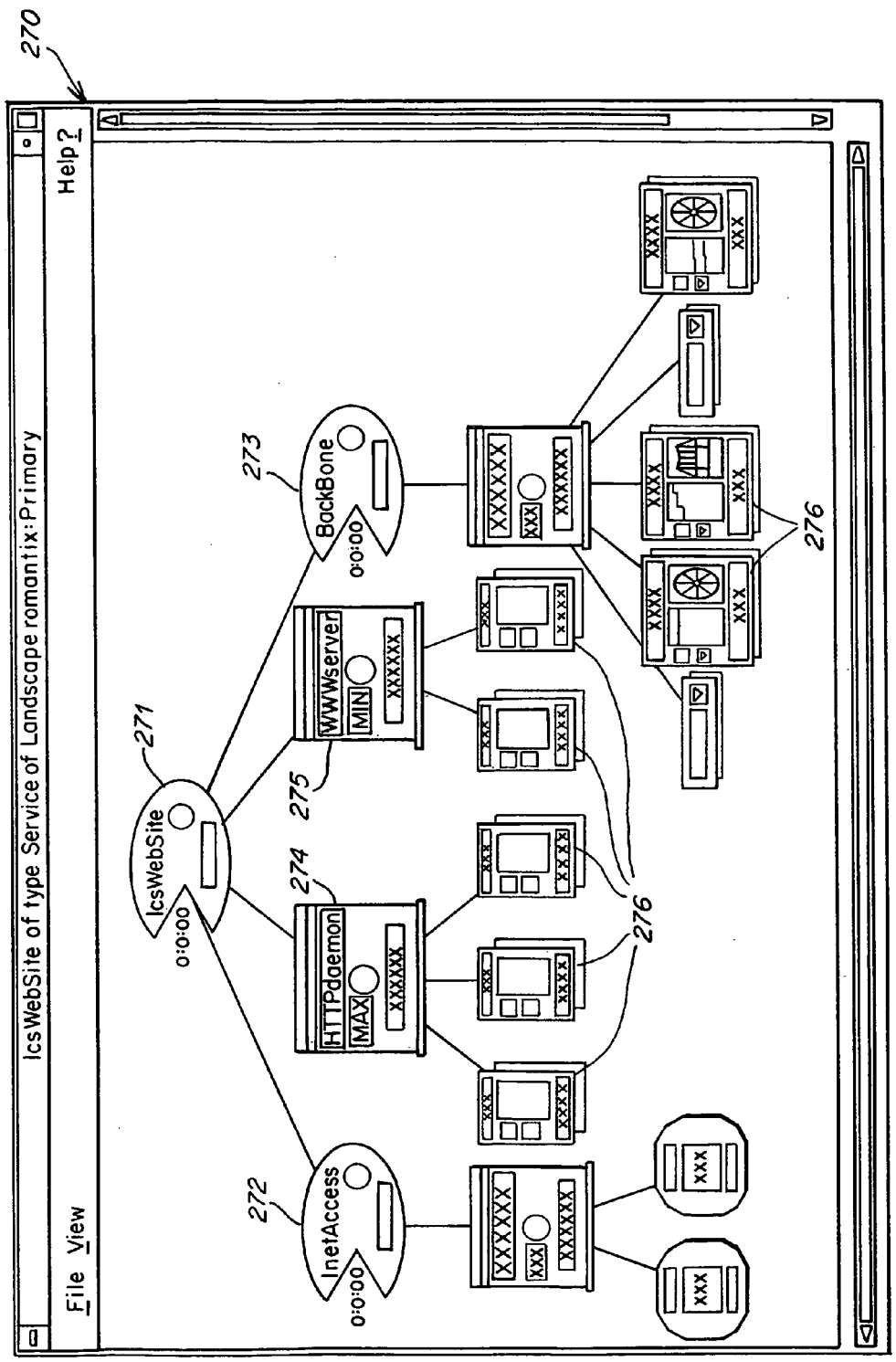
FIG. 35 is a graphical user interface screen shot of a service decomposed into supporting network devices, computer systems and applications.

The central box 55 is a consolidated enterprise console, which provides a high level view of the enterprise from a single console. It provides the means to display various categories of information which support each department in a business organization. It also provides the means to launch the tools required to manage specific parts of the enterprise. Specific requirements for the EMS console may include:

Support alarm filtering;
Provide both traditional GUI interfaces and Web interfaces;
Object-oriented GUI (i.e., elements in the GUI are manipulated in the same manner regardless of type);
Support for hierarchical topology maps;
Provide GUI context information that can be passed on a command line to launch other applications;
Programmable command execution buttons;
Support multiple profiles and configurations by user logon;
Provide logon security for controlling and limiting scope of activity for each operator;
Provide appropriate security controls to allow client access to view their own systems Finally, FIG. 35 shows a simple Spectrum/ICS screen shot 270 of a service decomposed into supporting network devices, computer systems, and applications. The three icons 271, 272, 273 at the top of the hierarchy represent services. The ICS Web site service 271 is decomposed into two subservices (Internet access 272 and the backbone 273), an HTTP daemon 274, and a Web server 275. The light colored icons 276 represent low-level enterprise elements.

Figure 36:
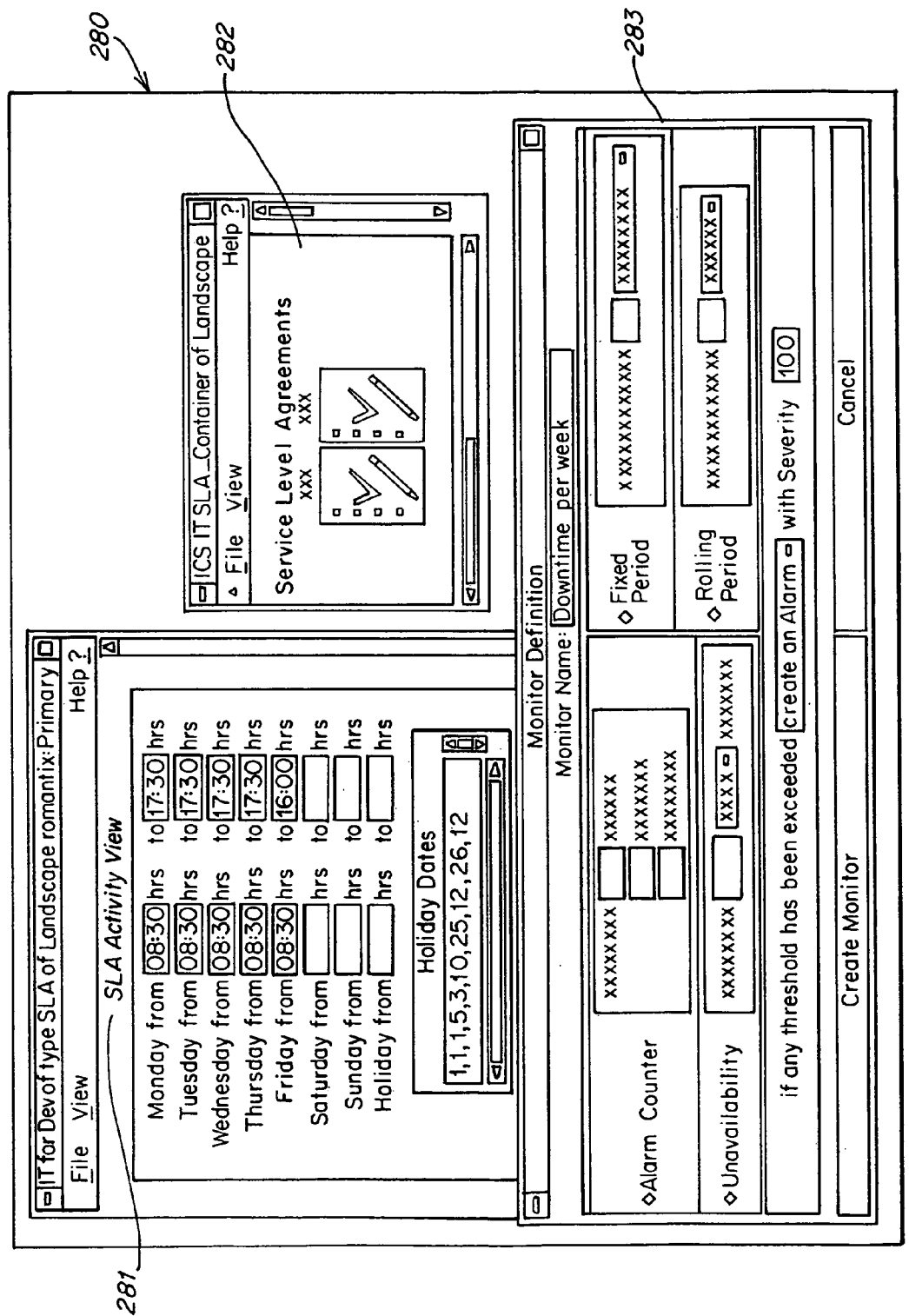
FIG. 36 is a GUI display of a service level agreement.

The pull down view menu at the top of FIG. 35 contains a list of possible views and actions (not shown) that can be executed from this console. In addition, the user can click on a particular component and see a list of actions specific to the component. For example, suppose a BMC patrol agent detects a fault in a server, which in turn affects the service. In this case, both icons might turn red, indicating an alarm. On the basis of the alarm, one can pick an action in the view menu that will generate a corresponding trouble ticket in the Clarify help desk, or it may pass surrounding information to Spectro RX to find an explanation and repair procedure, or it may navigate to a detailed BMC view of the culprit server. The user can click on a service icon to view or modify the SLA for the service. FIG. 36 shows the invocation of an SLA. The screen display 280 includes SLA Activity View 281, Service Level Agreements 282, and Monitor Definition 283.

In regard to the integration architectures and methods, one can visit the Web sites of the companies referenced. Many vendors have their product manuals on the Web. For example, one can visit www.cabletron.com to get a copy of the Spectrum guide to integrated applications. The guide discusses several generic classes of integrations, case studies, and samples of integration code. To see methods for integrating EMS and problem ticket systems, see L. Lewis: "Managing Computer Networks: A Case-Based Reasoning Approach", Norwood M.A.: Artech House, 1995.

Figure 37:
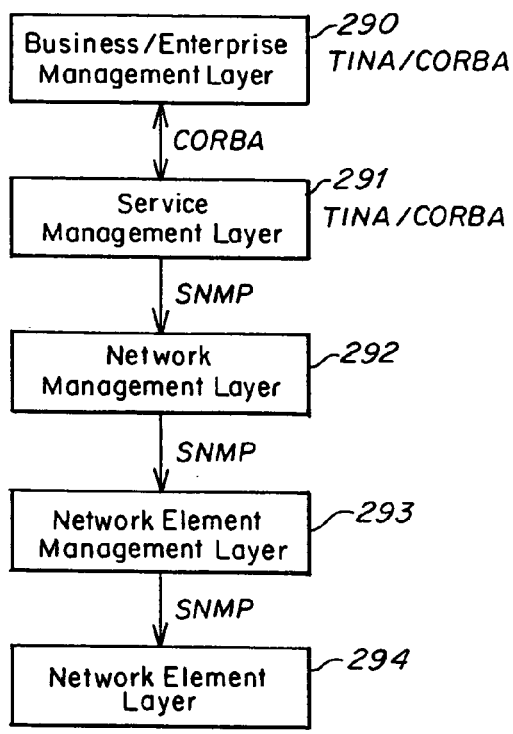
FIG. 37 is a five-layer model for integrated management.

The web sites of vendors referenced herein include:
www.ics.de
www.micromuse.com
www.novadigm.com
www.bmc.com
www.axent.com
www.metrix.lu
www.seagatesoftware.com
www.syllogic.com
www.clarify.com
www.tivoli.com
www.platinum.com
vvww.netiq.com IX. Integrated Management, an Example FIG. 37 shows a possible configuration for integrated management of a multilayer SLM architecture.

This five-layer model is based on a Telecommunications Management Network (TMN) model provided by the ITU-T. This model has received general acceptance in both standards communities and industries.

In this model, management tasks are defined over five layers:

The business/enterprise management layer 290 is concerned with the overall management of the business. It covers aspects relating to business processes and strategic business planning. Further, it seeks to capture information to determine whether business objectives and policies are being met.

The service management layer 291 is concerned with the management of services provided by a service provider to a customer or other service provider. Examples of such services include billing, order processing, and trouble-ticket handling.

The network management layer 292 is concerned with a network with multiple elements. As such, it supports network monitoring and remote configurations. In addition, this layer supports issues such as bandwidth control, performance, quality of service, end-to-end flow control, and network congestion control.

The network element management layer 293 is concerned with the management of individual network elements, for example, switches, routers, bridges, and transmission facilities.

The network element layer 294 refers to elements that are to be managed.

In accordance with this model:

The model itself is a network that monitors and controls another network.

The model may be separate from or share facilities with the network it controls.

Each management system component is meant to be part of an interconnected hierarchy (the five-layer model), able to give up its specialized management information to other systems and to ask for specialized management information from the other systems.

Each layer in the model is an abstraction over the level beneath it. Tasks at the higher layers are those that need a more abstract view of the network resources; those at the lower levels require a less abstract, more detailed view.

The model defines standards for interoperability with Graphic User Interfaces (GUIs) such as X-Windows, as well as interoperability of functions on different layers or within a layer.

The standards specify a language by which agents in the integrated management platform communicate, whether they be in a manager-object relationship (i.e., layer N to layer N−1 relationship) or a peer-to-peer relationship (i.e., layer N−2 to layer N relationship).

In this embodiment, SNMP is used for element management 293/294 and network management 292/293, while TINA/CORBA is used for service and business management 290/291. The gateway between the service layer 291 and the network layer 292 is SNMP based. FIG. 37 is just one of various embodiments; another embodiment may utilize SNMP throughout.

The simple network management protocol (SNMP) was produced by the Internet community, and is a de facto standard for element management and network management. The great majority of management solutions in the data communications world depend on SNMP to communicate with network elements.

The structure of SNMP includes two primary components: (1) a structure for organizing information in management information bases (MIBs); and (2) a query protocol to access that information. It then produces a product, whether it is a transmission device or an application, and also includes an Internet-compliant MIB with the product, then the product can be managed by any application that knows the query protocol. The protocol primitives are: Get; Set; Get-Next; and Trap.

An alternative (to SNMP) is the Common Management Information Protocol (CMIP), developed by OSI. It also has two components like SNMP: a management information tree (MIT) and a query protocol to retrieve information from the MIT (Create, Delete, Get, Set, Action, Event-Report). OSIs' work is available at their website (www.osi.com).

In general, the CMIP protocol is substantially more complex than SNMP, but can accomplish more in terms of management. Thus, there is a tradeoff: SNMP is simple to implement and has low overhead in terms of computing resources, but lacks expressive power, while SMNP provides expressive power, but is relatively harder to implement and has higher overhead.

The Common Object Request Broker Architecture (CORBA) is defined by the Object Modeling Group (OMG). CORBA provides a computing environment for distributed processing. OMG, founded in 1989, is an international non-profit organization supported by vendors, developers, and users. The CORBA standard comprises:

An interface definition language (IDL) to define the external behavior of agents;

Specifications for building agent requests dynamically; and

And interface repository that contains descriptions of all agent interfaces in use in a given system.

CORBA is expected to be adopted by the Telecommunications Information Networking Architecture (TINA) consortium.

For further discussion of SNMP, CMIP, CORBA and TINA, see Ray, P., "Computer Supported Cooperative Work (CSCW), Englewood Cliffs, N.J., Prentice-Hall, 1999; and Aidorous, A., and T. Plevyak (editors) telecommunications network management into the 21st century: Techniques, Standards, Technologies, and Applications, New York: IEEE Press, 1994.

The IEEE Communications Society provides tutorials on major standards and links to further information from standards organizations, technical committees, and other sources. This service is realized on the Communications Society's website (www.comsoc.org).

In summary, to implement an SLM domain architecture (such as shown in FIG. 1) in an integrated management platform, the services 12 depend on some set of enterprise components 18, wherein those components 18 can be monitored and/or controlled by component parameters which in turn are monitored and/or controlled by agents 20. The result is to define a service in terms of a collection of agents that collaborate to deliver some service function. In implementing this provision of services based on a collection of agents that monitor network components, a five-layer integrated management model (FIG. 37) is provided, in which at the highest level a business-enterprise management layer 290 defines the business processes and seeks to capture information to determine whether such business processes (objectives and policies) are being met. Business processes 11 are composed of services 12, and the next service management layer 291 is concerned with measuring services by means of service parameters 15, which are marked by service levels 16. Below the service management layer 291, there is a network management layer 292 concerned with overall network management, e.g., network monitoring and remote configuration, bandwidth control, network congestion control, etc. Below this layer is provided network element management layer 293 which manages the individual network elements, such as switches, routers, bridges and transmission facilities. Below this level there is a network element layer 294 which directly monitors the internal operation of individual network elements. As previously discussed, multiple agents are selected to monitor the various types of network components.

Although certain preferred embodiments of the invention have been specifically illustrated and described herein, it is to be understood that variations may be made without departing from the spirit and scope of the invention as defined by the appended claims. For example, container sizes and shapes may be varied as well as the vacuum panel design. Thus, all variations are to be considered as part of the invention as defined by the following claims.

The invention claimed is:

1. A method performed on a computer for reactive and deliberative service level management, comprising:
   providing a service over a network having a plurality of network components that support the service, wherein performance of the service depends on performances of the plurality of network components that support the service, and wherein the service has a state that represents whether the performance of the service meets or exceeds a service level identified in a service level agreement;
   extracting a plurality of component parameter values from the plurality of network components that support the service across a plurality of domains of the network using a plurality of sensors respectively coupled to the plurality of network components that support the service;
   monitoring the plurality of component parameter values extracted from the plurality of network components that support the service using a plurality of monitoring agents, wherein each of the plurality of monitoring agents are configured to monitor a subset of the plurality of extracted component parameter values in a respective one of the plurality of domains of the network, detect one or more intra-domain events in the respective domain as a function of the component parameter values monitored in the respective domain, and generate one or more intra-domain alarms in the respective domain as a function of the intra-domain events detected in the respective domain;
   correlating the intra-domain alarms that each of the plurality of monitoring agents generate in each of the respective domains of the network using an alarm correlation agent, wherein the alarm correlation agent is configured to correlate the intra-domain alarms generated in each of the respective domains of the network to generate one or more inter-domain alarms across the plurality of domains of the network; and
   analyzing causes of the intra-domain alarms generated in each of the respective domains of the network and the inter-domain alarms generated across the plurality of domains of the network using an enterprise management system, wherein the intra-domain alarms and the inter-domain alarms indicate one or more of a degradation or a potential degradation in the performance of the service relative to the service level identified in the service level agreement.

2. The method of claim 1, further comprising:
   mapping the inter-domain alarms generated across the plurality of domains of the network to a service parameter that represents the state of the service, wherein the service parameter has a value that indicates whether the performance of the service meets or exceeds the service level identified in the service level agreement; and
   displaying information relating to service, wherein the displayed information includes at least one of availability, faults, configuration, integrity, security, reliability, performance, or the service level associated with the service.

3. The method of claim 2, further comprising
   determining that the state of the service satisfies the service level agreement in response to the value for the service parameter meeting or exceeding the service level identified in the service level agreement.

4. The method of claim 2, further comprising determining that the state of the service does not satisfy the service level agreement in response to the value for the service parameter not meeting or exceeding the service level identified in the service level agreement.

5. The method of claim 1, wherein analyzing the causes of the intra-domain alarms and the inter-domain alarms includes executing one or more data mining algorithms that discover respective relationships between the component parameter values and each of the intra-domain alarms and the inter-domain alarms.

6. The method of claim 5, wherein analyzing the causes of the intra-domain alarms and the inter-domain alarms further includes:
   executing the one or more data mining algorithms to discover at least one of the intra-domains alarms that caused one or more of the inter-domain alarms;
   executing the one or more data mining algorithms to discover at least one of the intra-domain events that caused the at least one intra-domain alarm; and
   executing the one or more data mining algorithms to discover at least one of the component parameter values that caused the at least one intra-domain event.

7. The method of claim 5, wherein the one or more data mining algorithms further discover cause and effect relationships among the plurality of network components that support the service to represent the respective relationships between the component parameter values and each of the intra-domain alarms and the inter-domain alarms.

8. The method of claim 5, wherein the one or more data mining algorithms further discover one or more of the component parameter values that distinguish whether the performance of the service meets or exceeds the service level identified in service level agreement.

9. The method of claim 1, wherein each of the plurality of monitoring agents are further configured to detect the one or more intra-domain events based on one or more policies and rules associated with the service.

10. The method of claim 9, wherein each of the plurality of monitoring agents are further configured to generate the one or more intra-domain alarms based on the one or more policies and rules associated with the service.

11. The method of claim 10, wherein the alarm correlation agent is further configured to generate the one or more inter-domain alarms based on the one or more policies and rules associated with the service.

12. A method performed on a computer for reactive and deliberative service level management, comprising:
   providing a service over a network having a plurality of network components that support the service, wherein performance of the service depends on performances of the plurality of network components that support the service, and wherein the service has a state expressed as a range of numeric values that represent whether the performance of the service meets or exceeds a service level identified in a service level agreement;

extracting a plurality of component parameter values from the plurality of network components that support the service across a plurality of domains of the network using a plurality of sensors respectively coupled to the plurality of network components that support the service;

monitoring the plurality of component parameter values extracted from the plurality of network components that support the service using a plurality of monitoring agents, wherein each of the plurality of monitoring agents are configured to monitor a subset of the plurality of extracted component parameter values in a respective one of the plurality of domains of the network, detect one or more intra-domain events in the respective domain as a function of the subset of the component parameter values monitored in the respective domain, and generate one or more intra-domain alarms in the respective domain as a function of the intra-domain events detected in the respective domain;

correlating the intra-domain alarms that each of the plurality of monitoring agents generate in each of the respective domains of the network using an alarm correlation agent, wherein the alarm correlation agent is configured to correlate the intra-domain alarms generated in each of the respective domains of the network to generate one or more inter-domain alarms across the plurality of domains of the network;

mapping the inter-domain alarms generated across the plurality of domains of the network to a service parameter that represents the state of the service, wherein the service parameter has a numeric value in the range of numeric values that indicates whether the performance of the service meets or exceeds the service level identified in the service level agreement; and monitoring the numeric value of the service parameter using an enterprise management system to provide service level management for the service provided over the network.

13. The method of claim 12, wherein providing service level management for the service provided over the network includes determining that the state of the service satisfies the service level agreement in response to the numeric value of the service parameter meeting or exceeding the service level identified in the service level agreement.

14. The method of claim 12, wherein providing
service level management for the service provided over the network includes determining that
the state of the service satisfies the service level agreement in response to the numeric value of the service parameter meeting or exceeding the service level identified in the service level agreement.

15. The method of claim 12, further comprising:
determining that the numeric value of the service parameter indicates one or more of a degradation, a potential degradation, or an imminent degradation in the performance of the service relative to the service level identified in the service level agreement; and issuing one or more instructions that effect a change to one or more of the component parameter values in response to determining that the numeric value of the service parameter indicates any of the degradation, the potential degradation, or the imminent degradation in the performance of the service relative to the service level identified in the service level agreement, wherein the one or more instructions autonomously cause the numeric value of the service parameter to meet or exceed the service level identified in the service level agreement.

16. A hardware system for reactive and deliberative service level management, comprising:
a network having a plurality of network components that support a service provided over the network, wherein performance of the service depends upon performances of the plurality of network components that support the service, and wherein the service has a state that represents whether the performance of the service meets or exceeds a service level identified in a service level agreement;

a plurality of sensors respectively coupled to the plurality of network components that support the service, wherein the plurality of sensors are configured to extract a plurality of component parameter values from the plurality of network components that support the service across a plurality of domains of the network;

a plurality of monitoring agents communicatively coupled to the plurality of sensors, wherein each of the plurality of monitoring agents are configured to:
monitor a subset of plurality of the extracted component parameter values in a respective one of the plurality of domains of the network;
detect one or more intra-domain events in the respective domain as a function of the component parameter values monitored in the respective domain; and
generate one or more intra-domain alarms in the respective domain as a function of the intra-domain events detected in the respective domain;

an alarm correlation agent configured to correlate the intra-domain alarms that each of the plurality of monitoring agents generate in each of the respective domains of the network to generate one or more inter-domain alarms across the plurality of domains of the network; and an enterprise management system configured to analyze causes of the intra-domain alarms generated in each of the respective domains of the network and the inter-domain alarms generated across the plurality of domains of the network, wherein the intra-domain alarms and the inter-domain alarms indicate one or more of a degradation or a potential degradation in the performance of the service relative to the service level identified in the service level agreement.

17. A hardware system for reactive and deliberative service level management, comprising:
a network having a plurality of network components that support a service provided over the network, wherein performance of the service depends upon performances of the plurality of network components that support the service, and wherein the service has a state expressed as a range of numeric values that represent whether the performance of the service meets or exceeds a service level identified in a service level agreement;

a plurality of sensors respectively coupled to the plurality of network components that support the service, wherein the plurality of sensors are configured to extract a plurality of component parameter values from the plurality of network components that support the service across a plurality of domains of the network;

a plurality of monitoring agents communicatively coupled to the plurality of sensors, wherein the plurality of monitoring agents are configured to:
monitor a subset of the plurality of extracted component parameter values in a respective one of the plurality of domains of the network;

detect one or more intra-domain events in the respective domain as a function of the subset of the component parameter values monitored in the respective domain; and generate one or more intra-domain alarms in the respective domain as a function of the intra-domain events detected in the respective domain;

an alarm correlation agent configured to correlate the intra-domain alarms that each of the plurality of monitoring agents generate in each of the respective domains of the network to generate one or more inter-domain alarms across the plurality of domains of the network; and an enterprise management system configured to:

map the inter-domain alarms generated across the plurality of domains of the network to a service parameter that represents the state of the service, wherein the service parameter has a numeric value in the range of numeric values that indicates whether the performance of the service meets or exceeds the service level identified in the service level agreement; and monitor the numeric value of the service parameter to provide service level management for the service provided over the network.

\* \* \* \* \*